US005353403A

United States Patent [19]

Kohiyama et al.

[11] Patent Number: 5,353,403

[45] Date of Patent: Oct. 4, 1994

[54] GRAPHIC DISPLAY PROCESSING APPARATUS AND METHOD FOR IMPROVING THE SPEED AND EFFICIENCY OF A WINDOW SYSTEM

[75] Inventors: Tomohisa Kohiyama; Jun Kitahara, both of Yokohama; Sunao Hirata; Seiji Oyama, both of Seto; Takumi Soen, Kochi; Ichiro Ote, Yokohama, all of Japan

[73] Assignees: Hitachi Chubu Software, Ltd., Nagoya; Hitachi, Ltd., Tokyo; Hitachisoftware Eng. Co., Ltd., Yokohama, all of Japan

[21] Appl. No.: 856,172

[22] Filed: Mar. 23, 1992

[30] Foreign Application Priority Data

Mar. 22, 1991 [JP] Japan .................................. 3-058561

[51] Int. Cl.[5] .............................................. G06F 15/62

[52] U.S. Cl. .................................... 395/164; 395/162; 395/166; 345/200

[58] Field of Search ................................ 395/162-166, 395/153, 155, 400, 425, 550; 340/721, 723, 744, 732, 744, 750, 796, 798-800; 345/201, 187, 185, 200, 197, 203

[56] References Cited

U.S. PATENT DOCUMENTS

| | | | |
|---|---|---|---|
| 4,791,580 | 12/1988 | Sherrill et al. | 395/164 |
| 5,046,023 | 9/1991 | Katsura et al. | 395/162 |

FOREIGN PATENT DOCUMENTS

| | | |
|---|---|---|
| 59-119385 | 7/1984 | Japan . |
| 63-231548 | 9/1988 | Japan . |
| 1-107295 | 4/1989 | Japan . |
| 1-140196 | 6/1989 | Japan . |

*Primary Examiner*—Dale M. Shaw
*Assistant Examiner*—Kee M. Tung
*Attorney, Agent, or Firm*—Antonelli, Terry, Stout & Kraus

[57] ABSTRACT

A graphic display processing apparatus which includes having a CPU, a VRAM and a display controller, a data operation unit, an access cycle generator, an address generator and a sequential transfer sequencer. The graphic display processing apparatus also includes a mask pattern generator, dot mask generator and data position transformer. In the graphic display processing apparatus block transfer and character drawing are performed at high speeds, thereby making a window system more practical and offering comfortable operational environment to the user.

21 Claims, 36 Drawing Sheets

WITHOUT PRE-READ

WITH PRE-READ

GRAPHIC DISPLAY PROCESSING APPARATUS AND METHOD FOR IMPROVING THE SPEED AND EFFICIENCY OF A WINDOW SYSTEM

BACKGROUND OF THE INVENTION

The present invention relates to a graphic display processing apparatus for performing control of drawing in the graphic display processing apparatus.

With the recent development of semiconductor technology, the function and performance of an information processing apparatus such as personal computer and work station have been improved significantly year by year. Speedup of the central processing unit (hereinafter referred to as CPU), increased capacity of the storage unit such as memory and external memory unit and improvements in man-machine interface can be mentioned as factors of the improved performance. Under this background, a so-called window system has been practiced which is operated by displaying one or more rectangular frames called windows on the screen and assigning an application program to each of the windows. This type of window system features the full graphics display processing wherein not only images and figures but also characters are displayed through graphics. In the past, too, there was a window system, which required too much processing time to be practical because of the performance of CPU and the capacity of storage unit. As is known in the art, the performance of the whole window system is affected significantly, especially by the processing performance of the following drawing primitives:

(1) Bit Block Transfer
(2) Character Drawing
(3) Line Segment Drawing

The bit block transfer is a generalized processing for transferring data in an area defined by a rectangle to another rectangular area and is an important drawing primitive which occupies 50% or more of the processing of the whole window system. The character drawing occupies 20% to 30% of the processing in a general window system. Importance of the processing performance of the drawing can be understood readily when taking into consideration the fact that an application program principally containing character display for use in word processors is executed during the drawing. The line segment drawing occupies, in general, 10% to 30% of the overall processing. It should be understood that the drawing is also an important drawing primitive, by taking into account the fact that the percentage of processing will be further increased when a sophisticated figure is displayed using an application program of, for example, computer-aided design (CAD).

Improvements in the performance of the CPU and increase in the capacity of the storage unit are mentioned hereinbefore but they merely provide background techniques for causing the window system to approach the practical base. In other words, it is the point of the above processings (1) to (3) how data, which has experienced the pre-processing such as calculation of coordinates to be drawn, can be stored at a high speed in the memory for display, i.e., video random access memory (hereinafter referred to as VRAM). In order to speed the drawing processing per se up, the display system has to be provided with a drawing speedup mechanism. Under the circumstances, many expedients for high-speed drawing have hitherto been contrived.

In a conventional system as disclosed in Japanese Patent Application Laid-open No. JP-A-59-119385, coordinates of a pixel are designated and an address is calculated through hardware to carry out bit block transfer. In a conventional system as disclosed in Japanese Patent Application Laid-open No. JP-A-01-107295, read/write operation from the CPU is expanded to perform bit block transfer. In accordance with a conventional system as disclosed in Japanese Patent Application Laid-open No. JP-A-01-140196, an address of the VRAM is generated by means of an address register and an address offset register.

A display system having a VRAM of plane type is considered. Another structure of VRAM called a packed pixel type is also available but the plane type is suitable for speedup of bit block transfer. In the plane type, the VRAM as viewed from the CPU is constructed of one or more planes and the CPU accesses plane by plane. The number of planes determines the number of colors which can be displayed simultaneously or the number of gradations of gray scale which are displayed simultaneously. For example, two colors or gradations can be displayed with one plane, 16 colors or gradations can be displayed with 4 planes and 256 colors or gradations can be displayed with 8 planes. When the transfer processing of horizontal one raster is effected repetitively by the number of rasters necessary to complete the whole processing, time t for bit block transfer processing can generally be expressed by the following equation:

$$t=p*y*(b+(a*n+m)*x)+c \quad (1)$$

where each parameter has the meaning as below:

a: averaged one access time for VRAM
b: fixed overhead of transfer processing of horizontal one raster
c: fixed overhead of bit block transfer processing
m: overhead of processing necessary for one-word transfer
n: the number of VRAM accesses necessary for one transfer of data of one word
p: plane coefficient
x: the number of words transferred in the horizontal direction
y: the number of words transferred in the vertical direction
*: arithmetic multiplication sign
+: arithmetic addition sign Firstly, the presupposition of the graphic display processing apparatus considered. In bit block transfer, when data representative of a plurality of pixels read out of a transfer originator, i.e., source area is written into a desired position of a transfer destination, i.e., destination area, data of one word of the source is so written as to cross two words of the destination at a high probability. For example, in the case of a graphic display processing apparatus having a hardware construction capable of reading 16 pixels by one VRAM access, data can be written into the destination without resort to shift processing through one write operation at a probability of 1/16 and data subject to shift processing crosses two words at a probability of 15/16. Therefore, without any support by hardware, the value of the number n of VRAM accesses in bit block transfer changes with the presence or absence of shift processing, resulting in different values of processing time t. Contrarily, with the merge function provided, the value of n can be kept to be constant regardless of shift processing of data to be transferred. The merge function is a technique disclosed in, for example, Japanese Patent Application Laid-open No. JP-A-63-231548. The outline of the function is as follows. When a shifter is used during bit block transfer, data is overflowed by shifting to leave a remainder of data which is not drawn in a transfer destination word during a first round. In order to permit the remainder to be drawn during the next round of word transfer, a register is provided which holds the data during one preceding round, whereby the next transfer data is merged with the held data to provide data of 2-word length from which a portion necessary for the next transfer is cut out and drawn. With the aim of further increasing the speed of the graphic display processing apparatus capable of keeping the value of n constant regardless of the presence or absence of shift processing through the use of the merge function, it is possible to presupposes realization of a graphic display processing apparatus having the merge function.

The parameter p called plane coefficient will now be described. The parameter p is determined by how many planes a VRAM of a graphic display processing apparatus in question has and how many planes of the VRAM can be handled for drawing processing simultaneously. When all the planes of the VRAM can be processed simultaneously, the value of parameter p is 1 regardless of the number of planes of the VRAM. When the processing is permitted to be carried out only plane by plane, the value of parameter p is 4 in the case of, for example, 16-color display (4 planes) and is 8 in the case of 256-color display (8 planes). When the CPU reads the contents of the VRAM to store it in the main memory, the VRAM must be read plane by plane and the value of parameter p cannot be made to be 1 regardless of the number of planes. But in the drawing processing within the VRAM according to the present invention, each plane is provided with a control circuit for support of drawing to permit drawing processings of all the planes to be effected in parallel. Aiming at further speedup of the graphic display processing apparatus capable of keeping the value of parameter p one regardless of the number of planes, the present to presuppose realization of a drawing processing apparatus capable of processing all the planes simultaneously.

In order to reduce the processing time t, it is necessary to reduce the transfer word number x in the horizontal direction by increasing the number of bits of data to be processed at a time or making the parameters a, b, and m small. The transfer word number x may be reduced by increasing the number of memory chips constituting the VRAM, widening the data bus width of the VRAM and increasing the amount of hardware of control circuits needed therefor. But at present, because of physical and economical restrictions, the data bus width per VRAM plane is often 16 to 32 bits. In addition, bit block transfer for small area is affected by other parameters.

The parameter a is a basic parameter for determining not only the bit block transfer but also the drawing speed of display unit. Since the parameter a signifies averaged access time for the VRAM, the value of this parameter may be decreased by using a memory element for VRAM such as a multi-port memory, accessing the VRAM with a plurality of words in high-speed page mode, or reducing the access time per se by adopting a device of higher access time; or by eliminating a synchronous overhead due to the difference between operation period of the CPU and that of the VRAM. The parameter c is an overhead related to the pre-processing of drawing such as application program, operating system and device driver and cannot be made to be sufficiently small by means of hardware of the apparatus. Generally, the ratio of c to t is often small and therefore, the absolute value of parameter c is a factor which is automatically reduced through improvements in the performance of the CPU.

The parameter b is multiplied by the integer number of rasters necessary for bit block transfer processing. Therefore, when the ratio of parameter b becomes large to the term a *n *x as in the case of bit block transfer of a vertically elongated area, the influence of this parameter becomes eminent and so the parameter b must be minimized as possible. Factors dominating the parameter b will be described later. The parameter m represents time required for raster operation to be effected between transfer originator data read out of the VRAM and transfer destination data. When processed through software, the parameter m becomes about 15 times as large as the term a *n, causing significant speed reduction. It is to be noted that in equation (1), the coefficient concerning transfer word number is liable to have the greatest influence upon the whole processing time t.

Problems encountered in the conventional system will now be clarified based on equation (1). In the technique shown in Japanese Patent Application Laid-open No. JP-A-59-119385, only a simple transfer processing of a rectangular area such as source copy can be carried out and this technique cannot be utilized for transfer requiring overlap of graphic forms which needs an operation between an original graphic at the transfer originator and a graphic to be drawn. "Source copy" is a kind of bit block transfer processing for copying a graphic at the transfer originator (source) onto an area of the transfer destination (destination). The operation processing effected between the original graphic and the graphic to be drawn is called raster operation. In both the processing of overlapping two graphic forms or adding patterns and the processing of displaying graphic cursors by means of a mouse or a pointing device, drawing is done using bit block transfer accompanied by the raster operation. In the window system, the bit block transfer can be considered to be accompanied by the raster operation excepting particular cases. The prior art in question is effective to only a particular instance of bit block transfer which does not include any raster operation. Also, the prior art of interest needs a control unit such as a microprocessor for the sake of updating a read address register and a write address register, though not clearly described in Japanese Patent Application Laid-open No. JP-A-59-119385. Even if the control unit is dedicated to the apparatus of Japanese Patent Application Laid-open No. JP-A-59-119385, it takes obviously a long time to update the read address register and write address register. This sets up a factor of increasing the parameters m and b. Additionally, in the technique of the literature, x component and y component of coordinates of a given dot are used as upper and lower terms, respectively, to combine y and x so as to determine a VRAM address. Accordingly, if a lateral bit map of the VRAM has a structure of other than the power of 2, the VRAM address cannot be calculated from the coordinates. This sets up a factor of increasing the parameter c.

A technique disclosed in Japanese Patent Application Laid-open No. JP-A-01-107295 is capable of effecting a raster operation between an original graphic and a graphic to be drawn and causing read/write operation by the CPU to perform transfer of data. But, in this prior art, the read cycle of the CPU is expanded to perform bit block transfer, so that the synchronous overhead occurs between cycle time of the CPU and cycle time of the VRAM, failing to give full play to the performance. This sets up a factor of increasing the parameter a.

An address generator shown in Japanese Patent Application Laid-open No. JP-A-01-140196 is comprised of an address register and an address offset register. This address generator can perform address calculation even when the VRAM has a lateral bit map of other than the power of 2 but disadvantageously, when the capacity of the VRAM is increased and the number of bits of an address necessary for accessing is increased, it must sometimes perform register setting twice in a general information apparatus having a data bus of 16 bits. For example, in order to designate, in unit of word, an address of a VRAM having a bit map of 2048×1024 pixels, there needs an address of 17 bits. Then, to set an address register of 17 bits, a total of two write operations into registers must be done, including one write operation into a register of 16 bits and the other write operation into a register of one bit. Generally, setting of control register and the like is effected with the I/O cycle by the CPU and consumes time. In order to reduce the number of setting operations of the control register, the control program is also required to hold an address of an area to be transferred onto the VRAM and only a lower value of the address which is required to be changed is set. This method, however, uses registers of the CPU for the purpose of holding address and disadvantageously, the number of registers of the CPU which would otherwise be utilized for other types of control is decreased. In performing bit block transfer, these address control registers are rewritten frequently, with the result that the number of setting operations is increased and the program is sophisticated to give rise to factors of performance degradation. This leads to an increase of the parameter b.

When data of a rectangular area of a desired size is transferred, it is frequent that opposite ends of the rectangle respectively begin with a midway and end in a midway of a word which is the unit of accessing the VRAM. Accordingly, in performing transfer in unit of raster, a separate processing is needed for drawing the beginning and end of transfer processing in portions within the word, giving rise to a decrease in processing speed. According to specific measurement results, the processing time required for the processing of the opposite ends amounted, in average, up to about 40% of the processing time for the whole bit block transfer. This sets up a factor which increases the parameter b remarkably.

In addition, for each application program, a data structure of a general memory constituting the main memory sometimes differs from that of a memory constituting the VRAM and the control program is required to include conversion, leading to a decrease in processing speed. This sets up a factor of increasing the parameter m.

Since equation (1) is a general expression, equations which indicate processing time t in typical different processings in bit block transfer will now be described.

In the case of drawing consisting of only write to the VRAM such as paint-out drawing, only an operation of writing color information into the VRAM generally proceeds and hence the value of n is one. Therefore, the processing time t is given by equation (2):

$$t=y*(b+(a+m)*x)+c \quad (2).$$

In the case of source copy which is simple transfer from the transfer originator to the transfer destination, VRAM read at the transfer originator and VRAM write at the transfer destination are needed and so the value of n is 2. Therefore, the processing time t is given by equation (3);

$$t=y*(b+(2a+m)*x)+c \quad (3).$$

In case where data at the transfer originator and data originally present at the transfer destination undergo operation processing and are written into the transfer destination, VRAM read at the transfer originator, VRAM read at the transfer destination and VRAM write at the transfer destination are needed and so the value of n is 3. Therefore, the processing time t is given by equation (4):

$$t=y*(b+(3a+m)*x)+c \quad (4).$$

In case where data at the transfer originator, data originally present at the transfer destination and a pattern undergo operation processing and are written into the transfer destination, VRAM read at the transfer originator, VRAM read at the transfer destination, VRAM read of the pattern and VRAM write at the transfer destination are needed and so the value of n is 4. Therefore, the processing time t is given by equation (5):

$$t=y*(b+(4a+m)*x)+c \quad (5).$$

There are these kinds of basic operations in bit block transfer. In the prior art, the value of parameter m in equations (2) to (5) cannot be made to be constant. This accounts for the fact that even when means is provided which makes the value of parameter m zero or makes it nearly zero in comparison with the value of parameter a to achieve speedup in the simple processing such as source copy pursuant to equation (3), load on the CPU is increased as soon as bit block transfer with raster operation pursuant to equation (4) or (5) begins and the value of parameter m is increased to about 5 to 20 times the value of parameter a. Disadvantageously, the processing speed therefore differs significantly depending on the kind of bit block transfer.

Problems encountered in character drawing will now be described. The character drawing signifies the processing of writing a character font (the form of a character) to a desired position on the screen of full bit map. Generally, the address of VRAM increases in the horizontal direction of display. On the assumption that the data bus of VRAM is of, for example, 16 bits, data of the VRAM having the plane structure is arranged horizontally in unit of 16 pixels and therefore drawing must be carried out after the character font is suitably shifted for positioning. The thus shifted character font sometimes exceeds the word boundary of VRAM and in some cases write operation must be effected twice.

While the VRAM address increases in the horizontal direction of display as described previously,character font data results from slicing a character in unit of dot and slices are sequentially stored in the vertical direction. The conventional system disclosed in Japanese Patent Application Laid-open No. JP-A-1-140196 is capable of addressing the VRAM vertically and therefore, when combined with the other conventional systems, it may be considered to be suitable for expanding the character font data vertically. But this is possible only when the number of bits of the character font data equals the number of bits of the VRAM data bus. Take the case where the font data is of 8 bits and the VRAM data bus is of 16 bits, for instance. When a character font is to be transferred to the VRAM by using a byte (8 bits) data transfer instruction by the CPU, the VRAM address increases vertically but the character font data from the CPU develops on upper 8 bits and lower 8 bits of the VRAM data bus alternately. This is because the CPU address is assigned in unit of byte and in the 16-bit bus, the lower 8 bits and upper 8 bits are defined as even and odd addresses, respectively. Accordingly, without any expedient applied, the conventional systems in combination fail to draw the character font at an expected position.

Incidentally, due to the fact that in the display system of personal computers, the VRAM data bus of 8 bits is leading internationally, the character font is also designed as to have an 8-bit width in many applications. On the other hand, in a display system of the class having 1000 dots in the horizontal direction, the VRAM data bus is often of 16 bits or more in order to increase the drawing speed. Therefore, in conveniences set forth so far will in general occur in the future. The character drawing faces the problems described as above.

To describe line segment drawing, a straight line is considered as a line segment. Many kinds of algorithm for generating coordinates of dots constituting a straight line have been contrived but a unit for drawing a line segment at a high speed has in general a different construction as that of the aforementioned unit for increasing the speed of bit block transfer and must be provided separately.

SUMMARY OF THE INVENTION

It is an object of the present invention to provide a graphic display processing apparatus and processing method capable of making constant the value of the parameter m representing the overhead due to one word transfer processing in equations (2), (3), (4) and (5). Preferably, the invention also intends to provide a bit block transfer graphic display apparatus and processing method with a speedup unit capable of making zero the value of the parameter b representing the overhead due to horizontal one raster transfer processing in equations (2), (3), (4) and (5).

Another object of the invention is to provide a graphic display processing apparatus and processing method capable of performing normal and high-speed letter drawing even under the condition that the value of parameter m is constant and the value of parameter b is zero.

Still another object of the invention is to provide a graphic display processing apparatus capable of processing line segment drawing by using the bit block transfer drawing unit in order to draw a line segment at a desired inclination angle by combining a horizontal line segment, a vertical line segment and a 45° oblique line segment.

To accomplish the above objects, according to embodiments of the invention, there is provided a graphic display processing apparatus having a CPU, a VRAM having a plane structure of one or more planes and adapted to store data, a memory controller adapted to generate a timing signal for accessing the VRAM, a drawing controller for transferring the data to the VRAM, a display, a display address generator for generating a display address for the VRAM, and a display controller for generating a display timing signal for display of the data on the display, wherein the apparatus comprises a sequential transfer sequence unit, coupled to the CPU, for generating access request timing signals by set times, an access cycle generator unit for expanding the access request timing signal from the sequential transfer sequence unit into one or more access requests and transferring the access requests to the memory controller, a data control unit for designating a processing operation of the data on the basis of an instruction from the CPU under the control of the sequential transfer sequence unit and access cycle generator unit, a data operation unit for performing a processing operation of the data to be drawn on the VRAM on the basis of a command from the data control unit under the control of the access cycle generator unit, and a drawing address generator unit for generating a drawing address of the data on the basis of a signal from the access cycle generator unit.

Preferably, the drawing address generator unit includes a first address generator unit adapted to generate a first address within the VRAM and having a unit for updating the first address after completion of a third read cycle to be described later, a second address generator unit adapted to generate a second address within the VRAM and having a unit for updating the second address after completion of a fourth read cycle to be described later, and a third address generator unit adapted to generate a third address within the VRAM and having a unit for updating the third address after completion of a second write cycle to be described later.

Preferably, the data operation unit includes a first data hold unit, a second data hold unit, a third data hold unit, a first shift unit for shifting data held by the first data hold unit, a second shift unit for shifting data held by the second data hold unit, and a logical operator adapted to receive three values of data representative of a result of shift by the first shift unit, data representative of a result of shift by the second shift unit and data held by the second data hold unit.

Preferably, the sequential transfer sequence unit generates a first write cycle or a set of a first read cycle and the first write cycle at least once. Preferably, the access cycle generator unit includes a first access cycle generator having a first designation unit for receiving the first write cycle generated by the sequential transfer sequence unit so as to designate whether the second write cycle for storing the operation result of the logical operator at the third address designated by the third address generator unit is generated for the memory controller or whether after the second read cycle for storing data at the third address designated by the third address generator unit in the third data hold unit is generated for the memory controller, the second write cycle for storing the operation result of the logical operator at the third address designated by the third address generator unit is generated for the memory controller, and a second access cycle generator having a second designation unit for receiving the first read cycle generated by the sequential transfer sequence unit so as to designate which one of desired one to three combinations of three kinds of read cycles including the third read cycle for storing data at the first address designated by the first address generator unit in the first data hold unit, fourth read cycle for storing data at the second address designated by the second address generator unit in the second data hold unit and second read cycle for storing data at the third address designated by the third address generator unit in the third data hold unit is generated for the memory controller.

Features of the present embodiment will now be described separately in respect of bit block transfer, character drawing and line segment drawing.

1. Bit Block Transfer

In order to achieve the speedup of drawing processing of bit block transfer which is the object of the invention in a graphic display system having a VRAM of a plural plane structure and a memory controller for the VRAM, the present embodiment has a construction as described in items (1), (2), (3), (4) and (5) below.

(1) Provided common to all the planes of the VRAM are a data structure transformer for transforming the format of external data by using mirror image inversion and swap separately or in combination, a bit mask register for controlling writing to the VRAM in unit of bit, an AND circuit for ANDing the contents of bit mask register and the data of data structure transformer bit by bit, a bit mask shifter for shifting data of the bit mask register, data structure transformer or AND circuit, a third merge register for holding the previous contents of data of the data structure transformer, a third shifter for shifting data of the data structure transformer and data of the third merge register, and a read data synthesizer for ORing bits of the contents of a read data selector of each plane to be described later so as to synthesize read data supplied to the CPU.

There is provided a data operation unit which includes, by the number of planes of the VRAM and for each plane of the VRAM, a read plane selector for selecting permissibility or impermissibility of reading the VRAM in unit of plane, a write plane selector for selecting permissibility or impermissibility of writing the VRAM in unit of plane, a plane bit mask unit for synthesizing the output of the write plane selector and the output of the bit mask shifter and controlling, in unit of bit, writing of each plane of the VRAM, a first buffer register for holding data of the VRAM or data of the data structure transformer as data of a source area, a second buffer register for holding data of the VRAM or data of the data structure transformer as data of a pattern area, a third buffer register for holding data of the VRAM or data of the data structure transformer as data of a destination area, a first merge register for holding the previous contents of data of the VRAM, first buffer register or data structure transformer, a second merge register for holding the previous contents of data of the second buffer register or data structure transformer, a first shifter for shifting data of the first buffer register and data of the first merge register, a second shifter for shifting data of the second buffer register and data of the second merge register, a three-value raster operator for performing logical operation by using as inputs the contents of the first and second shifters and the contents of the third buffer register or VRAM, a first two-value raster operator for performing logical operation by using as inputs the contents of the first shifter and the contents of the third buffer register, a second two-value raster operator for performing logical operation by using as inputs the contents of the second shifter and the contents of the third buffer register, a bit selector for selecting, when the value of each bit of the output of the third shifter is zero, the output data of the first two-value raster operator at that bit position and selecting, when the value of each bit of the output of the third shifter is one, the output data of the second two-value raster operator at that bit position, a write data selector for supplying the contents of the three-value raster operator or the contents of the bit selector to the VRAM, and a read data selector for supplying the data of the VRAM or the contents of the three-value raster operator to the read data synthesizing unit when the plane is selected by the read plane selector.

(2) There is provided an address generator including a source address register for holding an address of a source area on the VRAM, a destination address register for holding an address of a destination area, a pattern address register for holding an address of a pattern area, a source offset register for holding a value added to the contents of the source address register to update the same when a read access cycle by the access cycle generator to be described later ends, a destination offset register for holding a value added to the contents of the destination address register to update the same when a write access cycle by the access cycle generator to be described later ends, a pattern offset register for holding a value added to the contents of the pattern address register to update the same when the read access cycle by the access cycle generator to be described later ends, a first address adder for adding the contents of source address register and that of source offset register, the contents of destination address register and that of destination offset register or the contents of pattern address register and that of pattern offset register so as to update the value of each register, and a second address adder for adding the write data of CPU and the contents of source address register, destination address register or pattern address register so as to update the value of each register.

(3) There is provided an access cycle generator which, when receiving a request for reading the VRAM from the CPU or a sequential transfer counter to be described later, a read access request containing at least one of access operations to source, destination and pattern areas by using the address generator and when receiving a request for writing the VRAM from the CPU or the sequential transfer counter to be described later, generates a write access or the combination of read access and write access to a destination area by using the address generator and drives the memory controller for the VRAM.

(4) There is provided a sequential transfer counter which starts the access cycle generator by the designated number of sequential operations of write cycle or combination of read cycle and write cycle.

(5) There is provided a sequential transfer mask pattern generator which generates bit mask patterns respectively designated during the first and final write transfer processings by the sequential transfer counter and supplies the bit mask patterns, as external data, to a bit mask controller through the data structure transformer of data operation unit and during write transfer lying between the first and final write transfer processings, generates a bit pattern which permits writing of all the bits and supplies the bit mask pattern, as external data, to the bit mask controller through the transformer.

For the sake of automatically updating the register for address management in unit of raster necessary for transfer of a rectangle and executing a series of processings of transfer of a two-dimensional rectangular area, there are provided a raster counter for starting the sequential transfer counter plural times, a count value hold register for holding data written in the sequential transfer counter and resetting the held data in the sequential transfer counter when the value of the raster counter is not a final value and the sequential transfer counter assumes a final value, a source update value register for holding, when a read cycle using the source address register is generated while the value of the raster counter is not the final value and the sequential transfer counter assumes the final value, a value added to the source address register upon completion of the read cycle, a pattern update value register for holding, when a read cycle using the pattern address register is generated while the value of the raster counter is not the final value and the sequential transfer counter assumes the final value, a value added to the pattern address register upon completion of the read cycle, and a destination update value register for holding, when a write cycle using the destination address register is generated while the value of the raster counter is not the final value and the sequential transfer counter assumes the final value, a value added to the destination address register upon completion of the write cycle.

2. Character Drawing

In order to achieve the speedup of character drawing which is another object of the invention in a graphic display system having a VRAM of plural plane structure and a memory controller for the VRAM, the present embodiment has a construction as described in items (1), (2), (3) and (4) below.

(1) Provided common to all the plane of the VRAM are a data structure transformer for transforming the format of external data by using mirror image inversion and swap separately or in combination, a bit mask register for controlling writing to the VRAM in unit of bit, an AND circuit for ANDing the contents of bit mask register and the data of data structure transformer bit by bit, a bit mask shifter for shifting data of the bit mask register, data structure transformer or AND circuit, a third merge register for holding the previous contents of data of the data structure transformer, a third shifter for shifting data of the data structure transformer and data of the third merge register, and a read data synthesizer for ORing bits of the contents of a read data selector of each plane to be described later so as to synthesize read data supplied to the CPU.

There is provided a data operation unit which includes, by the number of planes of the VRAM and so for each plane of the VRAM, a read plane selector for selecting permissibility or impermissibility of reading the VRAM in unit of plane, a write plane selector for selecting permissibility or impermissibility of writing the VRAM in unit of plane, a plane bit mask unit for synthesizing the output of the write plane selector and the output of the bit mask shifter and controlling, in unit of bit, writing of each plane of the VRAM, a first buffer register for holding data of the VRAM or data of the data structure transformer as data of a source area, a second buffer register for holding data of the VRAM or data of the data structure transformer as data of a pattern area, a third buffer register for holding data of the VRAM or data of the data structure transformer as data of a destination area, a first merge register for holding the previous contents of data of the VRAM, first buffer register or data structure transformer, a second merge register for holding the previous contents of data of the second buffer register or data structure transformer, a first shifter for shifting data of the first buffer register and data of the first merge register, a second shifter for shifting data of the second buffer register and data of the second merge register, a three-value raster operator for performing logical operation by using as inputs the contents of the first and second shifters and the contents of of the third buffer register or VRAM, a first two-value raster operator for performing logical operation by using as inputs the contents of the first shifter and the contents of the third buffer register, a second two-value raster operator for performing logical operation by using as inputs the contents of the second shifter and the contents of the third buffer register, a bit selector for selecting, when the value of each bit of the output of the third shifter is zero, the output data of the first two-value raster operator at that bit position and selecting, when the value of each bit of the output of the third shifter is one, the output data of the second two-value raster operator at that bit position, a write data selector for supplying the contents of the three-value raster operator or the contents of the bit selector to the VRAM, and a read data selector for supplying the data of the VRAM or the contents of the tertiary raster operator to the read data synthesizing unit when the plane is selected by the read plane selector.

(2) There is provided an address generator including a source address register for holding an address of a source area on the VRAM, a destination address register for holding an address of a destination area, a pattern address register for holding an address of a pattern area, a source offset register for holding a value added to the contents of the source address register to update the same when a read access cycle by the access cycle generator to be described later ends, a destination offset register for holding a value added to the contents of the destination address register to update the same when a write access cycle by the access cycle generator to be described later ends, a pattern offset register for holding a value added to the contents of the pattern address register to update the same when the read access cycle by the access cycle generator to be described later ends, a first address adder for adding the contents of of source address register and that of source offset register, the contents of destination address register and that of destination offset register or the contents of pattern address register and that of pattern offset register so as to update the value of each register, and a second address adder for adding the write data of CPU and the contents of source address register, destination address register or pattern address register so as to update the value of each register.

(3) There is provided an access cycle generator which, when receiving a request for reading the VRAM from the CPU or a sequential transfer counter to be described later, generates a read access request containing at least one of access operations to source, destination and pattern areas by using the address generator and when receiving a request for writing the VRAM from the CPU or the sequential transfer counter to be described later, generates a write access or the combination of read access and write access to a destination area by using the address generator and drives the memory controller for the VRAM.

(4) A data position transformer is provided which, when the number of bits of data from the CPU differs from the number of bits of the VRAM data bus, puts the data of the CPU to the left or right on the VRAM data bus through an image on the screen and supplies the thus put data, as external data, to the data structure transformer of data operation unit.

Preferably, the VRAM data bus is divided into two, one of which stands for a first bus and the other stands for a second bus, an address of the destination address register is supplied, without alternation, to a memory element coupled to the first bus, the address of the destination address register is supplied, through an increment unit, to a memory element coupled to the second bus when the shift value of the bit mask shifter (or the shift value of the third shifter) exceeds half the number of bits of the VRAM data bus, and the address of the destination address register is supplied, without alternation, to the memory element coupled to the second bus when the shift value of the bit mask shifter (or the shift value of the third shifter) is not greater than half the number of bits of the VRAM data bus.

3. Line Segment Drawing

In order to achieve the speedup of line segment drawing which is still another object of the invention in a graphic display system having a VRAM of a plural plane structure and a memory controller for the VRAM, the present embodiment has a construction as described in items (1), (2), (3), (4), (5) and (6) below.

(1) Provided common to all the planes of the VRAM are a data structure transformer for transforming the format of external data by using mirror image inversion and swap separately or in combination, a bit mask register for controlling writing to the VRAM in unit of bit, an AND circuit for ANDing the contents of bit mask register and the data of data structure transformer bit by bit, a bit mask shifter for shifting data of the bit mask register, data structure transformer or AND circuit, a third merge register for holding the previous contents of data of the data structure transformer, a third shifter for shifting data of the data structure transformer and data of the third merge register, and a read data synthesizer for ORing bits of the contents of a read data selector of each plane to be described later so as to synthesize read data supplied to the a CPU.

There is provided a data operation unit which includes, by the number of planes of the VRAM and so for each plane of the VRAM, a read plane selector for selecting permissibility or impermissibility of reading the VRAM in unit of plane, a write plane selector for selecting permissibility or impermissibility of writing the VRAM in unit of plane, a plane bit mask unit for synthesizing the output of the write plane selector and the output of the bit mask shifter and controlling, in unit of bit, writing of each plane of the VRAM, a first buffer register for holding data of the VRAM or data of the data structure transformer as data of a source area, a second buffer register for holding data of the VRAM or data of the data structure transformer as data of a pattern area, a third buffer register for holding data of the VRAM or data of the data structure transformer as data of a destination area, a first merge register for holding the previous contents of data of the VRAM, first buffer register or data structure transformer, a second merge register for holding the previous contents of data of the second buffer register or data structure transformer, a first shifter for shifting data of the first buffer register and data of the first merge register, a second shifter for shifting data of the second buffer register and data of the second merge register, a three-value raster operator for performing logical operation by using as inputs the contents of the first and second shifters and the contents of the third buffer register or VRAM, a first two-value raster operator for performing logical operation by using as inputs the contents of the first shifter and the contents of the third buffer register, a second two-value raster operator for performing logical operation by using as inputs the contents of the second shifter and the contents of the third buffer register, a bit selector for selecting, when the value of each bit of the output of the third shifter is zero, the output data of the first binary raster operator at that bit position and selecting, when the value of each bit of the output of the third shifter is one, the output data of the second two-value raster operator at that bit position, a write data selector for supplying the contents of the three-value raster operator or the contents of the bit selector to the VRAM, and a read data selector for supplying the data of the VRAM or the contents of the three-value raster operator to the read data synthesizing unit when the plane is selected by the read plane selector.

(2) There is provided an address register including a source address register for holding an address of a source area on the VRAM, a destination address register for holding an address of a destination area, a pattern address register for holding an address of a pattern area, a source offset register for holding a value added to the contents of the source address register to update the same when a read access cycle by the access cycle generator to be described later ends, a destination offset register for holding a value added to the contents of the destination address register to update the same when a write access cycle by the access cycle generator to be described later ends, a pattern offset register for holding a value added to the contents of the pattern address register to update the same when the read access by the access cycle generator to be described late ends, a first address adder for adding the contents of source address register and that of source offset register, the contents of destination address register and that of destination offset register or the contents of pattern address register and that of pattern offset register so as to update the value of each register, and a second address adder for adding the write data of CPU and the contents of source address register, destination address register or pattern address register so as to update the value of each register.

(3) There is provided an access cycle generator which, when receiving a request for reading the VRAM from the CPU or a sequential transfer counter to be described later, generates a read access request containing at least one of access operations to source, destination and pattern areas by using the address generator and when receiving a request for writing the VRAM from the CPU or the sequential transfer counter to be described later, a write access or the combination of read access and write access to a destination area by using the address generator and drives the memory controller for the VRAM.

(4) There is provided a sequential transfer counter which starts the access cycle generator by the designated number of sequential operations of write cycle or combination of read cycle and write cycle.

(5) There is provided a sequential transfer mask pattern generator which generates bit mask patterns respectively designated during the first and final write transfer processings by the sequential transfer counter and supplies the bit mask patterns, as external data, to a bit mask controller through the data structure transformer of data operation unit and during write transfer lying between the first and final write transfer processings, generates a bit pattern which permits writing of all the bits and supplies the bit mask pattern, as external data, to the bit mask controller through the transformer.

(6) There is provided a dot mask generator which generates a bit pattern for permitting write of only one bit on the VRAM data bus, supplies as external data the bit pattern to the bit mask controller through the data structure transformer of data operation unit, selectively renders, upon completion of write cycle to the VRAM, the bit pattern unchanged or rotated by one bit clockwise or counterclockwise, and when an overflow takes place as a result of the rotation, increments the value of destination of the address generator by +1 for clockwise rotation and decrements by −1 for counterclockwise rotation.

DESCRIPTION OF THE PREFERRED EMBODIMENTS

The present invention will now be described by way of example with reference to the accompanying drawings. Prior to describing embodiments, the gist of bit block transfer, character drawing and line segment drawing which are characteristic of the invention will first be described.

1. Bit Block Transfer

Figure 1:
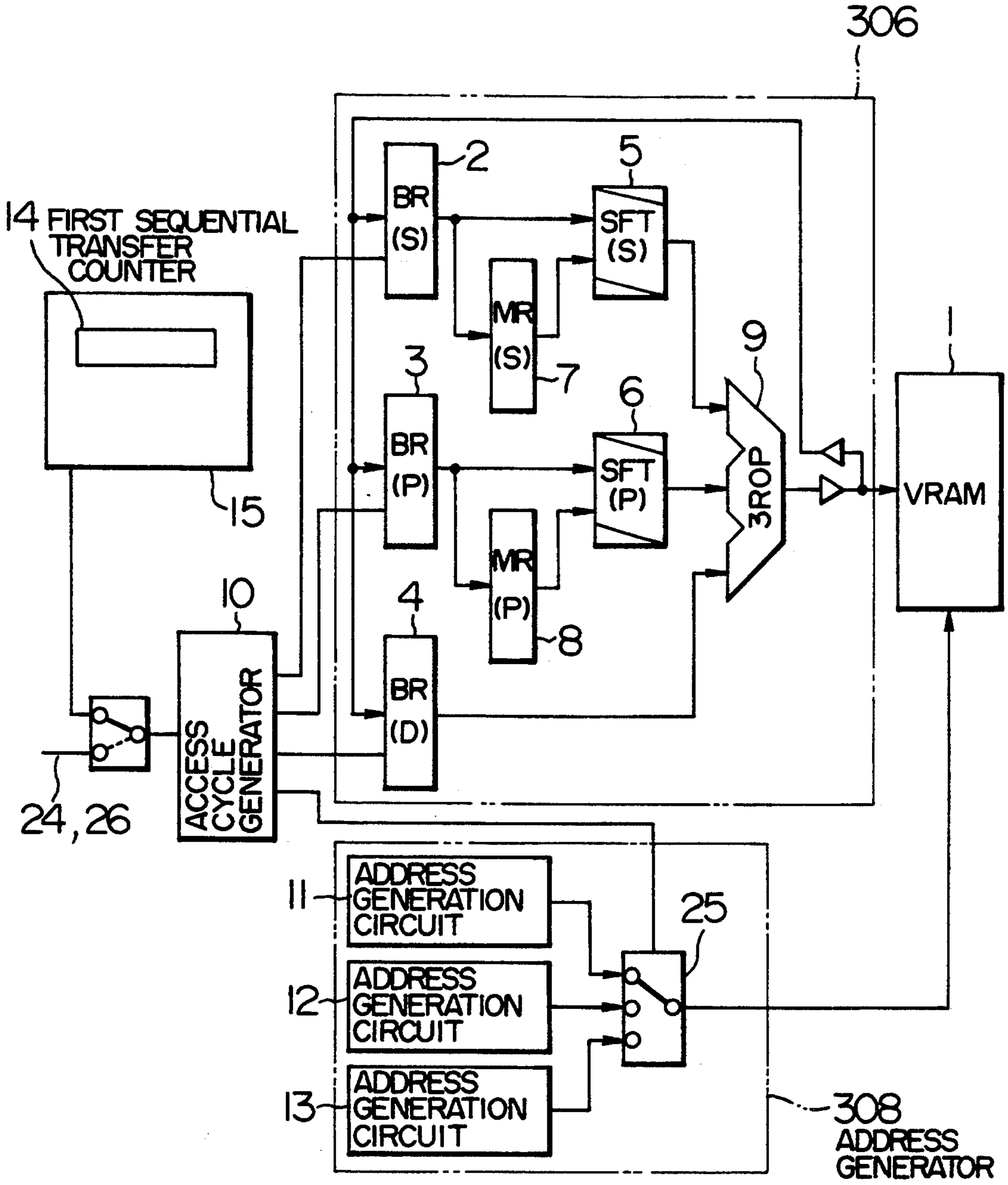
FIG. 1 is a block diagram showing a construction of an embodiment of bit block transfer support apparatus.
Figure 3:
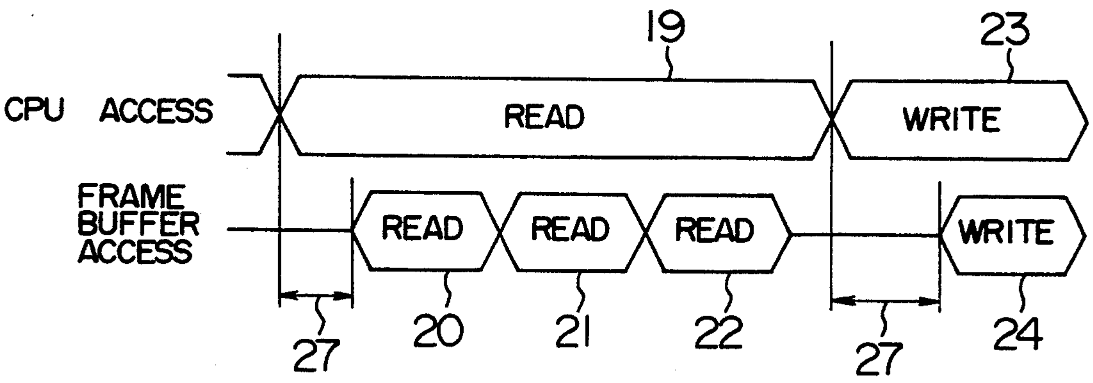
FIG. 3 is a timing chart showing the operation of a VRAM access cycle generator.
Figure 4:
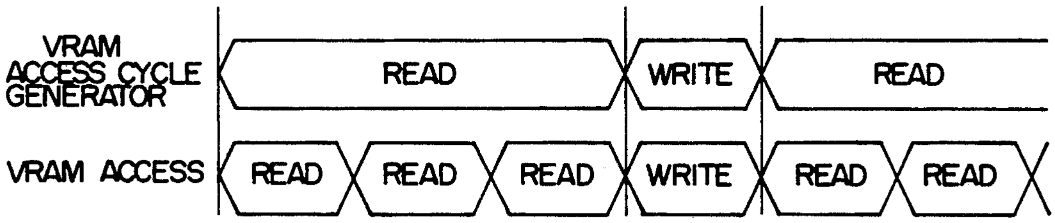
FIG. 4 is a timing chart for optimized bit block transfer.

A first sequential transfer sequencer 15 having, as shown in FIG. 1, a first sequential transfer counter 14 adapted to manage the number of transfer words within one raster generates a read/write cycle matching the access cycle for a VRAM in place of that for a CPU to eliminate overheads 27 as shown in FIG. 3 due to synchronization of the cycle time of the CPU with the cycle of the VRAM, in order that transfer can be carried out efficiently without pause on the same raster as shown in FIG. 4. The first sequential transfer sequencer 15 is started by causing the CPU to set the number of transfer words in the first sequential transfer counter 14, thus making it easy to operate the sequencer 15 with a program.

Figure 5:
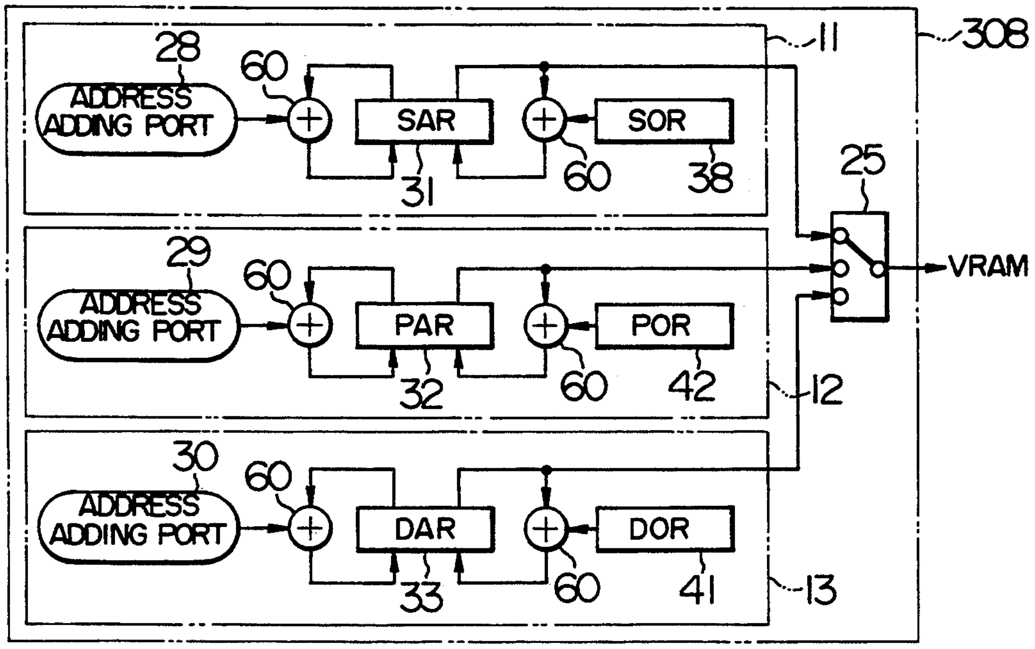
FIG. 5 is a block diagram showing a construction of an address generator provided with address adding ports.
Figure 6:
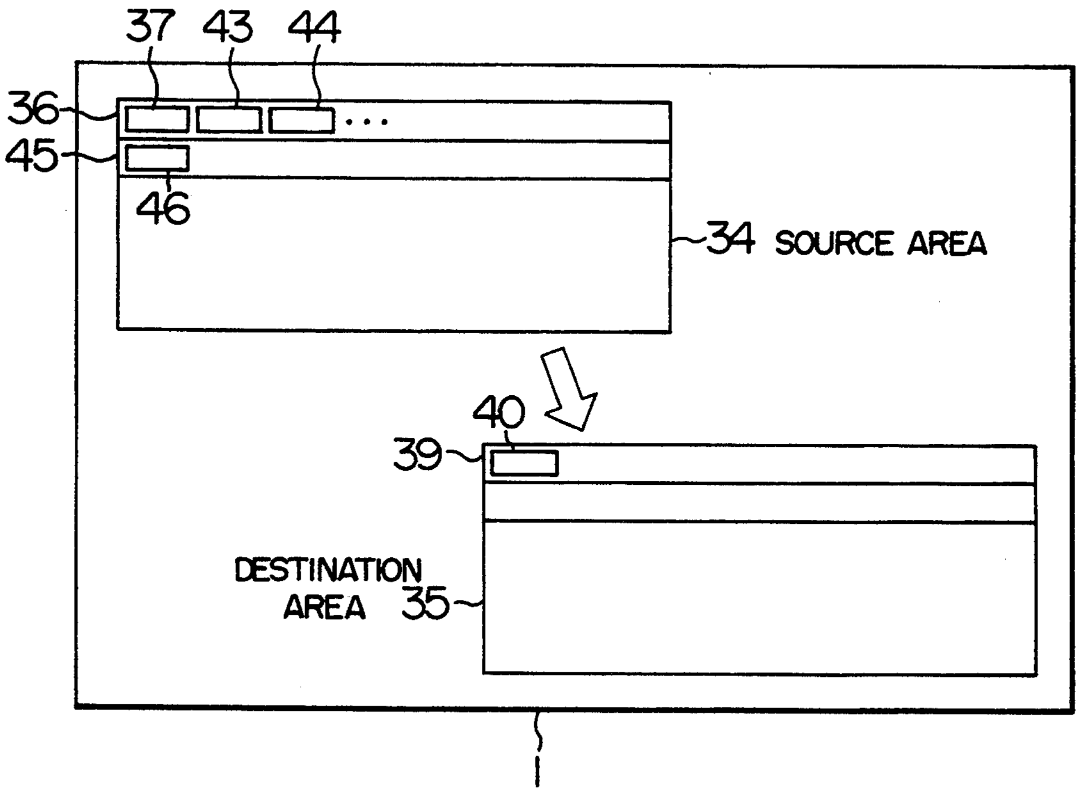
FIG. 6 is a diagrammatic representation showing the state of raster of a transfer area on the VRAM.

Address adding ports 28, 29 and 30 as shown in FIG. 5 can each produce a difference between an address of the last word of an object to transferred on a certain raster and an address of the head word of an object to be transferred on the next raster, and the difference is supplied to a source address register 31, a pattern address register 32 or a destination register 33 inside an address generator through an address adder 60 to update each register, so that the drawing control program is freed from the necessity of managing an address of the head word of an object to be transferred on each raster and consequently the number of setting operations for control registers and the like components can be reduced.

Figure 7:
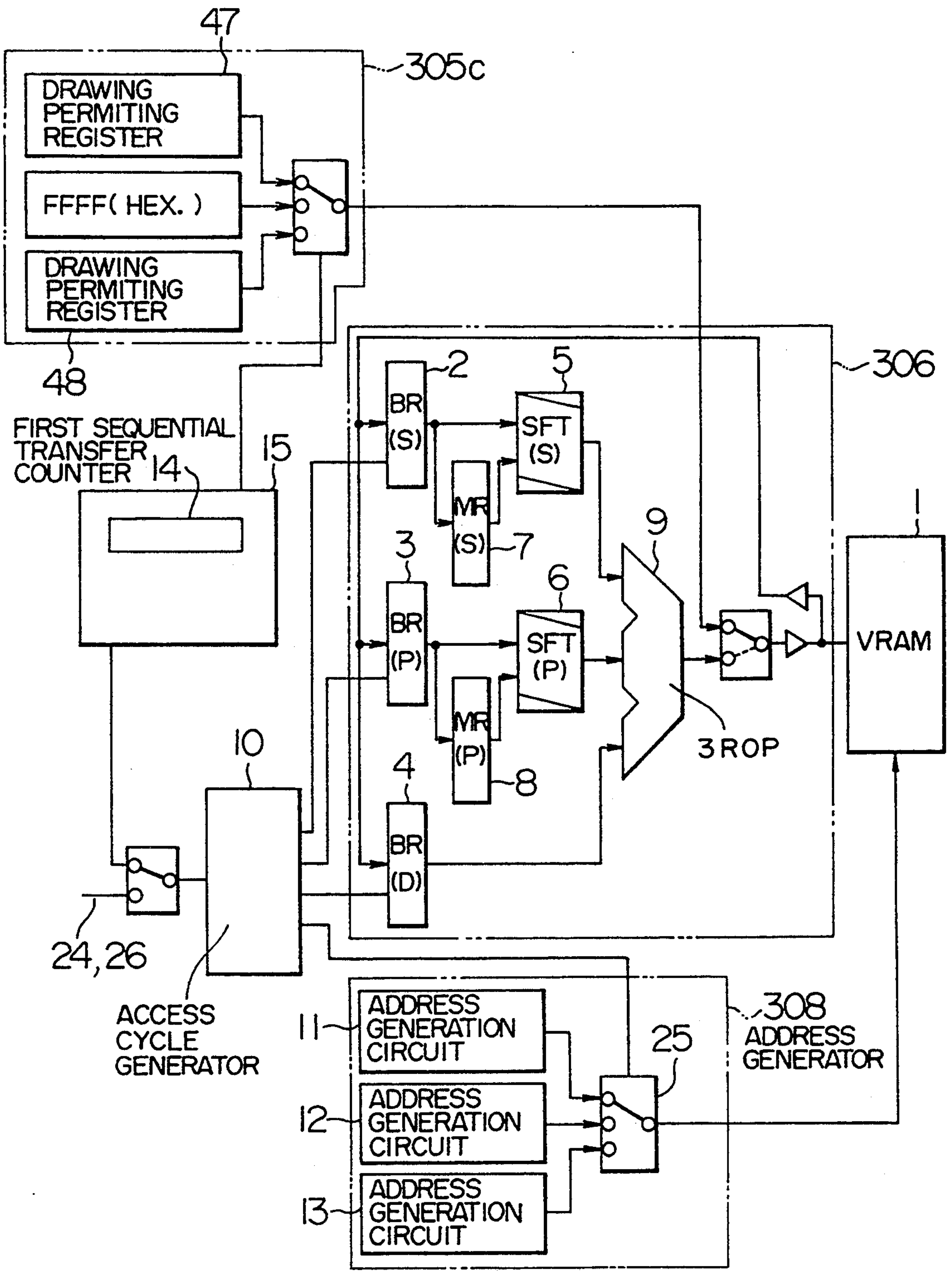
FIG. 7 is a block diagram showing a construction of another embodiment of bit block transfer support apparatus.
Figure 8:
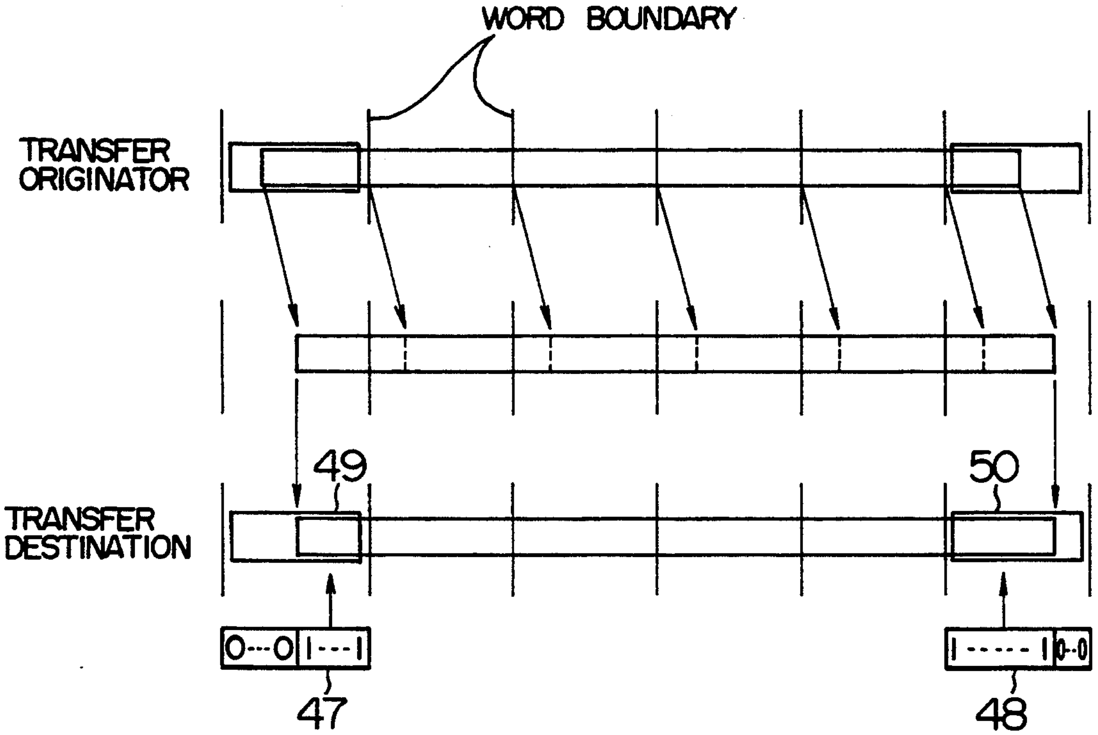
FIG. 8 is a diagrammatic representation showing the operation of a drawing permitting register.

Drawing permitting registers 47 and 48 as shown in FIG. 7 indicate drawing permitting areas in initial and last words within the same raster, respectively, and when a plurality of words on the same raster are transferred as shown in FIG. 8, the contents of the drawing permitting registers is used as bit mask data for the VRAM in order that an initial word can be written in bits 49 designated by the drawing permitting register 47 and a last word can be written in bits 50 designated by the drawing permitting register 48. Fixed values of FFFF(hexadecimal) are used as bit mask data of intermediate words other than the initial and last words. The fixed value signifies drawing over all the bits. Through this, even the VRAM carrying out read/write in unit of word can be allowed to effect transfer of a rectangle in unit of dot, thereby eliminating the necessity of processing the initial and last words specially.

Figure 9:
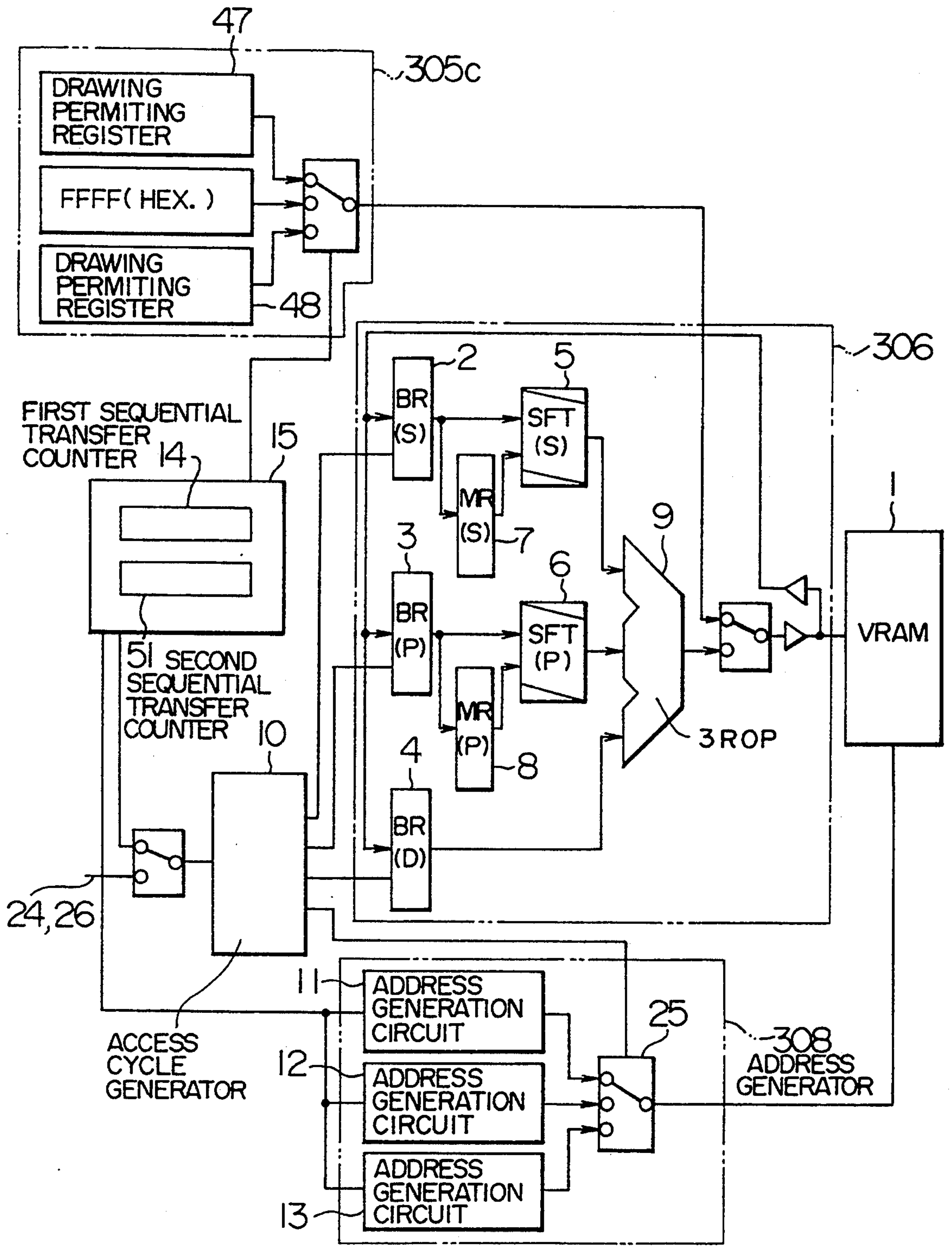
FIG. 9 is a block diagram showing a construction of still another embodiment of bit block transfer support apparatus.
Figure 10:
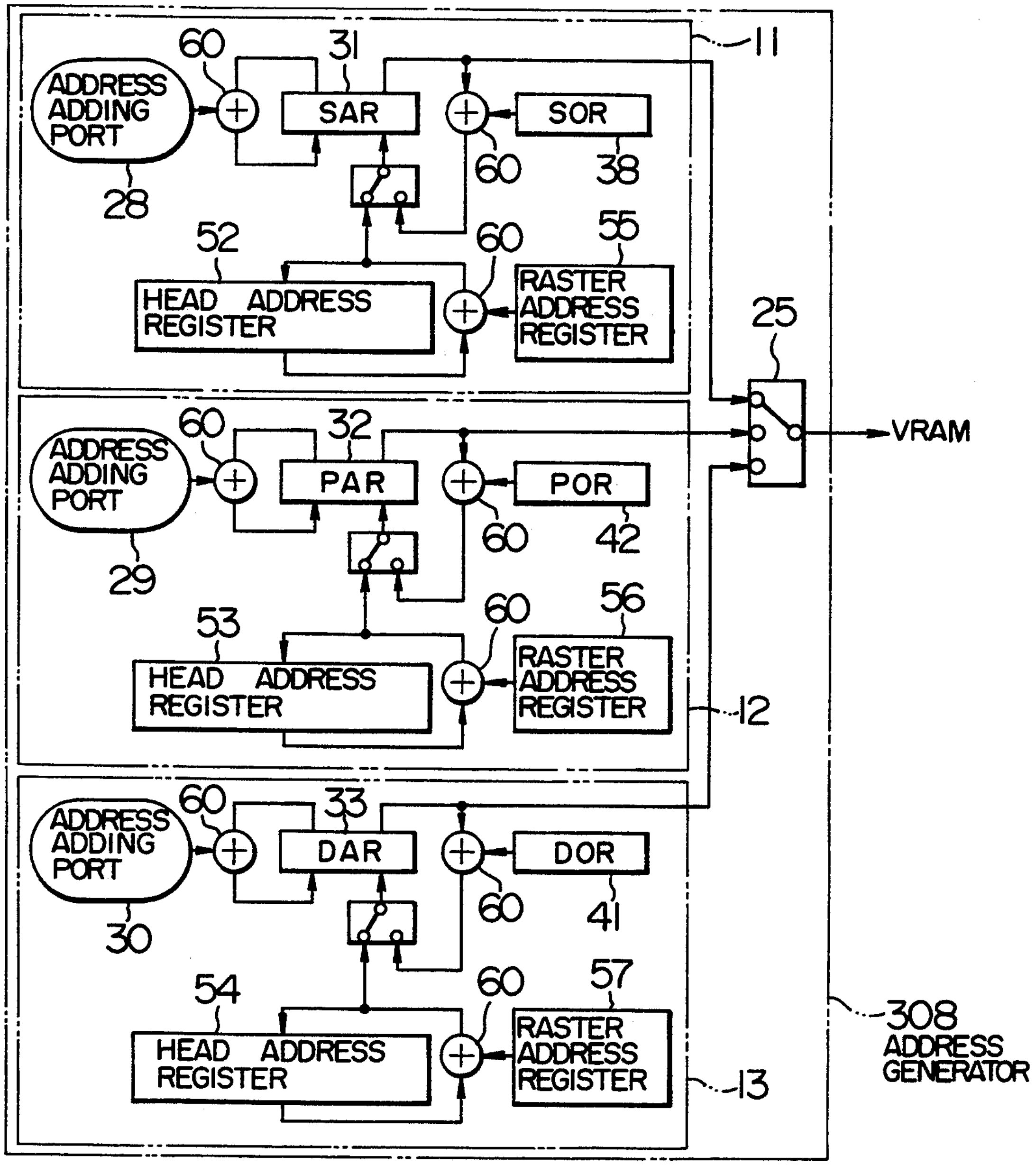
FIG. 10 is a block diagram showing a construction of an address generator provided with head address registers and raster address registers.

A second sequential transfer counter 51 as shown in FIG. 9 manages the number of transfer rasters. When transfer on one raster ends, values of head address registers 52, 53 and 54 inside address generator 308 as shown in FIG. 10 are respectively added with values of raster address registers 55, 56 and 57 each adapted to hold the number of words within the one raster to calculate an address of the head word of an area of an object to be transferred on the next raster, and the values of head address registers 52, 53 and 54 and the values of source address register 31, pattern address register 32 and destination address register 33 are updated. When the head address registers 52, 53 and 54 are set with values, the same values are set in the source address register 31, pattern address register 32 and destination register 33, respectively. Thus, when the number of transfer words within the same raster in the drawing permitting registers 47 and 48 and the head address registers 52, 53 and 54 of the address generators is set in the first sequential transfer counter 14 and the number of transfer rasters in the raster address registers 55, 56 and 57 is set in the second sequential transfer counter 51, transfer of a two-dimensional rectangular area can be carried out with ease. The fixed overhead for transfer of one horizontal raster indicated by equation (1), as represented by b, can be made to be zero.

Figure 11:
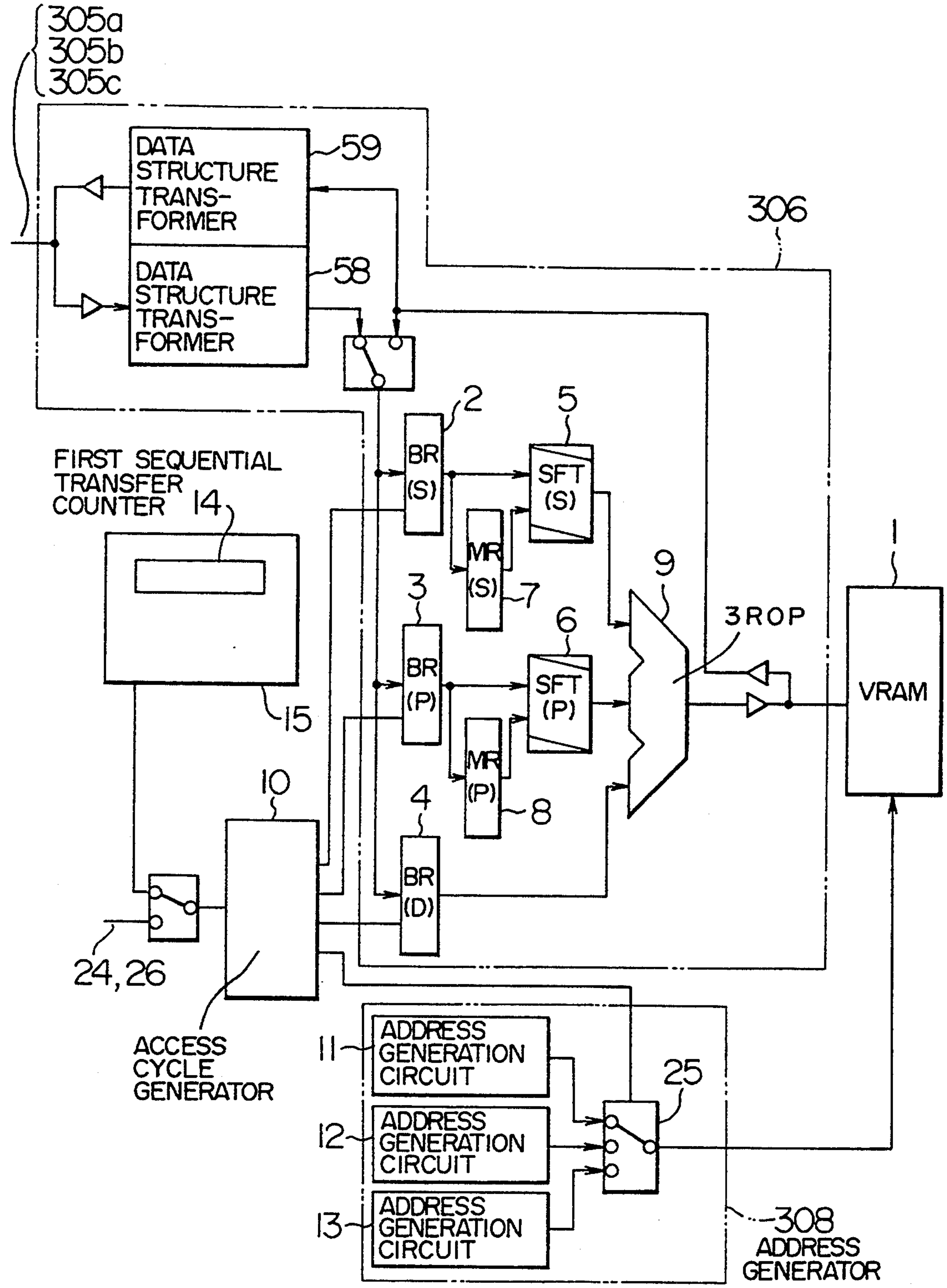
FIG. 11 is a block diagram showing still another embodiment of bit block transfer support apparatus.
Figure 12A:
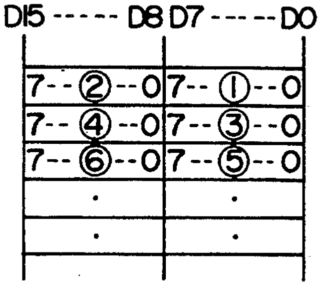
FIGS. 12A to 12D are diagrammatic representations showing different data structures.
Figure 12B:
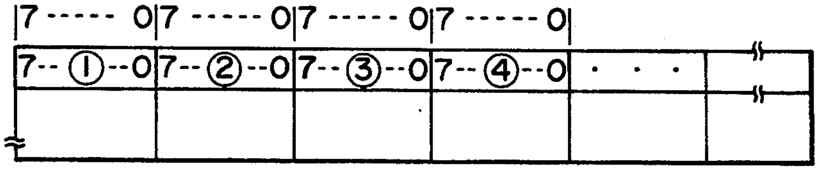
Figure 12C:
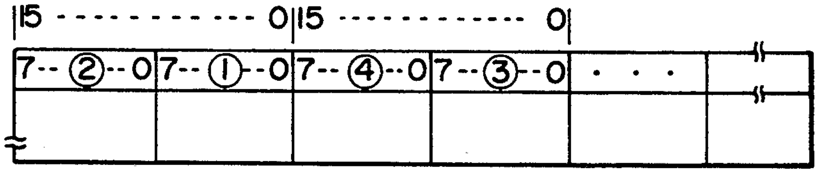
Figure 12D:
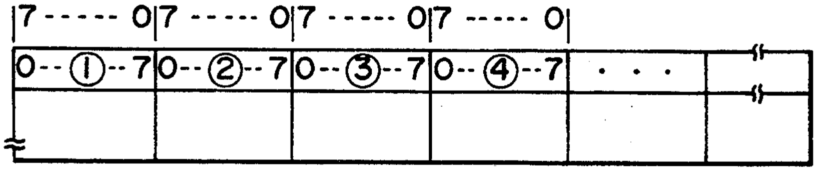

Data structure transformers 58 and 59 as shown in FIG. 11 each have the byte swap function to access data as shown in FIG. 12A in unit of word so that exchange between an upper byte and a lower byte may be effected to make the FIG. 12A data match a data structure as shown in FIG. 12B and the word mirror function to access data as shown in FIG. 12C in unit of word so that the arrangement of bits may be inverted to make the FIG. 12C data match a data structure as shown in FIG. 12D. Thus, the difference in data structure due to application programs can be absorbed.

2. Character Drawing

Figure 15:
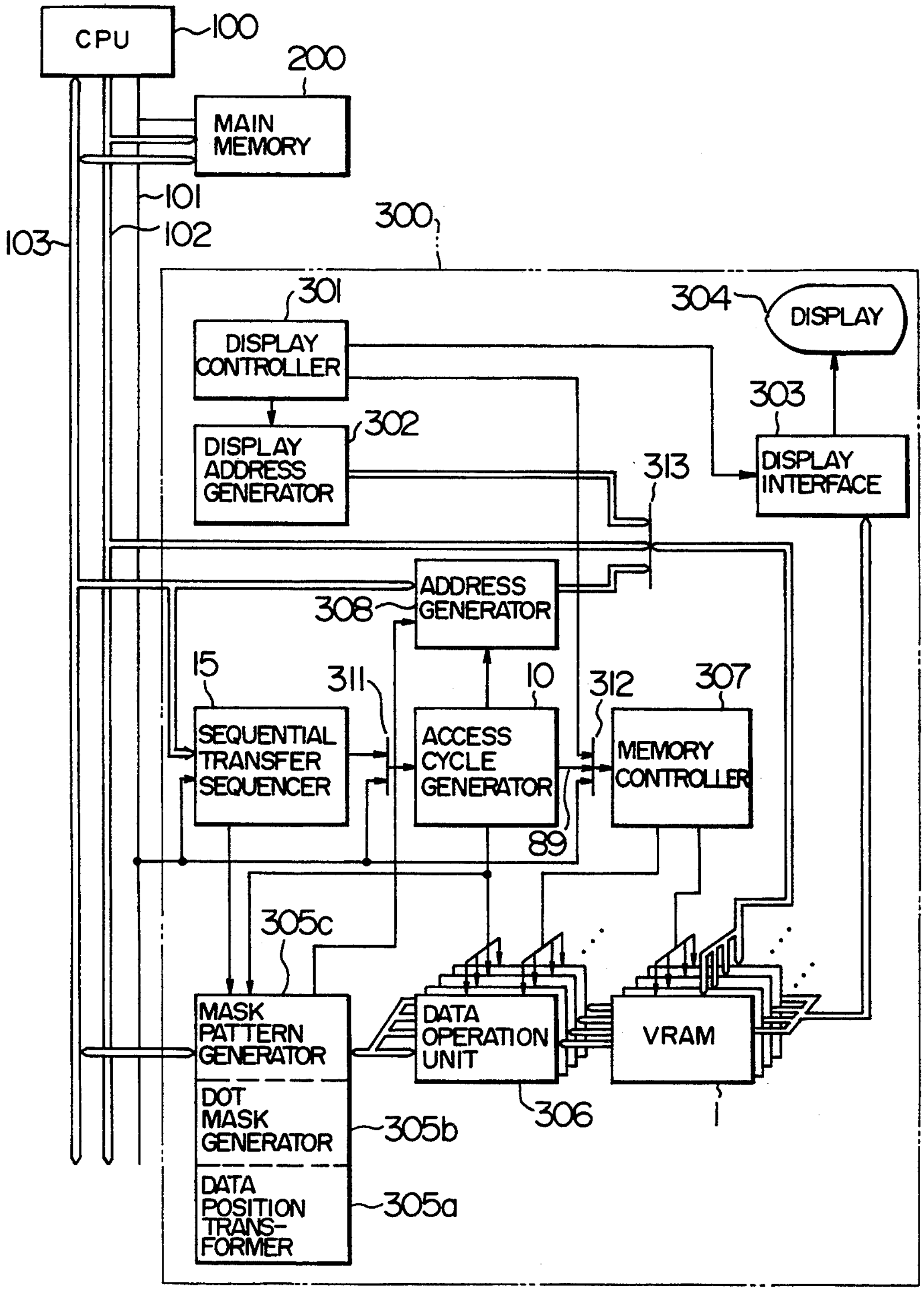
FIG. 15 is a schematic diagram showing an overall construction of a display/drawing apparatus according to the invention.

Referring to FIG. 15, a CPU 100 reads byte by byte character font data stored in a main memory 200 in unit of byte and writes read data in a VRAM 1. To this end, the CPU 100 may execute an instruction for transferring sequential data in unit of byte from main memory 100 to VRAM 1. Accordingly, if the data bus leading to the VRAM 1 is of, for example, 16 bits, the character font data develops alternately on lower 8 bits and upper 8 Wits of the 16-bit data bus. If the data bus leading to the VRAM 1 is of 32 bits, the character font data develops in sequence on lower to upper four 8-bit buses of the 32 bit data bus. A data position transformer 305*a* characteristic of the present invention operates to constantly put byte data from the CPU 100 to the left through an image on the screen while inserting data of zero in the remaining part of the bus and supply the left put data to a data operation unit 306.

Figure 16:
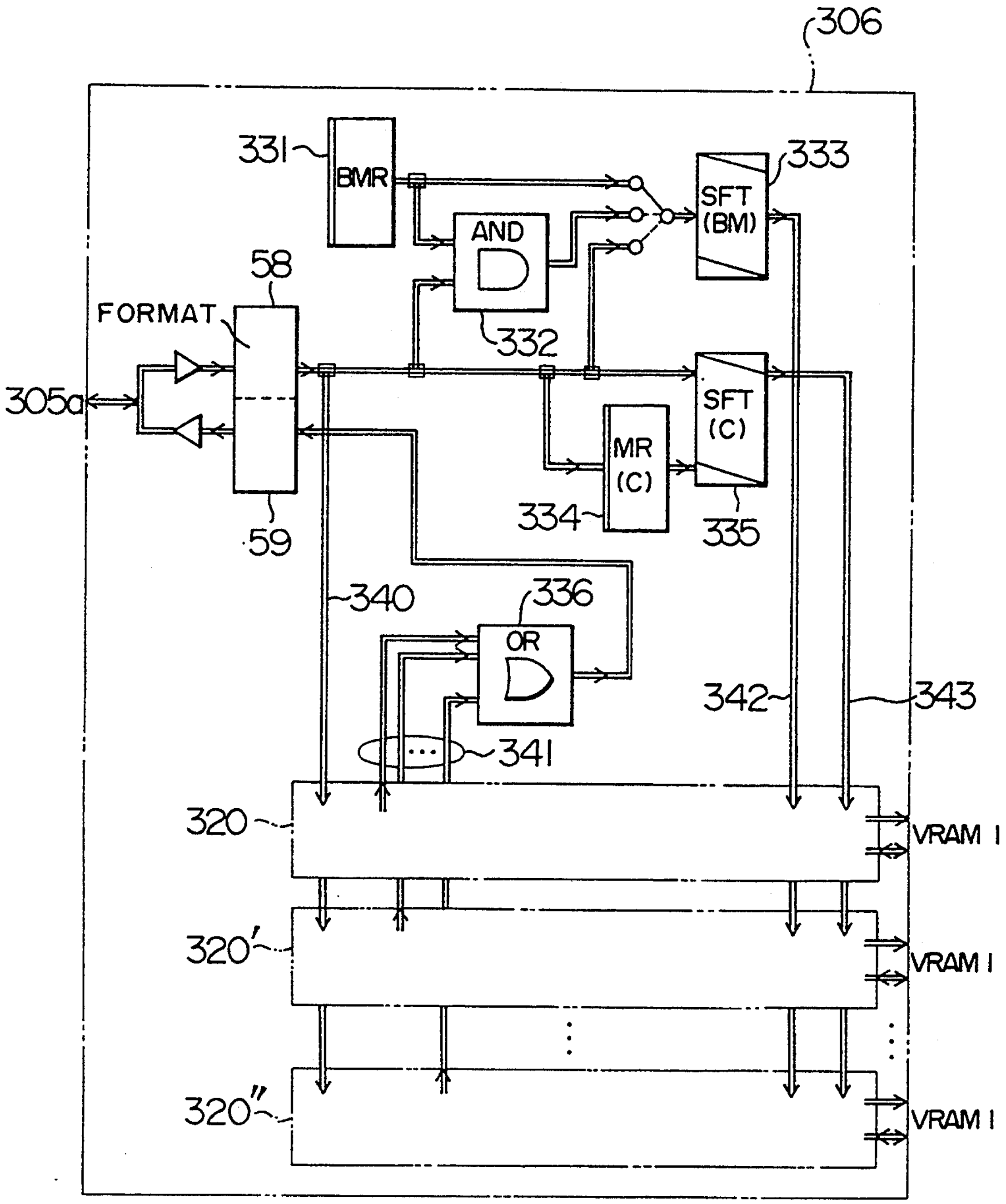
FIG. 16 is a diagram showing an example of construction of a data operation unit.

In the data operation unit 306, the received data is first passed through a data structure transformer 58 as shown in FIG. 16 and then subjected to data operation as follows depending upon how the character is drawn. (It is assumed herein that the data structure transformer 58 does not apply any processing to the inputted data but simply relays it to the succeeding stage.)

(1) In Case Where Only Font Part of Character is Drawn

The data delivered out of the data structure transformer 58 enters a shifter for bit mask 333 as shown in FIG. 16, in which it is shifted suitably, and is used to control writing the VRAM 1 in unit of bit. In other words, the VRAM 1 is rewritten at only a font part of a character and remains unchanged at the other portion. Since the character font data has been left put precedently, the bit mask shifter 333 may have a constant shift value. Data (character color) to be written into the VRAM 1 at that time is set in a buffer register 2 or 3 in advance and an operation for supplying the contents of the buffer register 2 or 3 to the VRAM 1 is designated to a three-value raster operator 9. If drawing of the character requires a raster operation for image data presently existent at an area to be drawn, i.e., an area being about to be drawn with the character and for character color to be drawn, the three-value raster operator 9 is so designated as to operate the contents of the buffer register 2 or 3 and the contents of a buffer register 4.

(2) In Case Where Foreground and Background are Drawn Simultaneously

Figure 17:
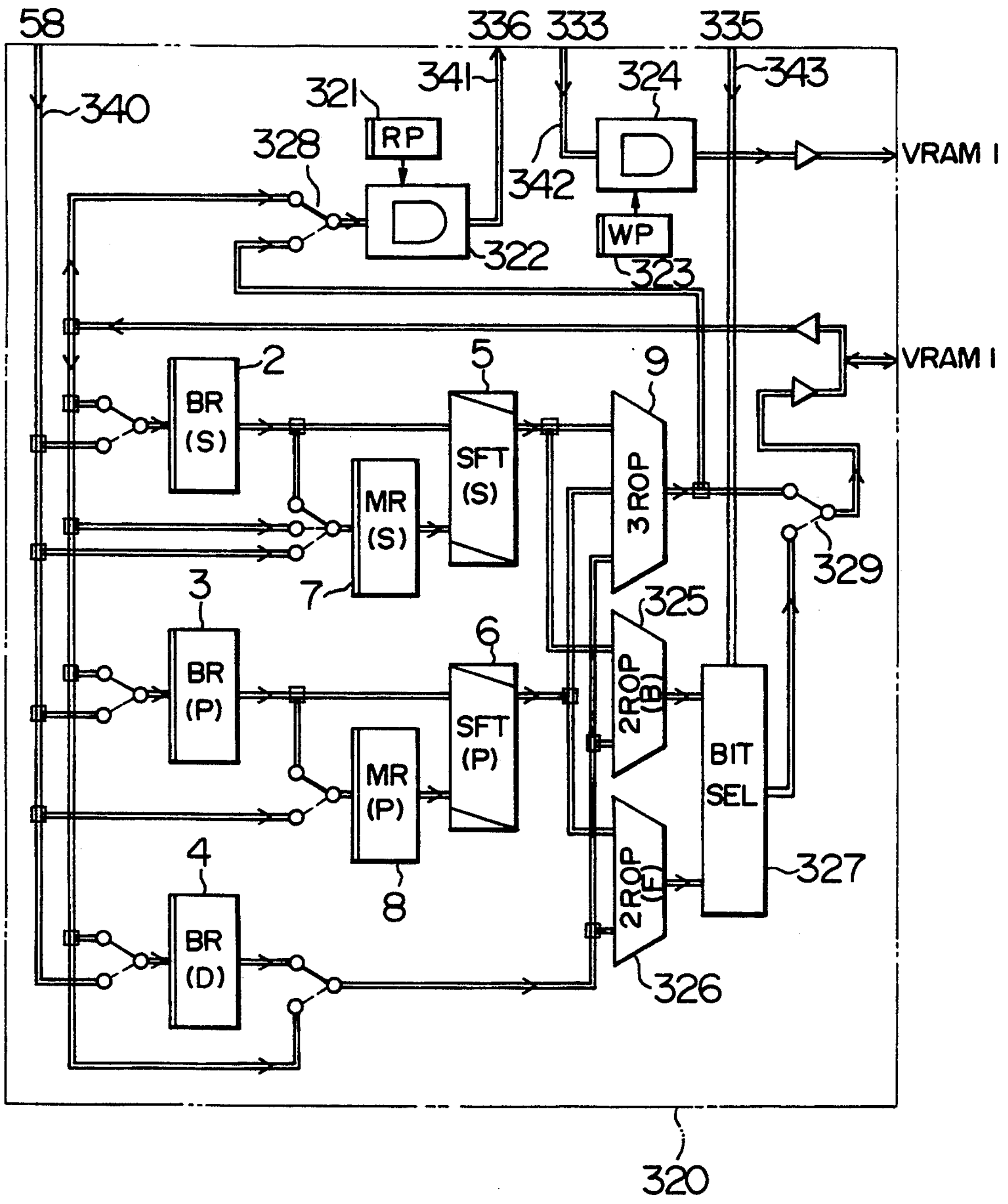
FIG. 17 is a diagram showing an example of construction of a plane unit portion of the data operation unit.

Data delivered out of the data structure transformer 58 enters a shifter 335 as shown in FIG. 16, in which it is shifted suitably as shown in FIG. 17, and is then supplied to a bit selection unit 327. Since the character font data has been left put precedently, the shifter may have a constant shift value during one vertical transfer. At that time, in order that only an 8-bit portion of VRAM 1 corresponding to a width of the character data is rewritten, writing only a portion thereof is permitted to write into a bit mask shift register 331 and another portion thereof is inhibited to write. The buffer register 3 is set with a foreground color corresponding to the font part of the character and the buffer register 2 is set with a background color corresponding to the other part than the font of the character; and as shown in FIG. 17, an operation for supplying the contents of the buffer register 3 to the VRAM 1 is designated to a two-value raster operator 326 and an operation for supplying the contents of the buffer register 2 to the VRAM 1 is designated to a two-value raster operator 325. If drawing of the character requires a raster operation with image data presently existent at a destination area, the two-value raster operator 326 is so designated as to operate the contents of the buffer registers 3 and 4 and the two-value raster operator 325 is so designated as to operate the contents of the buffer registers 2 and 4. The bit selection unit selects, in unit of bit, the output of the two-value raster operator 326 at the character font part and the output of the two-value raster operator 325 at the other part than the character font to produce write data which is supplied to the VRAM 1.

Used as a VRAM address at that time is not a CPU address but an address generated by the address generator as designated by 308. This is done with aim of accessing the VRAM 1 in the vertical direction. Accordingly, the destination address register 33 constituting the address generator 308 is precedently set with an address of VRAM 1 at which write of the character starts and a destination offset register 41 also constituting the address generator is precedently set with such an offset value that is added to the destination address register 33 to provide an address which is offset downwards by just one raster on the display screen. An access cycle generator 10 is so set as to generate a write access using the destination address register 33 when the CPU 100 generates a write cycle for the VRAM 1. If drawing of the character requires a raster operation with the destination area, the access cycle generator is so set as to generate a read access and a write access using the destination address register 33 when the CPU 100 generates a write cycle for the VRAM 1. Thus, during a preceding read access, image data presently existent at the destination area of the VRAM 1 is read into the buffer register 4 of each plane and during the next write access, a result of raster operation is again written into the destination area of the VRAM 1. As described previously, the destination address register 33 is permitted to be updated only after the write access ends. Each time that transfer of one vertical column ends, the destination address register 33 and shifters 333 and 335 are reset to be ready for transfer of the next one vertical column. This operation is repeated until the complete drawing of the character ends.

As a result, excepting the setting processing for the registers 333 and 335 the CPU is merely permitted to perform data transfer of the character font data, for the sake of drawing the character.

3. Line Segment Drawing

In the present invention, drawing of three kinds of line segments, i.e., a horizontal line segment, a vertical line segment and a 45° oblique line segment can be carried out at high speeds.

(1) Horizontal Line Drawing

Drawing of horizontal line segments will be described by referring to an instance where the length of a line segment is long and the other instance where it is short. The concept of length is relative and subjective and it is stipulated that the length herein be evaluated from the following point of view. In the case of a VRAM of plane type, the number of bits of VRAM data bus per plane equals the number of pixels accessible at a time. Namely, when the data bus is of 16 bits, data pieces of 16 pixels can be accessed at a time. Accordingly, a value lying between the number of pixels accessible at a time and about half the number is selected as a threshold, and a line segment constructed of more pixels than the threshold value is defined as a long line segment while a line segment constructed of less pixels than the threshold value is defined as a short line segment.

(1a) Horizontal Line Segment Drawing When Line Segment is Long

As shown in FIG. 15 drawing is carried out using the data operation unit 306, the address generator 308, the access cycle generator 10, the first sequential transfer counter 14 and a mask pattern generator **305*c*. The CPU 100 prepares a mask pattern for opposite ends of a line segment on the basis of coordinates of drawing start and end positions and sets the mask pattern in the mask pattern generator 305*c*. In this case, as in the precedence, a color of the line segment to be drawn is precedently set in the buffer register 2 or 3 as shown in FIG. 17 and an operation for supplying the contents of the buffer register 2 or 3 to the VRAM 1 is designated to the three-value raster operator 9. If drawing of the line segment requires a raster operation for image data presently existent at a destination area, i.e., an area being about to drawn with the line segment and for the line segment color to be drawn, the three-value operator 9 is so designated as to operate the contents of buffer register 2 or 3 and the contents of buffer register 4**.

Figure 18:
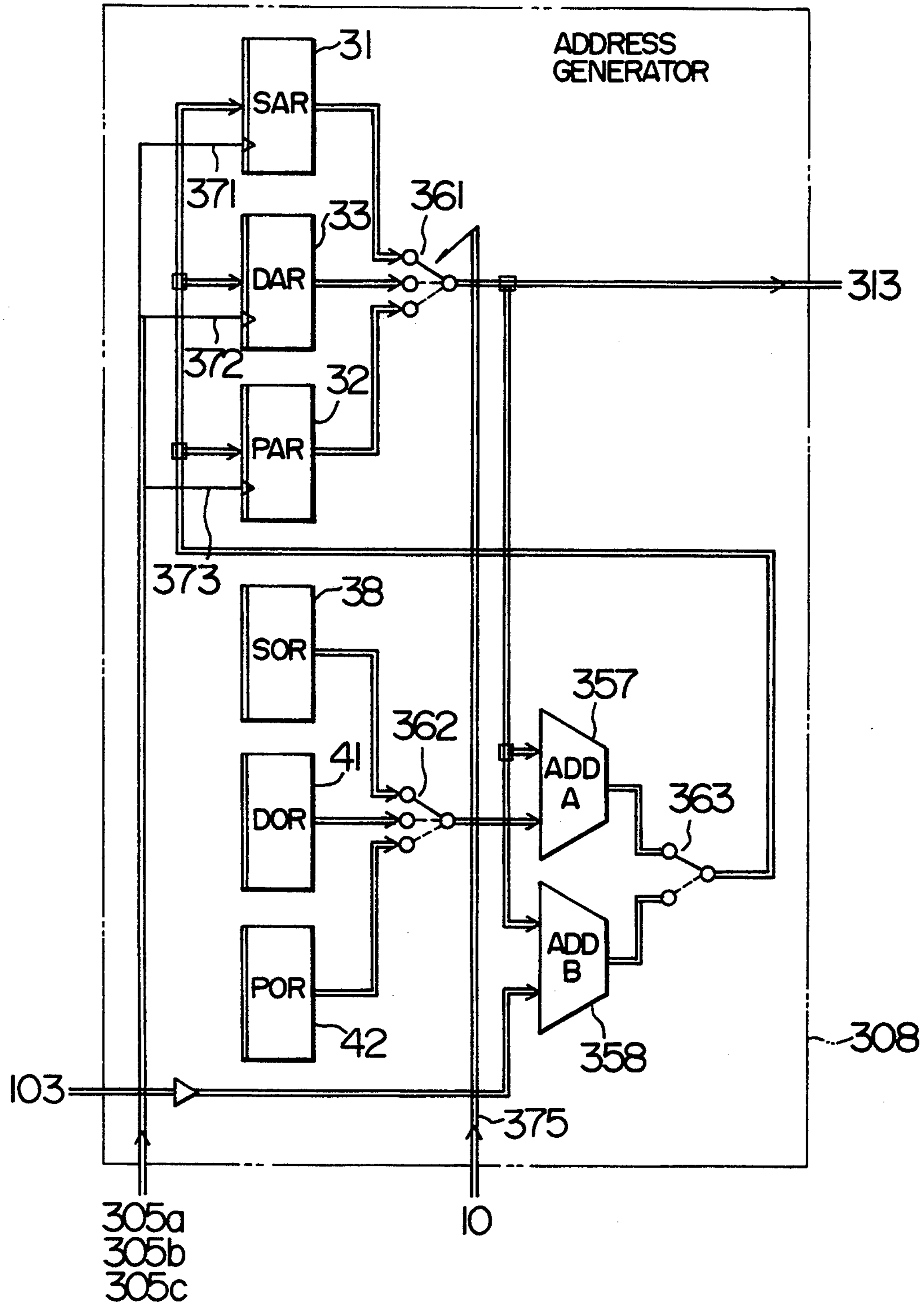
FIG. 18 is a diagram showing an example of construction of the address generator.
Figure 33:
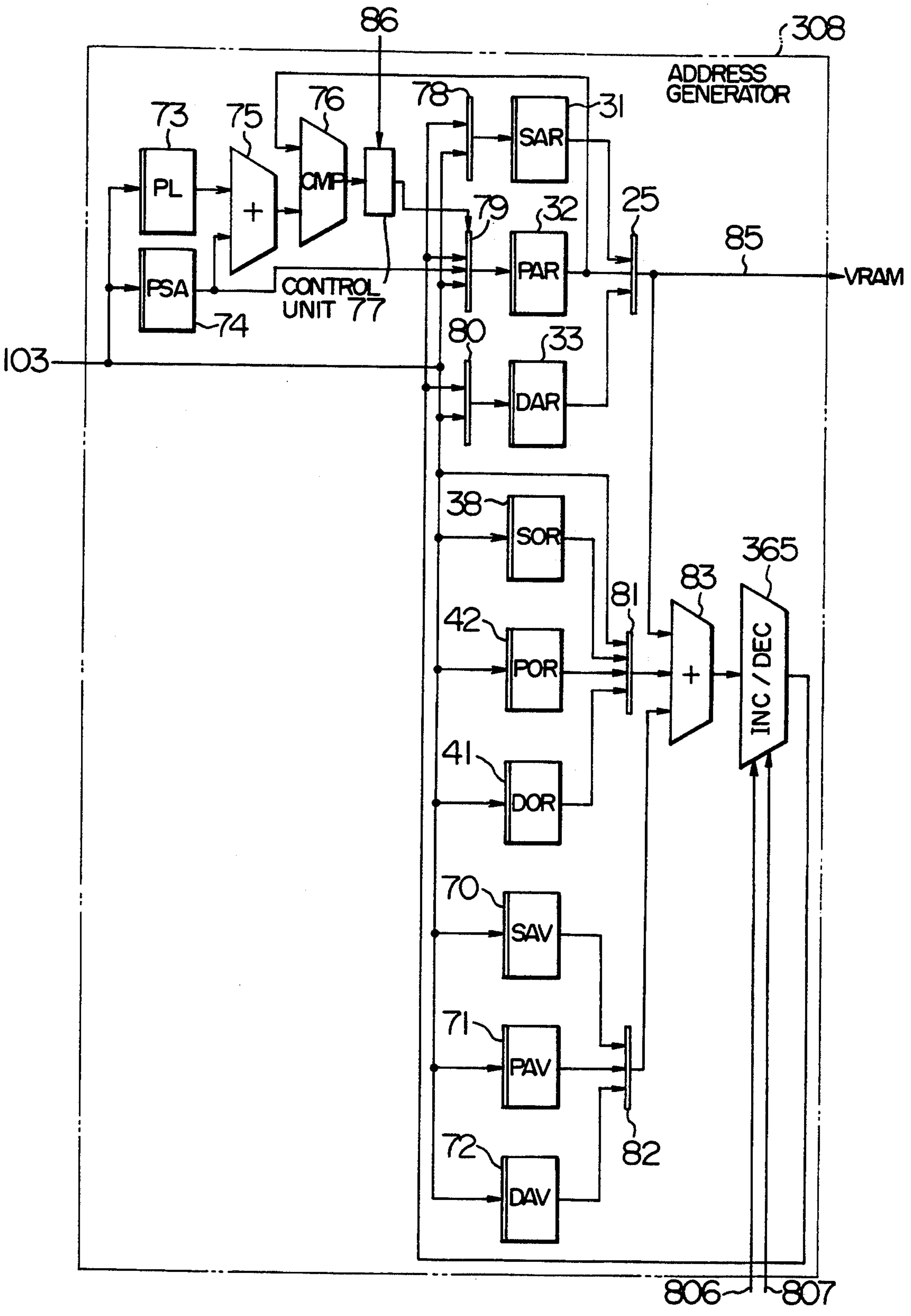
FIG. 33 is a diagram showing an example of construction of an address generator complying with drawing of a line segment at a desired angle.

An address of the VRAM 1 used for writing is not a CUP address but an address generated by the address generator 308 as shown in FIG. 33. As shown in FIG. 18, the destination address register 33 constituting the address generator 308 is precedently set with an address of VRAM 1 containing a pixel at the beginning of writing and the destination offset register 41 also constituting the address generator is precedently set with +1 when drawing is effected in the right direction but with −1 when drawing is done in the left direction. The access cycle generator 10 is so set as to generate a write access using the destination address register 33 when the first sequential transfer counter 14 generates a write cycle for the VRAM. If drawing of the line segment requires a raster operation of line segment color and destination area, the access cycle generator is so set as to generate a read access and a write access using the destination address register 33 when the first sequential transfer counter 14 generates a write cycle for the VRAM 1. Thus, during a preceding read access, image data presently existent at the destination area of the VRAM 1 is read into the buffer register 4 of each plane and during the next write access, a result of raster operation is again written into the destination area of the VRAM 1. As described previously, the destination address register 33 is permitted to be updated only after the write access ends.

After completion of the above pre-processing, a command for sequential write by the number of words to be drawn is supplied to the first sequential transfer counter 14 to draw a long horizontal line segment. With a VRAM 1 having a 16-bit data bus, drawing can be done by 16 pixels by 16 pixels at the maximum. If the raster operation is needed, a command for sequential read/-write by the number of words to be drawn may be supplied to the first sequential transfer counter 14.

(1b) Horizontal Line Segment Drawing When Line Segment is Short

As shown in FIG. 15 drawing is carried out using the data operation unit 306, the address generator 308, the access cycle generator 10, the first sequential transfer counter 14 and the dot mask generator **305*b*. The CPU 100 sets a bit pattern at the beginning of writing as an initial value in the dot mask generator 305*b*. The CPU also gives a command as to whether drawing is done in the right or left direction. As in the precedence, a color of a line segment to be drawn is set in the buffer register 2 or 3 in advance as shown in FIG. 17 and an operation for supplying the contents of the buffer register 2 or 3 to the VRAM 1 is designated to the three-value raster operator 9. If drawing of the line segment requires a raster operation for image data presently existent at a destination area, i.e., an area being about to be drawn with the line segment and for the color of the line segment to be drawn, the three-value raster operator 9 is so designated as to operate the contents of buffer register 2 or 3 and the contents of buffer register 4**.

An address of the VRAM 1 used for writing is not a CPU address but an address generated by the address generator 308 as shown in FIG. 33. The destination address register 33 constituting the address generator 308 is precedently set with an address of VRAM 1 containing a pixel at the beginning of writing and the destination offset register 41 also constituting the address generator is precedently set with zero. The access cycle generator 10 is so set as to generate a write access using the destination address register 33 when the first sequential transfer counter 14 generates a write cycle for the VRAM 1. If drawing of the line segment requires a raster operation of line segment color and destination area, the access cycle generator is so set as to generate a read access and a write access using the destination address register 33 when the first sequential transfer counter 14 generates a write cycle for the VRAM 1. Thus, during the preceding read access, image data presently existent at the destination area of the VRAM 1 is read into the buffer register 4 of each plane and during the next write access, a result of raster operation is again written into the destination area of the VRAM 1. As described previously, the destination address register 33 is permitted to be updated only after the write access ends.

After completion of the above pre-processing, a command for sequential write by the number of pixels to be drawn is supplied to the first sequential transfer counter 14 to draw a short horizontal line segment. Drawing is done pixel by pixel regardless of the data bus of the VRAM 1. The bit mask generator **305*b* rotates the bit pattern clockwise or counterclockwise every write operation and when the pixel to be drawn exceeds the word boundary of the VRAM 1, the destination address register 33 is changed by +1 or −1. In this method, writing of pixel is carried out in unit of dot but the CPU 100 need not be conscious of the word boundary to make this method suitable for drawing of short line segments. If the raster operation is needed, a command for sequential read/write by the number of pixels to be drawn may be supplied to the first sequential transfer counter 14**.

(2) Vertical Line Segment Drawing

As shown in FIG. 15 drawing is carried out using the data operation unit 306, the address generator 308, the access cycle generator 10, the first sequential transfer counter 14 and the dot mask generator **305*b*. The CPU 100 sets a bit pattern at the beginning of writing as an initial value in the dot mask generator 305*b*. The CPU also gives a command not to move the pattern in both the right and left directions. In this case, as in the precedence, color of the line segment to be drawn is precedently set in the buffer register 2 or 3 as shown in FIG. 17 and an operation for supplying the contents of the buffer register 2 or 3 to the VRAM 1 designated to the tertiary raster operator 9. If drawing of the line segment requires a raster operation for image data presently existent at a destination area, i.e., an area being about to be drawn with the line segment and for line segment color to be drawn, the three-value raster operator 9 is so designated as to operate the contents of buffer register 2 or 3 and the contents of buffer register 4**.

An address of the VRAM 1 used for writing is not a CPU address but an address generated by the address generator 308 shown in FIG. 33. The destination address register 33 constituting the address register 308 is set with an address of VRAM 1 containing a pixel at the beginning of writing. The destination offset register 41 is set with such an offset value that is added to the destination address register 33 to provide an address which is offset upwards by just one raster on the display screen when drawing is effected upwards on the screen but when drawing is effected downwards on the screen, it is set with such an offset value that is added to the destination address register 33 to provide an address which is offset downwards by just one raster on the display screen. The access cycle generator 10 is so set as to generate a write access using the destination address register 33 when the first sequential transfer counter 14 generates a write cycle for the VRAM 1. If drawing of the line segment requires a raster operation of of line segment color and destination area, the access cycle generator is so set as to generate a read access and a write access using the destination address register 33 when the first sequential transfer counter 14 generates a write cycle for the VRAM 1. Thus, during the preceding read access, image data presently existent at the destination area of the VRAM 1 is read into the buffer register 4 of each plane and during the next write process, a result of raster operation is again written into the destination area of the VRAM 1. As described previously, the destination address register 33 is permitted to be updated only after the write access ends.

After completion of the above pre-processing, a command for sequential write by the number of pixels to be drawn is supplied to the first sequential transfer counter 14 to draw a vertical line segment. Drawing is done pixel by pixel regardless of the data bus of the VRAM 1. If the raster operation is needed, a command for sequential read/write by the number of pixels to be drawn may be supplied to the first sequential transfer counter 14.

(3) 45° Oblique Line Segment Drawing

As shown in FIG. 15 drawing is carried out using the data operation unit 306, the address generator 308, the access cycle generator 10, the first sequential transfer counter 14 and the dot mask generator **305*b*. The CPU 100 sets a bit pattern at the beginning of writing as an initial value in the dot mask generator 305*b*. The CPU also gives a command as to whether drawing is done in the right or left direction. As in the precedence, color of a line segment to be drawn is set in the buffer register 2 or 3 in advance as shown in FIG. 17 and an operation for supplying the contents of the buffer register 2 or 3 to the VRAM 1 is designated to the tertiary raster operator 9. If drawing of the line segment requires a raster operation for image data presently existent at a destination area, i.e., an area being about to be drawn with the line segment and for color of the line segment to be drawn, the tertiary raster operator 9 is so designated as to operate the contents of buffer register 2 or 3 and the contents of buffer register 4**.

An address of the VRAM 1 used for writing is nor a CPU address but an address generated by the address generator 308 as shown in FIG. 33. The destination address register 33 constituting the address generator 308 is set with an address of VRAM 1 containing a pixel at the beginning of writing. The destination offset register 41 is precedently set with such an offset value that is added to the destination address register 33 to provide an address which is offset upwards by just one raster on the display screen when drawing is effected upwards on the screen but when drawing is effected downwards on the screen, it is set with such an offset value that is added to the destination address register 33 to provide an address which is offset downwards by just one raster on the display screen. The access cycle generator 10 is so set as to generate a write access using the destination address register 33 when the first sequential transfer counter 14 generates a write cycle for the VRAM 1. Thus, during the preceding read access, image data presently existent at the destination area of the VRAM 1 is read into the buffer register 4 of each plane and during the next write process, a result of raster operation is again written into the destination area of the VRAM 1. As described previously, the destination register 33 is permitted to be updated only after the write access ends.

After completion of the above pre-processing, a command for sequential write by the number of pixels to be drawn is supplied to the first sequential transfer counter 14 to draw a 45° oblique line segment in a desired direction. Specifically, the bit mask generator **305*b* rotates the bit pattern clockwise or counterclockwise every write operation and the value of the destination address register 33 is moved by one raster upwards or downwards. Also, when the pixel to be drawn exceeds the word boundary of the VRAM 1, the destination address register 33 is changed, in addition to its one raster upward or downward movement, by +1 or −1, so that the CPU need not be conscious of the word boundary to draw the 45° oblique line segment. If the raster operation is needed, a command for sequential read/write by the number of pixels to be drawn may be supplied to the first sequential transfer counter 14**.

Grounded on the understanding of the gist of the present invention set forth so far, embodiments of the invention will now be described.

FIG. 15 is a schematic block diagram showing the overall construction of a display drawing apparatus 300. The apparatus 300 cooperates with the CPU (central processor unit) 100 and the memory 200. The CPU, memory and apparatus are coupled to a system bus including an address bus 102, a data bus 103 and a control bus 101, to place the above components under the control of the CPU 100. The whole of the CPU 100, memory 200 and apparatus 300 may be a subsystem of a larger system.

The apparatus 300 comprises, as its drawing system, the VRAM 1 drawing system and having a plane structure for storage of image data,the data operator 306 for processing and operating data to be drawn directly on the VRAM 1, a memory controller 307 for controlling access timing for the VRAM 1 and the like in accordance with an access request from a host access request source (a display controller 301 to be described later, the CPU 100 or the access cycle generator 10 to be detailed later), the access cycle generator for expanding an access request from a host access request source (the CPU 100 or the first sequential transfer sequencer 15 to be detailed later) into one or more accesses to start the memory controller 307 through a selector 312, the address generator 308 for generating addresses for the VRAM 1 without resort to the CPU 100, the first sequential transfer sequencer for starting the access cycle generator 10 by a set number of occurrence of accesses through a selector 311, the mask pattern generator **305*c* used in combination with the first sequential transfer sequencer 15 to contribute to controlling the drawing area, dot position and letter development, the dot mask generator 305*b*, and a data position transformer 305*a*; and comprises, as its display system, the display controller 301 taking charge of display timing, a display address generator 302, an address selector 313 for switching display address and drawing address, a display 304 such as CRT or flat display and a display interface 303 including a palette memory and a DAC. Preferably, an access request timing for the access cycle generator 10 generated when the first sequential transfer sequencer 15 is started is made to be equal to an access request timing generated for the access cycle generator 10 by the CPU 100. Through this, the access cycle generator 10 can operate equally for different start originators which are the CPU 100 and the first sequential transfer sequencer 15. Similarly, an access request timing for the memory controller 307 generated when the access cycle generator 10 is started is preferably made to be coincident with an access request timing generated for the memory controller 307 by the CPU 100. This ensures that the memory controller 307 can operate equally regardless of the start originators of CPU 100 and access cycle generator 10**.

The FIG. 15 construction is common to embodiments of bit block transfer, letter drawing and line segment drawing to be described hereinafter. The block described as being divided by dotted line into three functional elements of mask pattern generator 305*c*, dot mask generator 305*b* and data position transformer 305*a* will act as the mask pattern generator 305*c* during bit block transfer, as the data position transformer 305*a* during letter drawing and as the mask pattern generator 305*c* or dot mask generator 305*b* during line segment drawing. This will be detailed later. Accordingly, functional element or elements not used for practicing the invention may be omitted. The display drawing apparatus 300 of the invention will be described in greater detail in connection with each of the bit block transfer, letter drawing and line segment drawing.

1. Bit Block Transfer

1.1 First Embodiment

The bit block transfer is a general term of a variety of transfer processings. One of the simplest processings is to paint out a designated area of the VRAM 1 with a certain color and one of the sophisticated processings is to read three kinds of data of source, pattern and destination and to effect a three-value raster operation to provide a result which is written as destination into a designated area of the VRAM 1. A first embodiment of the bit block transfer according to the invention will now be described. As described previously, FIG. 15 shows an example of the overall construction of the present embodiment. The data operation unit 300 in the figure has portions 320, 320′ and 320″ common to the whole plane of the VRAM 1 shown in FIG. 16 and these portions have the same construction as that shown for the portion 320 in FIG. 17.

The portions 320, 320′ and 320″ common to the whole plane of the data operation unit 306 of FIG. 16 comprises, as shown in FIG. 17, the data structure transformers 58 and 59 for transforming the format of external data by using mirror image inversion and swap separately or in combination, the bit mask register 331 for controlling writing to the VRAM 1 in unit of bit, an AND circuit for ANDing the contents of bit mask register 331 and the data of data structure transformer 58 bit by bit, the shifter 333 for bit mask for shifting data of the bit mask register 331, data structure transformer 58 or AND circuit 332, a merge register 334 for holding the previous contents of data of the data structure transformer 58, the shifter 335 for shifting data of the data structure transformer 58 and data of the merge register 334, and a read data synthesizer 336 for ORing bits of the contents of a plane unit read data output controller 322 of each plane to be described later so as to synthesize read data supplied to the CPU 100. The necessity and operation of the data structure transformer 58 will be described later in connection with a sixth embodiment of the bit block transfer of the invention and reference should be made to a detailed description therein.

The plane unit portion 320 of the data operation unit 306 comprises, as shown in FIG. 17, a read plane selector 321 for storing data used to select permissibility or impermissibility of reading the VRAM in unit of plane, a plane unit read data output controller 322 responsive to read plane selection information stored and held in the read plane selector 321 to supply data selected by a read data selector 328 to be described later to the read data synthesizer 336 shown in FIG. 16 through a signal line group 341, a write plane selector 323 for selecting permissibility or impermissibility of writing the VRAM in unit of plane, a plane bit mask unit 324 for synthesizing the output of the write plane selector and the output of the bit mask shifter 333 shown in FIG. 16 through a signal line 342 and controlling, in unit of bit, writing of each plane of the VRAM 1, a buffer register 2 for holding data of the VRAM 1 or data structure transformer 58 as data of a source area through a signal line 340, a buffer register 3 for holding data of the VRAM 1 or data structure transformer 58 as data of a pattern area, a buffer register 4 for holding data of the VRAM 1 or data structure transformer 58 as data of a destination area, a merge register 7 for holding the previous contents of data of the VRAM 1, buffer register 2 or data structure transformer 58, a merge register 8 for holding the previous contents of data of the buffer register 3 or data structure transformer 58, a shifter 5 for shifting data of the buffer register 2 and data of the merge register 7, a shifter 6 for shifting data of the buffer register 3 and data of the merge register 8, a three-value raster operator 9 for performing logical operation by using as inputs the contents of shifter 5 the contents of shifter 6 and the contents of buffer register 4 or VRAM 1, a two-value raster operator 325 for performing logical operation by using as inputs the contents of the shifter 5 and buffer register 4, a two-value raster operator 326 for performing logical operation by using as inputs the contents of the shifter 6 and buffer register 4, a bit selector 327 for selecting, when the value of each bit of the output of shifter 335 shown in FIG. 16, received through a signal line 343, is zero, the output data of two-value raster operator 325 at that bit position and selecting, when the value of each bit of the output of shifter 335 shown in FIG. 16 is one, the output data of two-value raster operator 326 at that bit position, a write data selector 329 for supplying the contents of the three-value raster operator 9 or the contents of the bit selector 327 to the VRAM 1, and a read data selector 328 for supplying the data of the VRAM 1 or the contents of the three-value raster operator 9 to the plane unit read data output controller 322 when the plane is selected by the read plane selector 321. The above is an exemplary construction of the data operation unit 306 shown in FIG. 15.

An example of construction of the address generator 308 of FIG. 15 is shown in FIG. 18. The address generator 308 comprises a source address register 31 for holding an address of a source area on the VRAM 1, a destination address register 33 for holding an address of a destination area, a pattern address register 32 for holding an address of a pattern area, a source offset register 38 for holding a value added to the contents of the source address register 31 to update the same when a read access cycle by the access cycle generator 10 to be described later ends, a destination offset register 41 for holding a value added to the contents of the destination address register 33 to update the same when a write access cycle by the access cycle generator 10 to be described later ends, a pattern offset register 42 for holding a value added to the contents of the pattern address register 32 to update the same when the read access cycle by the access cycle generator 10 to be described later ends, an address adder 357 for adding the contents of source address register 31 and that of source offset register 38, the contents of destination address register 33 and that of destination offset register 41 or the contents of pattern address register 32 and that of pattern offset register 42 so as to update the value of each address register, and an address adder 358 for adding the write data of CPU 100 and the contents of source address register 31, destination address register 33 or pattern address register 32 so as to update the value of each address register. In the figure, switching signals for address register selector 361 and offset register selector 362 are shown as supplied through a collective signal line 375 and source address register, destination address register and pattern address register updating signals 371, 372 and 373 are shown as supplied through a collective signal line. These signal lines are fed with an object area selection signal 86 delivered out of an object area signal generator 115 which will be described in connection with an example (FIG. 35) of the construction of access cycle generator 10 to be described later.

Examples of operations of the access cycle generator 10 are shown in Tables 1 and 2.

TABLE 1

| Item | Examples of Read Operations of Access Cycle Generator<br>Source area read | Pattern area read | Desination area read |
|---|---|---|---|
| 1 | O* | | |
| 2 | | O* | |
| 3 | O* | O* | |
| 4 | | | O |
| 5 | O* | | O |
| 6 | | O* | O |
| 7 | O* | O* | O |

The address register is updated after completion of read in operations hatted with *.

TABLE 2

| Item | Examples of Write Operations of Access Cycle Generator<br>Destination area read | Destination area write |
|---|---|---|
| 1 | | O* |
| 2 | O | O* |

The address register is updated after completion of write in operations hatted with *.

When receiving a request for reading the VRAM 1 from the CPU 100 or the first sequential transfer sequencer 15 to be detailed later, the access cycle generator 10 generates a read access containing at least one of access operations to the source, destination and pattern areas by using the address generators 308 in the manner shown in Table 1 and drives the memory controller 307 (FIG. 15) for the VRAM 1. In other words, the access cycle generator 10 has the function of expanding one read request into a plurality of read access operations. As shown in FIG. 17, read data from the VRAM 1 at that time is stored in the buffer register 2 in the case of source area read, in the buffer register 3 in the case of pattern area read or in the buffer register 4 in the case of destination area read. Upon the source area read, the value previously stored in the buffer register 2 is moved to the merge register 7 and upon the pattern area read, the value previously stored in the buffer register 3 is moved to the merge register 8.

When receiving a request for writing the VRAM 1 from the first sequential transfer sequencer 15 to be detailed later, the CPU 100 generates a write access or the combination of read access and write access to a destination area by using the address generator 308 in the manner shown in Table 2 and drives the memory controller 307 (FIG. 15) for the VRAM 1. In the case of destination area read, read data from the VRAM 1 is stored in the buffer register 4 shown in FIG. 17. Item 2 in Table 2 is provided so that a raster operation of write data and destination data may be effected even when sequential write access by the CPU 100 or the first sequential transfer sequencer 15 to be detailed later proceeds. When sequential read and write access by the CPU 100 or the first sequential transfer sequencer 15 proceeds, drawing is usually effected using items 1 to 7 in Table 1 and item 1 in Table 2 in combination.

Figure 29:
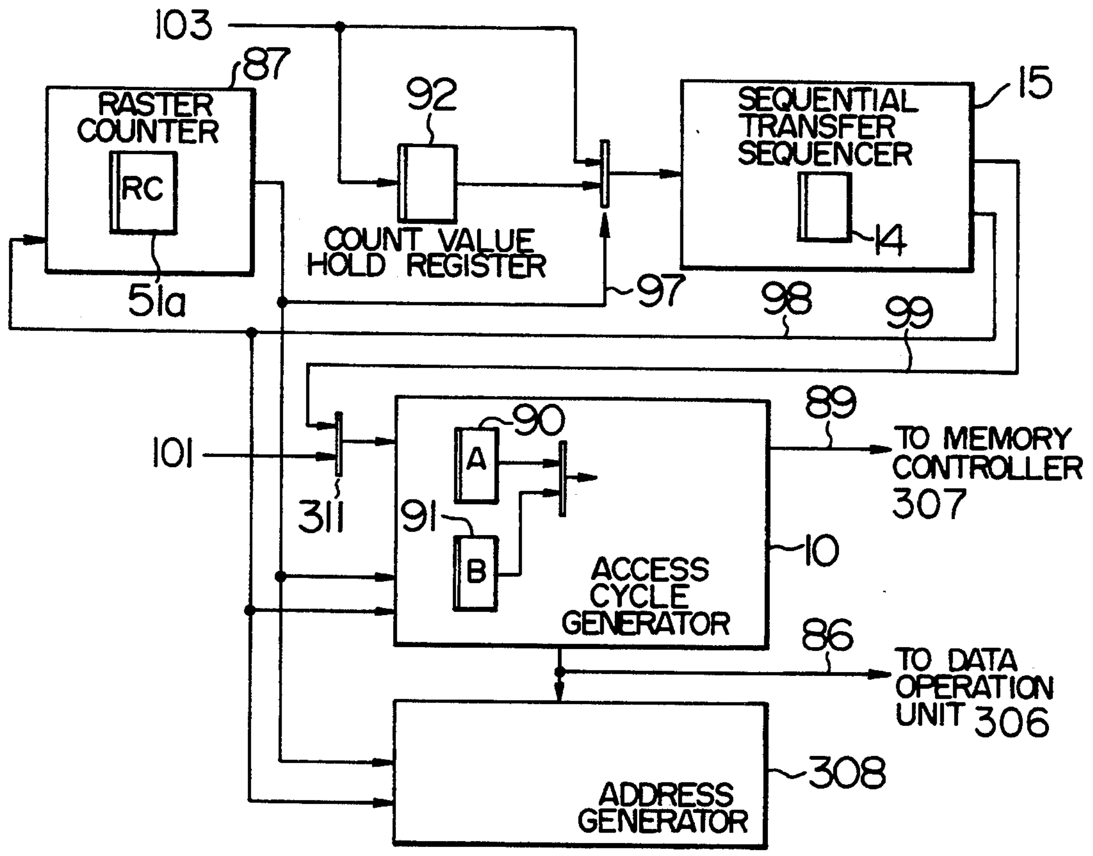
FIG. 29 is a diagram showing an example of construction of a bit block transfer controller complying with two-dimensional configuration.
Figure 35:
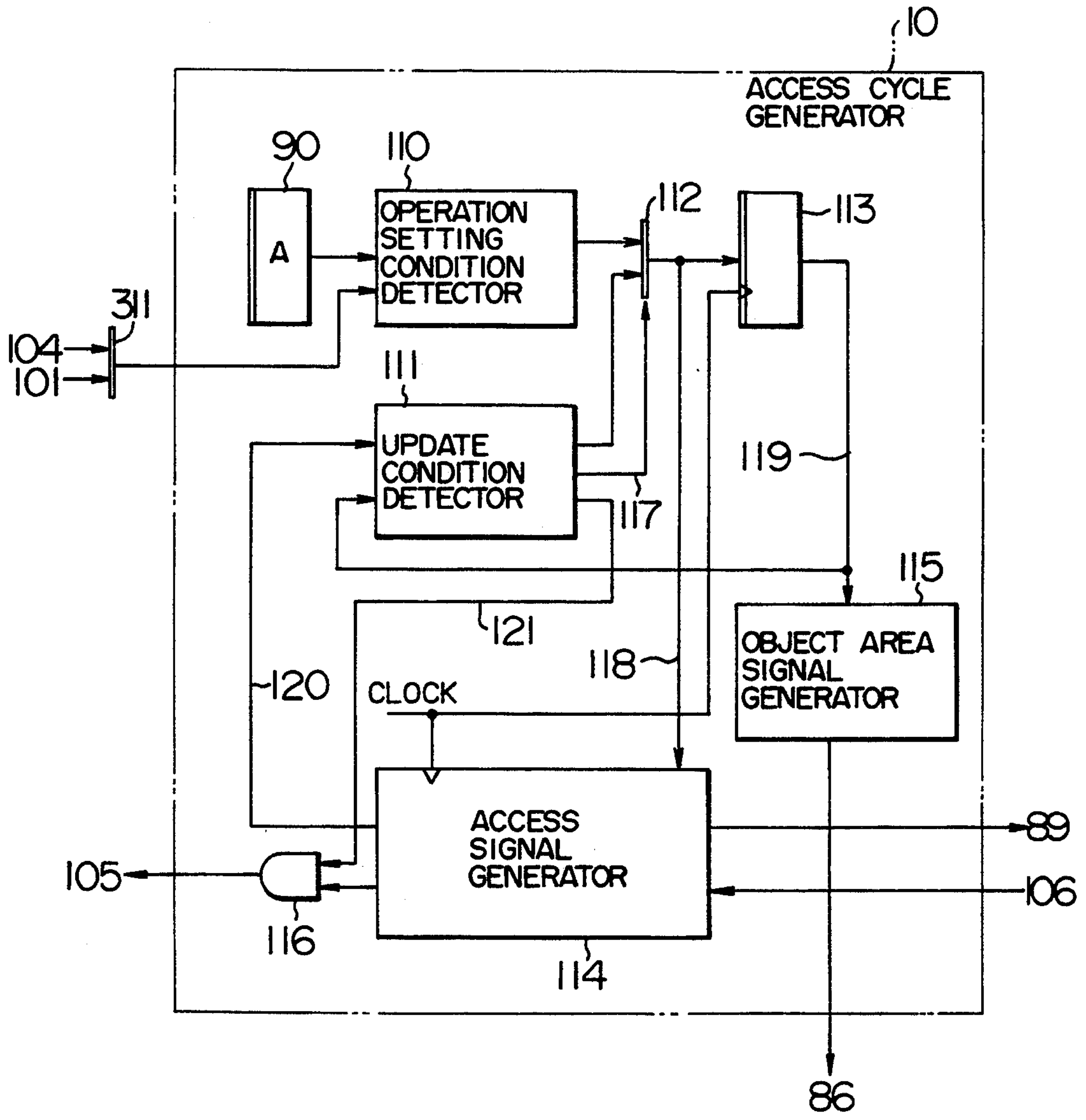
FIG. 35 is a diagram showing an example of construction of an access cycle generator.

An example of construction of the access cycle generator 10 is shown in FIG. 35. In the figure, reference numeral 90 designates an access cycle generator control register, 110 an operation setting condition detector for generating an initial set value of a sequencer register 113 which constitutes, together with an update condition detector 111 adapted to generate an update value for the sequencer register 113, a sequencer for generating an access cycle in accordance with the contents set in the access cycle generator control register 90, 112 a selector, 115 an object area signal generator responsive to the contents of the sequence register 113 to analyze which area of source, pattern and destination the present access is destined for and encode a result so as to generate an object area selection signal 86 for commanding the address generator 308 (FIG. 15) and data operation unit 306, 114 an access signal generator for generating an access request signal 89 for the memory controller 307 (FIG. 15), and 116 an AND circuit. In input and output signal lines of the access cycle generator 10 (FIG. 15), there are a start signal for the access cycle generator 10 corresponding to one of access request signal 104 from the sequential transfer sequencer 15 to be detailed later and access request signal 101 from the CPU 100 which is selected by a selector 311, a signal 105 responsive to the start signal, the access request signal 89 for the memory controller 307, a signal 106 responsive to the access request signal 89, and the object area selection signal 86. The access cycle generator control register 90 precedently designates what access is generated, that is, which operational item in Tables 1 and 2 is carried out when the aforementioned read request or write request is issued. Another access cycle generator control generator 91 may additionally be provided which designates which one of source and pattern is read upon a pre-read operation to be described later. The register 91 is shown in FIG. 29 useful to explain a seventh embodiment concerning two-dimensional bit block transfer to be described later. Designated to the access cycle generator control register 91 is any one of items 1 to 3 in Table 1. As shown in FIG. 18, the source address register 31 and pattern address register 32 are so controlled as to be updated when read access generated by the access cycle generator 10 (FIG. 15) ends and the destination address register 33 is so controlled as to be updated when write access generated by the access cycle generator 10 ends.

The operation of the access cycle generator 10 will now be described with reference to FIG. 35. While the access cycle generator 10 is not in operation, the selector 112 responds to a signal line 117 to select the output of the operation setting condition detector 110. When receiving a start signal for the access cycle generator 10 (FIG. 15) from the outside through the selector 311, the operation setting condition detector 110 analyzes the setting contents of the access cycle generator control register 90 and delivers an initial value for the sequencer register 113. This initial value is supplied to the sequencer register 113 and access signal generator 114 through the selector 114 and signal line 118. Since the sequencer register 113 and access signal generator 114 are under the continuous application of a clock signal, the contents on the signal line 118 is sequentially reflected on the sequencer register 113 and access signal generator 114. Consequently, information as to which one of Tables 1 and 2 is to be accessed is recorded on the sequencer register 113 and the access signal generator 114 starts delivering an access request onto the signal line 89. When the initial value determined by the operation setting condition detector 110 is recorded on the sequencer register 113, the recorded contents is delivered onto a signal line 119 and the update condition detector 111 refers to this contents to produce a signal onto signal line 117 by which the selector 112 is switched to select the output of the update condition detector 111. The access signal generator 114 carries out wait control for the response signal 106 (control keeping delivering the access request until a response is received) and upon completion of one access cycle, sends a cycle end to the update condition detector 111 through a signal line 120. The update condition detector 111 then prepares data for the next cycle to be held in the sequencer register 113, in accordance with the contents of the sequencer register 113 and the cycle end information on the signal line 120.

Conceivably, the sequencer register 113 may be constructed in various ways. In the simplest method, one-bit registers are provided in association with the access cycles in Tables 1 and 2, i.e., source area read, pattern area read, destination area read and destination area write, respectively, and the individual bits are weighted with priority ranks so that processing is carried out bit by bit. For example, in an instance to be described below, a sequencer is constructed of a 4-bit sequencer by which the processing is effected in the order of the source area read of the highest priority rank, the pattern area read, the destination area read and the destination area write. More particularly, when an access of item 5 in Table 1 is set in the access cycle generator control register 90 and the access cycle generator 10 (FIG. 15) is started with a read access, the operation setting condition detector 110 prepares data for recording access generation information on registers associated with source area read and destination area read and the data is recorded at the corresponding bits of the sequencer register 113 through the selector 112. The object area signal generator 115 refers to the contents of the sequencer register 113 to determine that, of the source area read and destination area read to be accessed, the source area read of higher priority rank should be accessed and delivers a code representative of the source area as object area selection signal 86. After completion of one access cycle, the update condition detector 111 drops off the bit which is the highest priority rank of the preceding contents of the sequencer register 113 to prepare the next recording data. In this case, data for the source area read is dropped off to leave only the access generation information for the destination area read. This data is recorded on the sequencer register 113 by the next clock and the access signal generator 114 is also started again to perform the next cycle (here the destination area read). Update repeats itself until processing of all kinds of access generation information has been completed, so that concurrently with completion of the last cycle, the selector 112 selects the output of the operation setting condition detector 110 under the control of the signal line 117 and the present cycle of the access generator 10 ends. Each time that one access signal is generated, the access signal generator 114 receives a response signal 106 and thereafter delivers a response signal to the AND circuit 116. The other input of the AND circuit 116 is normally rendered to be "disabled" and only when the last cycle of one activation is detected by the update condition detector 111, it is rendered to be "enabled" to cause the access signal generator 114 to generate a response signal 105. In this example, during the cycle of destination area read, the signal occurs on the response signal line 105.

Figure 36:
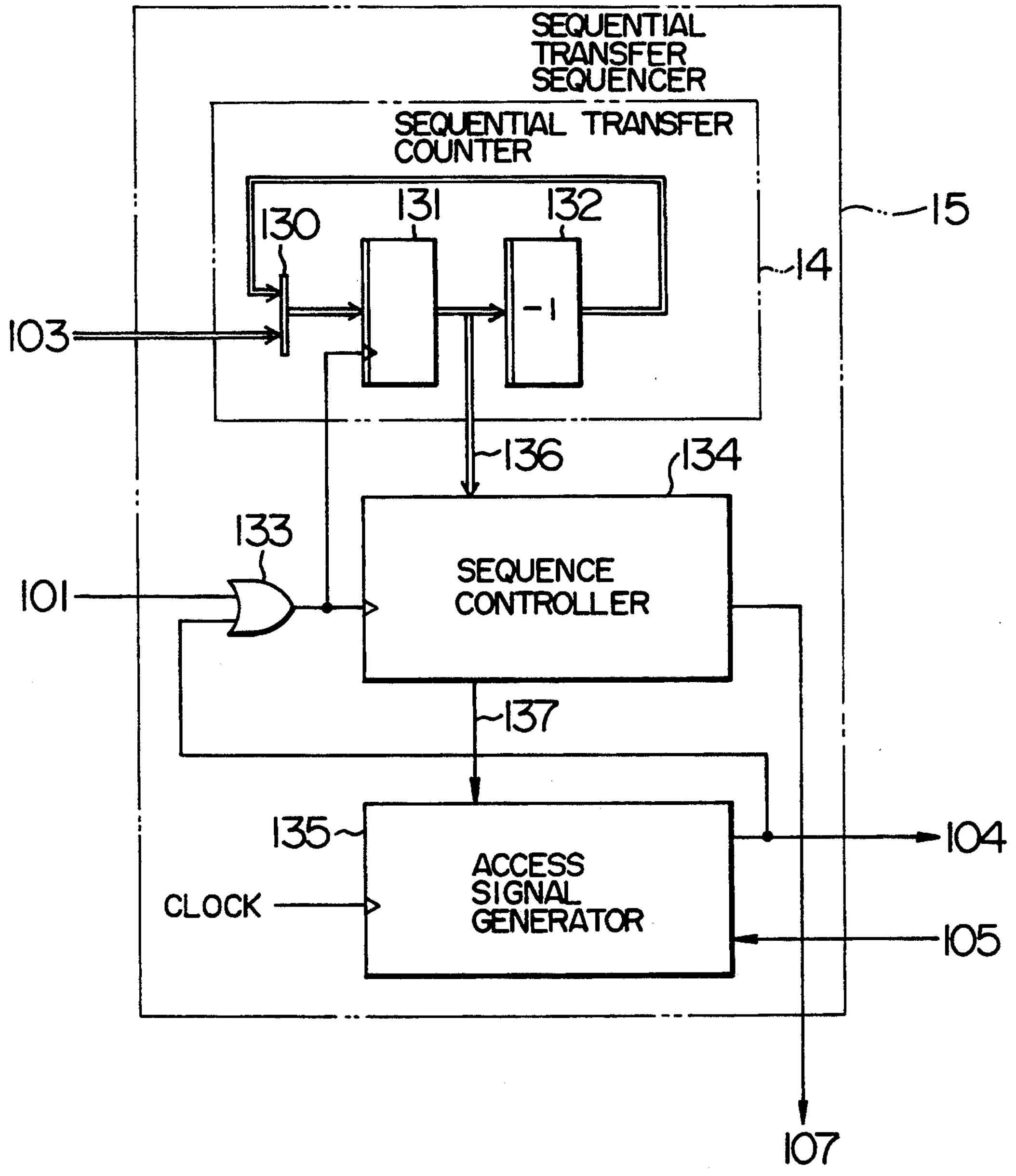
FIG. 36 is a diagram showing an example of construction of a sequential transfer sequencer.

The first sequential transfer sequencer 15 shown in FIG. 15 will now be described. The first sequential transfer sequencer 15 generates access cycles of sequential write cycles or sequential read and write cycles and activates the access cycle generator 10 designated times. This operation is equivalent to an operation based on a sequential data transfer instruction by the CPU 100. The data transfer by the first sequential transfer sequencer 15 is advantageous over the sequential data transfer based on the instruction by the CPU 100 in that the timing overhead, i.e., time loss which would otherwise be caused by a timing synchronization unit (not shown) adapted to absorb the difference in transfer speed among buses 101, 102 and 103 coupled to the present apparatus 300 and the difference in control timing between the present apparatus 300 and the buses 101, 102 and 103 can be eliminated, and that the sequencer 15 can cooperate with the mask pattern generator 305*c* to be detailed subsequently to execute simultaneous mask processings at opposite ends of one horizontal line in the case of transfer thereon. FIG. 36 shows an example of construction of the first sequential transfer sequencer 15. In the figure, reference numeral 131 designates a register for counter, 132 a decrement unit, 130 an input selector for the counter register 131, 134 a sequence controller, 135 an access signal generator, and 133 an OR circuit. Of these components, the counter register 131, decrement unit 132 and input selector 130 are collectively called the first sequential transfer counter 14. Of input and output signal lines of the sequential transfer sequencer 15 the data bus 103 is coupled to the CPU 100, the bus 101 through which the CPU 100 sends a write signal for the counter register 131, the line 104 is used as an access request signal (start signal) line for the aforementioned access cycle generator 10, the signal line 105 is used for a response signal from the access cycle generator 10, and a signal line 107 is used to select a mask pattern in the mask pattern generator 305 to be detailed later. The signal on the signal line 107 is a status signal of first sequential transfer sequencer 15 indicating which one of the first, the last and the other cycles the cycle presently generated by the first sequential transfer sequencer 15 assumes.

During the first write transfer and the final write transfer by the first sequential transfer sequencer 15 the mask pattern generator 305*c* for sequential transfer shown in FIG. 15 generates bit mask patterns respectively designated to the first and final write transfer processings and supplies the bit mask patterns, as external data, to a bit mask shifter 333 shown in FIG. 16 and an AND circuit 324 shown in FIG. 17 through the data structure transformer 58 of data operation unit 306

(FIG. 16); and during write transfer lying between the first and final write transfer processings, it generates a bit pattern which permits writing of all the bits and supplies the bit mask pattern, as external data, to the bit mask controller through the transformer 58. The bit mask pattern for the first write transfer by the first sequential transfer sequencer 15 is precedently set in the first drawing permitting register 47 shown in FIG. 7 and the bit mask pattern for the final write transfer is precedently set in the second drawing permitting register 48.

Figure 28A:
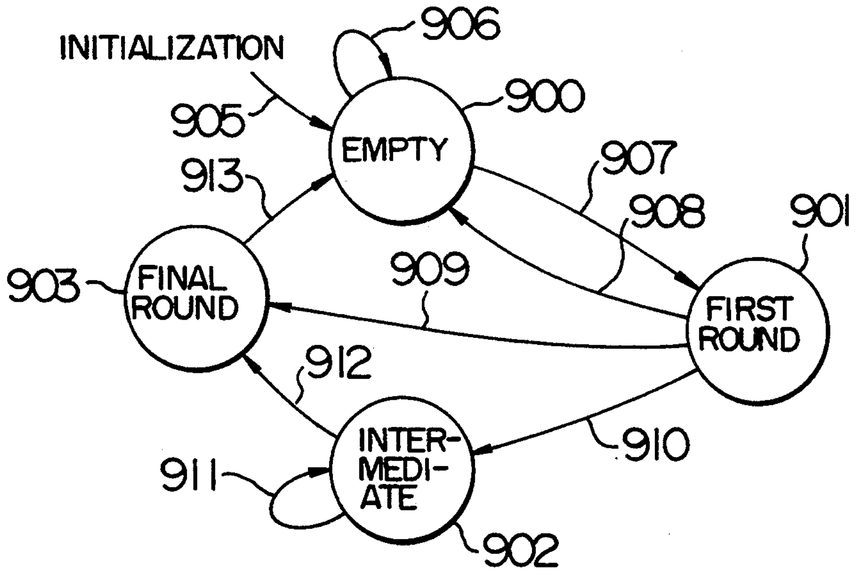
FIGS. 28A and 28B are diagrams showing examples of state transition control of a sequential transfer sequencer.
Figure 28B:
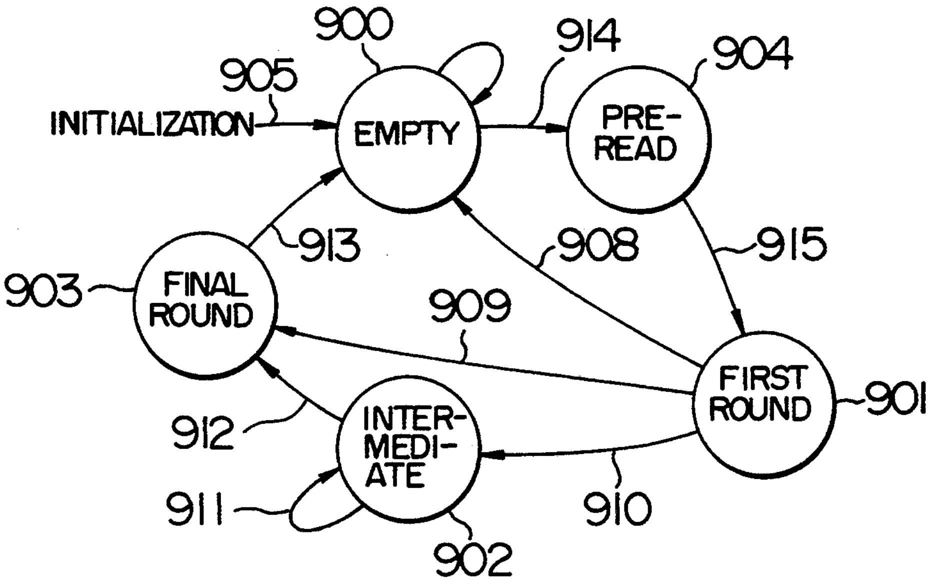

The sequence controller 134 shown in FIG. 36 operates with a clock signal delivered out of an OR circuit to receive input data on an output line 136 of the counter register 131. Specific examples of control of state transition of the sequence controller 134 are shown in FIGS. 28A and 28B. FIG. 28A shows an example where data of the source or pattern area is not pre-read and FIG. 28B shows an example where data of the source or pattern area is pre-read. Depending on the correlation between the phase of a start position of the source or pattern and the phase of a start position of the destination, it is sometimes necessary that read be carried out twice for only initial one read/write. This ensures that source or pattern data can be read, as shown in FIG. 17, not not only in the buffer register 2 or 3 but also in the merge register 7 or 8 in advance to prevent lack of write data. A decision as to whether pre-read is to be undertaken can be made by means of either the CPU 100 or an additionally provided unit which makes a decision by comparing the phase relation. In the example of FIG. 28A where pre-read of data is not effected, there are four states which are an empty state 900, a first state 901, an intermediate state 902 and a final state 903. In the three states excepting the empty state 900, when the first sequential transfer sequencer 15 is commanded with sequential write, the state is updated every write cycle but when the sequencer 15 is commanded with sequential read and write the state is updated at intervals of one set of read cycle and write cycle. Specifically, the manner of counting down the first sequential transfer counter 14 may be so contrived as to permit switching between sequential write and sequential read and write. For example, assuming that the counter register 131 (FIG. 36) has a total of n+1 bits including bit 0 (LSB) and bit n (MSB), the LSB bit 0 is used as a bit for identifying read and write. Then, the value of the bit being "0" is defined as identifying write and the value of the bit being "1" is defined as identifying read. A total of n bits of the counter register 131 covering bit 1 as a new LSB and bit n is supplied to the sequence controller 134 through the output line 136. The value of bit 0 is initialized to "0" in order that "0" may always be written into the counter register 131 when writing the register 131 through the data bus 103.

With reference to FIG. 36, when sequential read and write is commanded under this condition, the decrement unit 132 counts down one by one to generate a cycle in the order of read and write and besides the count value to the sequence controller 134 is changed every two read and write cycles. When sequential write is commanded, the decrement unit 132 counts down two by two to generate sequential write cycles and besides the count value to the sequence controller 134 is changed every write cycle. Although the generation of sequential write cycle and the generation of read and write sequential cycle can be switched in the above manner, the same operation as above can be carried out with a different unit (different from the FIG. 36 unit). For example, for sequential write, the sequence controller 134 may count down by one each time that one start signal 137 from the sequence controller 134 activates the access signal generator 135 and for sequential read and write, the sequence controller 134 may count down by one each time that the access signal generator 135 is activated twice. When write is commanded under the first state 901, control is carried out through the status signal 107 such that the contents of the first drawing permitting register 47 shown in FIG. 9 is selected as the mask pattern. Returning to FIG. 28A, when write is commanded under the intermediate state 902, control is carried out through the status signal 107 (FIG. 36) such that a bit mask pattern for permitting write of all the bits is selected as the mask pattern. When write is commanded under the final state 903, control is carried out through the status signal 107 such that the contents of the second drawing permitting register 48 shown in FIG. 9 is selected as the mask pattern. The empty state 900 indicates a state in which the sequential transfer sequencer 15 (strictly, the sequence controller 134 shown in FIG. 36. This holds true in the following description.) does not operate. This state is obtained by initialization through a path 905 and then is kept through a path 906 until the first sequential transfer sequencer 15 is started. With the first sequential transfer sequencer 15 started, the first state 901 is obtained through a path 907. In the example of FIG. 36, the start initiated by causing the CPU 100 to write a value corresponding to the number of transfer processings in the first sequential transfer counter 14 (strictly, the counter register 131). When the number of transfer processings designated by the first sequential transfer sequencer 15 is one, the state returns to the empty state 900 through a path 908. When the number of transfer processings designated by the first sequential transfer sequencer 15 is two, the state shifts to the final state 903 through a path 909. When the number of transfer processings is three of more, the state shifts to the intermediate state 902 through a path 910. The intermediate state is kept through a path 911 until the remaining number of transfer processings amounts to one and with the number of transfer processings measuring one, the state shifts to the final state 903 through a path 912. When one transfer ends under the final state 903, the state returns to the empty state through a path 913.

An instance where pre-read of data is effected will now be described. In the pre-read of data as exemplified in FIG. 28B, a pre-read state 904 is added and a total of 5 states exists. FIG. 28B differs from FIG. 28A in that an empty state 900 is set up through initialization and thereafter, upon activation of start of the sequential transfer sequencer 15 it shifts to the pre-read state 904 through a path 914. The pre-read state 904 is to generate a read cycle for the source area or pattern area. When the first sequential transfer sequencer 15 is under this state, it selects the access cycle generator control register 91 in place of the access cycle generator control register 90 and generates a read cycle for the access cycle generator 10 (see FIG. 29). As described previously, the access cycle generator control register 91 is a register for designating which one of source and pattern is to be read during pre-read operation and therefore it is designated with any one of items 1 to 3 in Table 1. The access cycle generator control register 91 is selected only under the pre-read state 904, and under the other states, the contents of the access cycle generator control register 90 exclusively stipulates the operation of the access cycle generator 10. As the pre-read ends, the state shifts to a first state 901 through a path 915. To add, under the pre-read state 904, update of the first sequential transfer counter 14 shown in FIG. 36 is masked with a unit not shown. The ensuing operation is the same as that in the case of FIG. 28A. Thus, in the examples of FIGS. 28A and 28B, a mask pattern is definitely selected, regardless of the number of designated transfer processings, from three of the contents of the first drawing permitting register 47 shown in FIG. 9, a bit mask pattern for permitting write of all the bits and the contents of the second drawing permitting register 48 shown in FIG. 9 so as to perform transfer.

Figure 37:
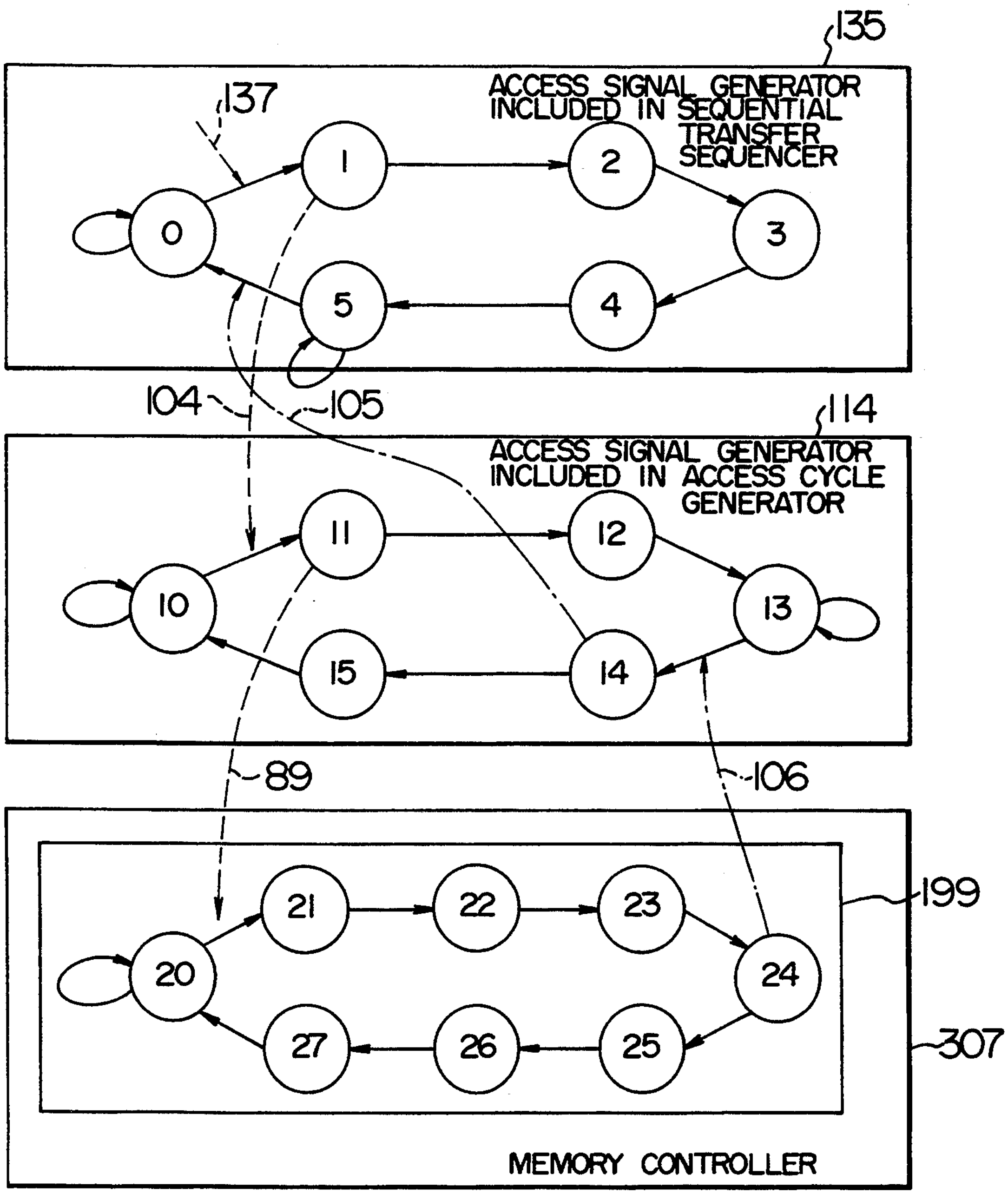
FIG. 37 is a diagram showing the correlation of state transition between individual sequencers.

Constituent components in FIG. 15 have been described and a description will now be given in particular of how sequencers incorporated in these constituent components, especially, in the first sequential transfer sequencer 15 access cycle generator 10 and memory controller 307 cooperate with each other. FIG. 37 shows examples of the correlation between state transitions in sequencers, that is, in the access signal generator 135 included in the first sequential transfer sequencer 15 shown in FIG. 36, in the access signal generator 114 included in the access cycle generator 10 (FIG. 35) and in a sequencer 199 included in the memory controller 307 (FIG. 15). The access signal generator 135 included in the first sequential transfer sequencer 15 is adapted to generate an access request signal 104 for starting the access cycle generator 10. The generator 135 under state number 0 representative of operation stopping state is started by a start signal 137 and the state shifts through state numbers 1, 2, 3 and 4 to state number 5 (the remaining sequencer states in FIG. 37 are represented by numerical numbers) at which the generator 135 awaits until a response signal 105 from the access cycle generator 10 becomes valid. When the response signal 105 becomes valid, the state returns to state number 0 and if the start signal is then valid, the generator 135 is started again. The start signal 137 is sampled only under state number 0. It appears from this figure that the access request signal 104 is delivered under state number 1 but actually, the access request signal 104 is delivered under all the states except state number 0. It should therefore be noted that delivery of the access request signal 104 continues even under response wait state number 5.

The access signal generator 114 included in the access cycle generator 10 is adapted to generate an access request signal 89 for starting the sequencer 199 incorporated in the memory controller 307. The generator 114 under state number 10 representative of operation stopping state is started by the start signal 104 (strictly, the signal 118 explained in connection with FIG. 35) and the state shifts through state numbers 11, 12 and 13 to state number 13 at which the generator 114 awaits until a response signal 106 from the sequencer 199 incorporated in the memory controller 307 becomes valid. When the response signal 106 becomes valid, the state shifts through state numbers 14 and 15 to return to state number 10 and if the start signal 104 (signal 118) is then valid, the generator 114 is started again. The start signal 104 (signal 118) is sampled only under state number 10. After the response signal 106 becomes valid, a response signal 105 is generated under state number 14. Strictly, however, the response signal of the access signal generator 114 is masked by the AND circuit 116 as described in connection with FIG. 35 and only a response signal of access signal generator 114 which is generated at the last cycle of one or more access cycles in items of Tables 1 and 2 is transmitted as the response signal 105 to the access signal generator 135 included in the first sequential transfer sequencer 15. It appears from the figure that the access request signal 89 is delivered under state number 11 but as described above, the access request signal 89 is delivered practically under all the states except state number 10. It should therefore be noted that delivery of the access request signal 89 continues even under response wait state number 13.

The sequencer 199 is adapted to generate a control signal for the VRAM 1. The sequencer 199 under state number 20 representative of operation stopping state is started by the access request signal 89 and the state shifts through state numbers 21, 22, 23, 24, 25 26 and 27 to return to state number 20. In this example, the state machine has a fixed length of 8 cycles but it may be of a different cycle length of, for example, 6 cycles or of a variable length. When the state numbers of the sequencers are replaced with a gray code (a series of numbers which changes by only one bit when changing from one number to another. For example, 0, 2, 3, 7, 6, 4, 5 and 1 are expressed in terms of binary numbers of 3 bits, indicating that these binary numbers change by only one bit when changing from one number to another), the control signal and the like for the VRAM 1 can be prepared by merely decoding the state number. In this example, the sequencer 199 is started by sampling the access request signal 89 only under state number 20 and to return the response signal 106 under state number 24.

Figure 38A:
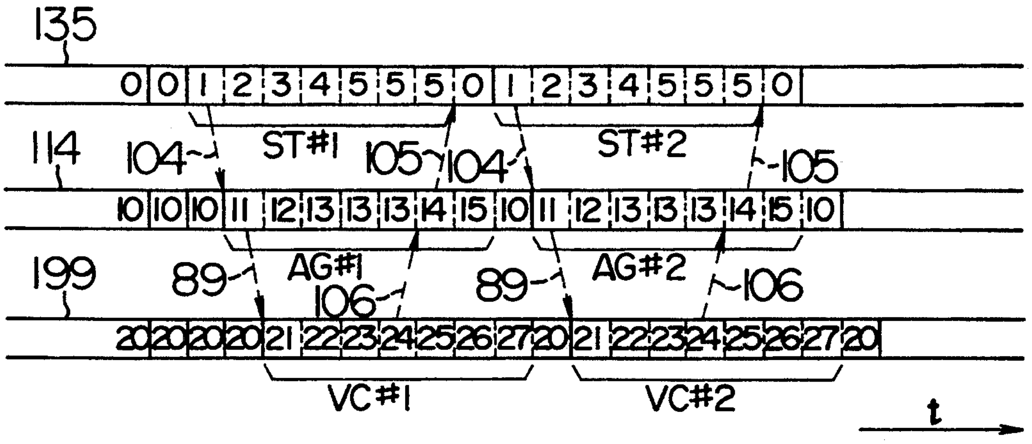
FIGS. 38A to 38C are diagrams showing examples of correlation of operation timing between the individual sequencers.
Figure 38B:
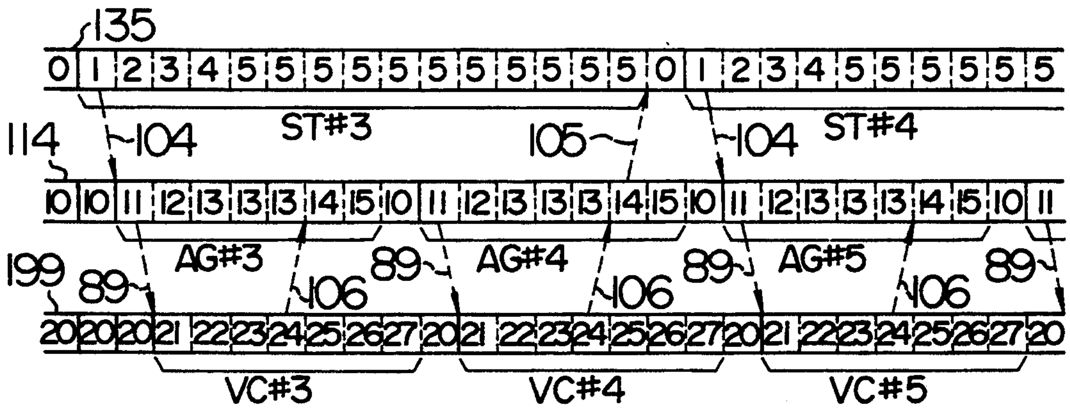
Figure 38C:
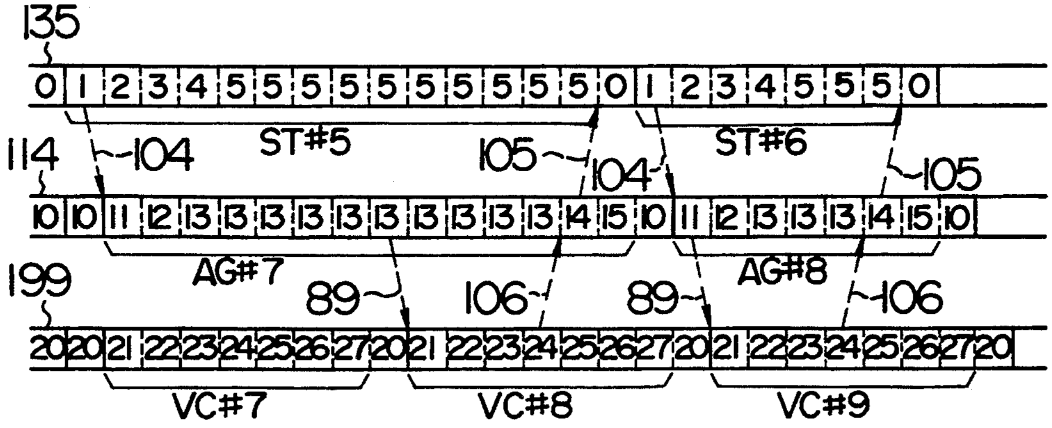

When the sequencers each having correlations between state transitions as described above are operated, timing correlations are set up as exemplified in FIGS. 38A, 38B and 38C. In an example of FIG. 38A, the access cycle generator 10 is so set as to generate one cycle in response to one access request (for example, items 1, 2 and 4 in Table 1 and item 1 in Table 2). The access signal generator 135 included in the first sequential transfer sequencer 15 (FIG. 36), the access signal generator 114 included in the access cycle generator 10 (FIG. 35) and the sequencer 199 incorporated in the memory controller 307 (FIG. 15) are sequentially started with a delay of one clock, but a response signal 106 from the sequencer 199 sequentially releases the wait states of the access signal generators 114 and 135 causing the access signal generator 134 to initiate a second access. An access request from the generator 135 again reaches the sequencer 199 to apply the second access to the VRAM 1. The ensuing access is executed in accordance with similar procedures. It should be noted that at that timing, the sequencer 199 does not enter the wait loop at state number 20 but activated successively. In an example of FIG. 38B, the access cycle generator 10 is so set as to generate two cycles in response to one access request (for example, items 3, 5 and 6 in Table 1 and item 2 in Table 2). During a first access, the access signal generator 135 included in the first sequential transfer sequencer 15 the access signal generator 114 included in the access cycle generator 10 and the sequencer 199 incorporated in the memory controller 307 are sequentially started with a delay of one clock as in the precedence. The example of FIG. 38B differs from the example of FIG. 38A in that one access generated by the first sequential transfer sequencer 15 is expanded by the access cycle generator 10 into two accesses and that a response signal 105 is returned at the last cycle. In this example, a second access request by the first sequential transfer sequencer 15 is initiated without placing the sequencer 199 in the wait condition. Incidentally, the memory controller 307 performs display read based on a request from the display controller 301 and refresh of the VRAM 1 as will be seen from FIG. 15 and therefore it conflicts frequently with an access for drawing by the access cycle generator 10. In an example of FIG. 38C, an access request by the access cycle generator 10 is forced to wait by the display read and refresh (indicated by VC #7). At the time that the access signal generator 114 included in access cycle generator 10 started by the access signal generator 135 included in first sequential transfer sequencer 15 is about to start the sequencer 199 incorporated in the memory controller 307, the sequencer 199 has already been started to accept an access request from the access signal generator 114 upon completion of the access (VC #7). The operation of this example has no idle in view of the operation of the sequencer 199, either. The condition for performing such a less wasteful, continuous access is that a minimum number of state transitions of a host sequencer is equal to or smaller than that of a sequencer slave to the host sequencer, that the response signal is returned to the host sequencer after the response signal from the slave sequencer is recognized, and that a lowermost sequencer returns the response signal in advance so that a request for access to the lowermost sequencer occurs when or before the lowermost sequencer is brought into the operation stopping state.

Figure 39:
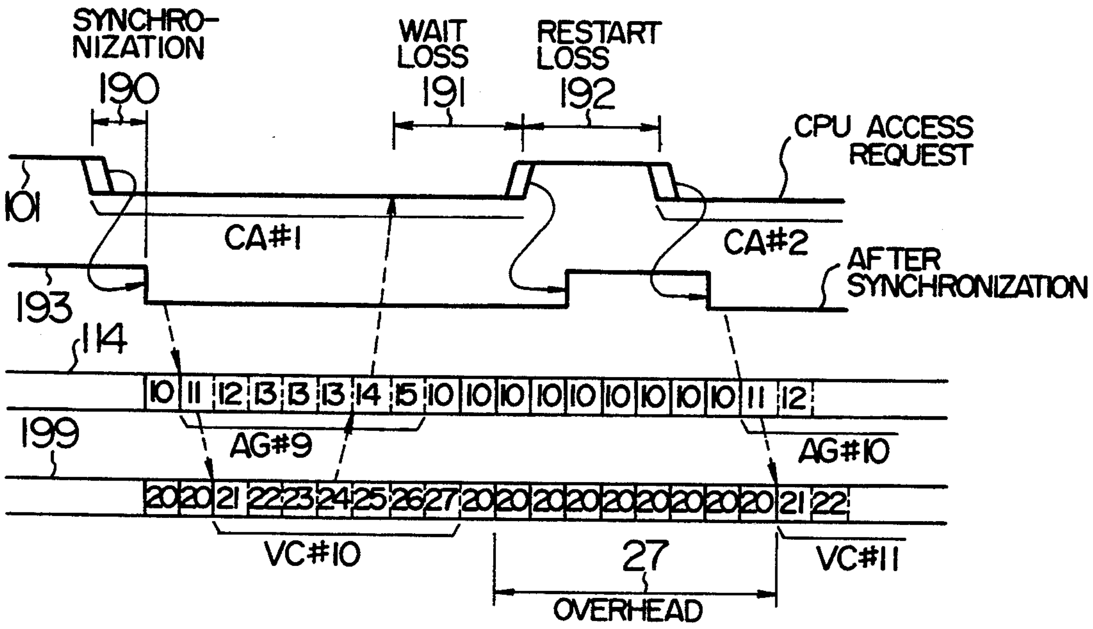
FIG. 39 is a diagram showing an example of access start by the CPU.

For comparison, the operation timing for the case where the access cycle generator 10 is started by an access request issued from the CPU 100 and supplied through the bus 101 as in the conventional apparatus (namely, in FIG. 15 the selector 311 may select, in place of the output of the first sequential transfer sequencer 15 an access request signal from the CPU 100 to transmit it to the access cycle generator 10 through the bus 101) will be described with reference to FIG. 39. In FIG. 39, the access request signal from the CPU 100 is represented by the bus 101. Practically, the access request signal must be synchronized with a clock 193 for driving such a sequencer as the access cycle generator 10 and then supplied to the access cycle sequencer 10. When a second system uses a signal of a first system in the two systems operating with clocks of different frequencies and phases, the synchronization processing is such that the signal is flipped twice by the clock of the second system (i.e., passed through two stages of shift registers) and is indispensable for stable operation of the system. At that time, a synchronization loss 190 due to the synchronization occurs. In addition, a weight loss 191 occurs during an interval of time between return of the response signal by the access signal generator 114 included in the access cycle generator 10 and completion of the access request signal from the CPU 100 which is represented by the bus 101, and a restart loss 192 occurs during an interval time between the completion of the access request signal and the occurrence of the next access. In information processing apparatus such as personal computers in which interchangeability with old-fashioned apparatus is important, the change of timing of bus signal such as the access request represented by the bus 101 leads to fatal inconvenience to maintenance of the interchangeability and the above losses are considered to occur without fail. As a result, in FIG. 39, an overhead 27 takes place. In principle, the present invention is so constructed as not to generate the overhead 27 and therefore, as far as the access cycle corresponding to the sequencer 199 can be decreased by an advanced technique in the future, speedup of the whole drawing processing can advantageously be attained in proportion to a decrease in the access cycle. Additionally, as is clear from FIG. 38, the difference in operand in bit block transfer such as source, pattern and destination pursuant to equations (2), (3), (4) and (5) described in the introductory part of the specification can merely be attributed to the difference in the number of processings of access to the VRAM 1 and consequently the object of the present invention directed to realization of a bit block transfer drawing apparatus which can make constant the value of parameter m in equations (2), (3), (4) and (5) can be attained.

1.2 Second Embodiment

A second embodiment of the invention in the bit block transfer will be described with reference to FIGS. 1 to 4. In a bit block transfer support apparatus as shown in FIG. 1, the VRAM 1 for storing image information is of a plane structure and a display system performs read/write of a plurality of pixels in respect of all the planes at a time. In a certain plane, the data operation unit 306 comprises buffer registers 2, 3 and 4 for temporarily storing data of the VRAM 1, shifters 5 and 6 for correcting a displacement between drawing positions within transfer originator and transfer destination words when a word is defined as the number of pixels which can be operated simultaneously, merge registers 7 and 8 for holding data shifted by the shifters and not drawn in the transfer destination word in order that the shifted data can be drawn during the next word transfer, and a three-value raster operator 9 for receiving, as three inputs of source, pattern and destination, the values of the buffer registers 2, 3 and 4. In addition to the above components, the bit block transfer support apparatus has an access cycle generator 10 for expanding an access cycle for the VRAM 1, issued from the CPU 100, into a plurality of accesses, address generation circuits 11, 12 and 13 included in the address generator 308 and operable to generate addresses of source, pattern and destination areas on the VRAM 1, respectively, and a first sequential transfer sequencer 15 characteristic of the present invention and including a first sequential transfer counter 14. In case where the VRAM 1 has a plurality of plane structures, data operation units 306, which are identical in number to the plane structures, are provided in association with the individual plane structures.

Figure 2:
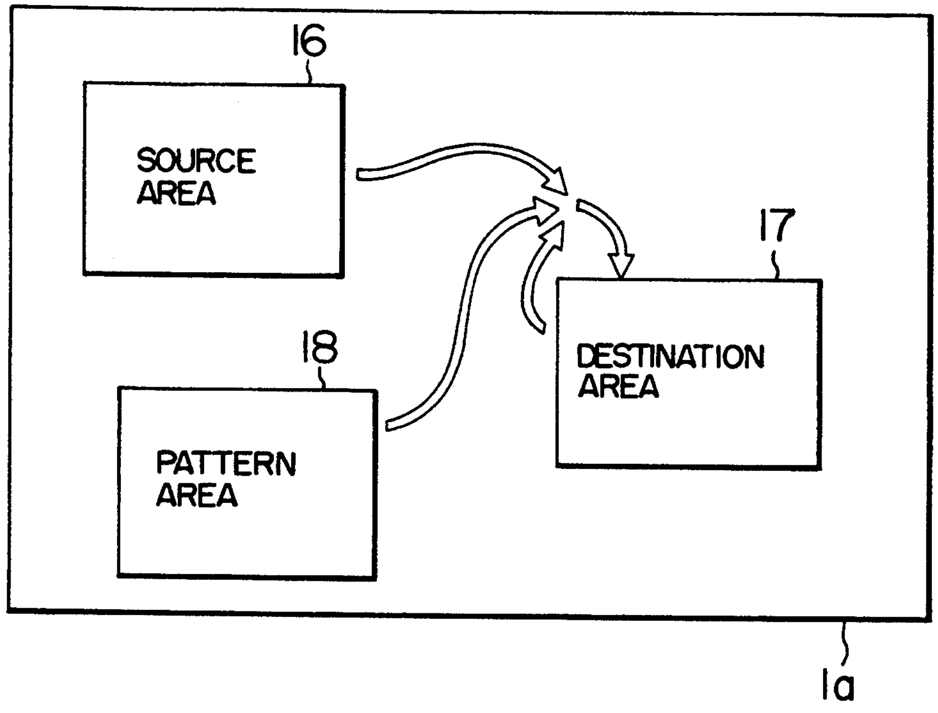
FIG. 2 is a diagrammatic representation showing the manner of rectangular area transfer on a VRAM.

The overall basic operation will now be described by referring to an instance where as shown in FIG. 2, a three-value raster operation is carried out for source area 16, destination area 17 and pattern area 18 within a display area of a given plane 1$a$ on the VRAM 1 and a result of the operation is written in the destination area 17. FIGS. 3 and 4 are timing charts for the bit block transfer processing of FIG. 2. In particular, FIG. 3 shows the case of the conventional transfer start method in which the access cycle generator 10 (FIG. 1) is started with a data transfer instruction from the CPU 100, and FIG. 4 shows the case of a transfer start method according to the present invention in which the first sequential transfer sequencer 15 is used for starting. The presence or absence of overhead 27 makes the two methods different. Excepting this difference, the operational procedure is the same for both the methods and a description will first be given with reference to FIG. 3.

As shown in FIG. 3, the access cycle generator 10 synchronizes one VRAM read cycle 19 from the CPU 100 with a VRAM access cycle to provide a start signal; and the generator 10 is started with the start signal to expand the VRAM read cycle 19 into a maximum of three VRAM read cycles of source area read cycle 20, destination area read cycle 21 and pattern area read cycle 22, and generates, in timed relationship with a VRAM write cycle 23 from the CPU, a VRAM write cycle for writing an operation result of the three-value raster operator 9 into the VRAM 1. This has already been described in connection with the foregoing first embodiment by referring to Tables 1 and 2.

Turning to FIG. 1, when receiving a read cycle 24 for the VRAM 1 from the CPU 100, the access cycle generator 10 causes an address switch 25 to select the source address generation circuit 11 from the address generation circuits 11, 12 and 13 constituting the address generator 308 and holding addresses of words representative of objects in the respective areas for which transfer is destined, reads data from the VRAM 1 at an address designated by the source address generation circuit 11, stores the data in the buffer register 2, and updates the address of the source address generation circuit 11. Subsequently, the access cycle generator 10 causes the address switch 25 to select the destination address generation circuit 13 included in the address generator 308, reads data from the VRAM 1 at an address designated by the destination address generation circuit 13, and stores the data in the buffer register 4. If necessary, the access cycle generator 10 causes the address switch 25 to select the pattern address generation circuit 12 included in the address generator 308, reads data from the VRAM 1 at an address designated by the pattern address generator 12, stores the data in the buffer register 3 and updates the address of the pattern address register 12. The maximum of three operations for reading data from the VRAM 1 is carried out within one VRAM read cycle by the CPU 100 as shown in FIG. 3. Thereafter, a result of shifting the combination of the contents of the buffer register 2 and that of the merge register 7, a result of shifting the combination of the contents of the buffer register 3 and that of the merge register 8 and the contents of the buffer register 4 are inputted to the three-value raster operator 9, a result of the operation is written into the VRAM 1 in synchronism with the VRAM write cycle 26 by using an address of the destination address generation circuit 13 included in the address generator 308, and the address of the destination address generation circuit 13 is updated. In this manner, data transfer of one word is completed. As described above, in the conventional transfer start method, the read/write cycle from the CPU 100 is repeated to effect the transfer of the area in this manner.

There are provided the first sequential transfer counter 14 and first sequential transfer sequencer 15 for managing the number of transfer words within one raster, the counter 14 and sequencer 15 being characteristic of the present invention, and they play the part of the CPU 100 to generate a read/write cycle matching an access cycle for a memory element constituting the VRAM 1, with the result that the overhead 27 for synchronization of the access cycle of the CPU 100 with that of the VRAM 1 as shown in FIG. 3 can be eliminated and transfer on the same raster can be carried out efficiently without causing pause of transfer as shown in FIG. 4. After the address generation circuits 11, 12 and 13 included in the address generator 308 are set by means of the CPU 100, the transfer word number is set in the first sequential transfer counter 14 to start the first sequential transfer sequencer 15.

1.3 Third Embodiment

FIG. 5 shows a construction of a third embodiment of bit block transfer according to the invention in which the address adding ports 28, 29 and 30 characteristic of the invention are provided in association with the source address register 31, pattern address register 32 and destination address register 33 respectively included in the address generation circuits 11, 12 and 13. The operation will be described by referring to an instance where data on a source area 34 is transferred to a destination area 35. An address of a head word 37 of a transfer originator head raster 36 is set in the source address register 31 and +1 is set in a source offset register 38 shown in FIG. 5. An address of a head word 40 of a transfer destination head raster 39 is set in the destination address register 33 and +1 is set in the destination offset register 41. If a pattern is needed, though not illustrated in the figure, an address of a head word of a pattern area head raster is set in the pattern address register 32 and +1 is set in a pattern offset register 42 shown in FIG. 5. Each time that read of the source area 34 ends, the value of the source address register 31 is added with the value of the source offset register 38 to provide a new value of the source address register 31; each time that read of the pattern area ends, the value of the pattern address register 32 is added with the value of the pattern offset register 42 to provide a new value of the pattern address register; and each time that write to the destination area ends, the value of the destination address register 33 is added with the value of the destination offset register 41 to provide a new value of the destination address register 33, thereby transferring words 43, 44, . . . in the raster direction.

Figure 13:
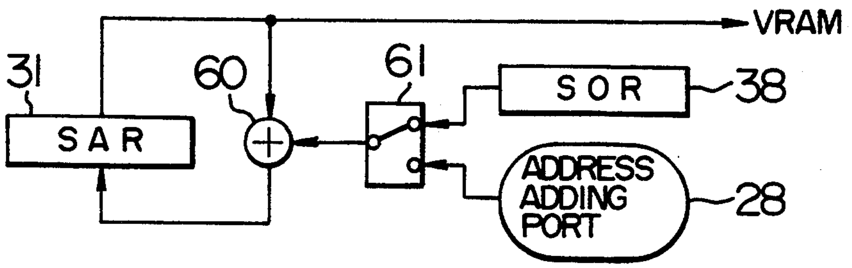
FIG. 13 is a diagram showing an address generator provided with a simplified address adding port.

In the prior art, when transfer of all the transfer object words within raster 36 ends, setting of the source address register 31 is renewed by an address value of a head word 46 of the next raster 45 and likewise setting of the destination address register 33 is also renewed. This method requires that the source address register 31 be read to renew setting of the source address register 31 by adding an address increment of one raster or the control program manage an address of a transfer object head address of each raster and the address increment of one raster. In other words, for the sake of determining the transfer area head address of each raster, the control program must hold an increment between a transfer area head address of the present raster and that of the next raster and after the transfer area head address of the next raster is calculated, the value set in the address hold register must be renewed. Additionally, the capacity of the VRAM 1 is increased to increase the address space and setting of addresses cannot sometimes be completed through one setting operation. For example, in order to access a VRAM 1 having a bit map space of 2048×1024 dots, an address of 17 bits is needed on the assumption that one word is 16 bits and in an apparatus having a data bus of a 16-bit width, setting must be done twice. For the purpose of reducing the number of setting operations of the control register and the like, the control program is required to hold an address of a transfer object word on the VRAM 1 and set only a lower value which is required to be changed. On the other hand, the displacement between an address appearing upon completion of transfer of one raster and a transfer object head address of the next raster is not large. In many applications, the displacement can be confined within a value of 16 bits. Thus, by virtue of the provision of the address adding ports 28, 29 and 30, an address of a transfer object initial word of each raster need not be held under the direction of the drawing control program and by holding only the difference between an address of a transfer object last word of a given raster and an address of a transfer object initial word of the next raster and supplying the difference through the adding ports to the source address register 31, pattern address register 32 and destination address register 33 included in the address generation circuits to update these registers, the number of setting operations of the control register and the like can be reduced. In FIG. 5 each of the address generation circuits 11, 12 and 13 has two adders 60 but by contriving the design of data path, a single adder can suffice as shown in FIG. 13. A data path switch 61 is normally transferred to the address displacement register and switched to the address adding port when the address adding port is used.

1.4 Fourth Embodiment

FIG. 7 shows a construction of a fourth embodiment of bit block transfer according the invention in which the bit block transfer support apparatus of FIG. 1 is provided with the first drawing permitting register 47 and second drawing permitting register 48 respectively adapted to designate drawing permitting areas within the initial and last words on the same raster. (These components correspond to the mask pattern generator 305*c* in FIG. 15.) In this embodiment, when a plurality of words on the same raster on the VRAM 1 are transferred to a different raster as shown in FIG. 8, the contents of the first drawing permitting register 47 and that of the second drawing permitting register 48 are used as bit mask data for the VRAM 1 so that the initial word may be written into the bit 49 commanded by the first drawing permitting register 47 and the last word may be written into the bit 50 commanded by the second drawing permitting register 48. Bit mask data of a fixed value of FFFF (hexadecimal) is used for intermediate words other than the initial and last words. The fixed value signifies that all the bits are permitted to be written. Through this, even in an apparatus having a display memory for read/write in unit of word, transfer of a rectangle in unit of dot can be effected. It depends on the state of the first sequential transfer sequencer 15 when switching between the contents of the first and second drawing permitting registers 47 and 48 and the bit mask data for the intermediate word other than the initial and last words is to be carried out. Controlling of this switching state will be detailed in connection with a seventh embodiment (1.7) of bit block transfer according to the invention to be described later. The switching state control in a fifth embodiment to be described below with reference to FIG. 9 will also be detailed in connection with the seventh embodiment.

1.5 Fifth Embodiment

In order to also make zero the value of parameter b in equations (2), (3), (4) and (5) described previously, the aforementioned constituent components may be modified so as to operate for a two-dimensional area. For the sake of automatically updating the register for address management in unit of raster necessary for transfer of a rectangle and executing a series of processings of transfer of a two-dimensional rectangular area, the provision of the second sequential transfer counter 51 shown in FIG. 9, head address registers 52, 53 and 54 shown in FIG. 10 and raster address registers 55 56 and 57 also shown in FIG. 10 is needed as exemplified in the present embodiment. FIG. 9 shows a construction comprising the second sequential transfer counter 51. FIG. 10 shows an example of internal construction of the address generator 308 in FIG. 9, including the head address registers 52, 53 and 54 and the raster address registers 55 56 and 57. The second sequential transfer counter 51 manages the number of rasters and upon completion of transfer on one raster, adds values of the head address registers 52, 53 and 54 included in the address generator 308 to values of the raster address registers 55 56 and 57 for holding the word number within one raster, respectively, to calculate an address of the head word of a transfer object area on the next raster, and updates the values of the head address register, source address register 31, pattern address register 32 and destination address register 33. When the head address registers 52, 53 and 54 are set with values, the same values are also set in the source address register 31, pattern address register 32 and destination address register 33. Through this, the transfer word number and the transfer raster number within the same raster as that for the first and second drawing permitting registers 47 and 48, the head address registers 52, 53 and 54 and raster address registers 55 56 and 57 included in the address generator 308 are set in the first sequential transfer counter 14 and the second sequential transfer counter 51, respectively, to permit transfer of the two-dimensional rectangle. Once initialized, the raster address registers 55 56 and 57 need not be set again if the structure of the VRAM 1 and the bit map structure of the display screen remain unchanged. In FIG. 10, each of the address generation circuits 11, 12 and 13 included in the address generator 308 has three adders 60 but by contriving the design of data path, a single adder can suffice as shown in FIG. 14.

Figure 14:
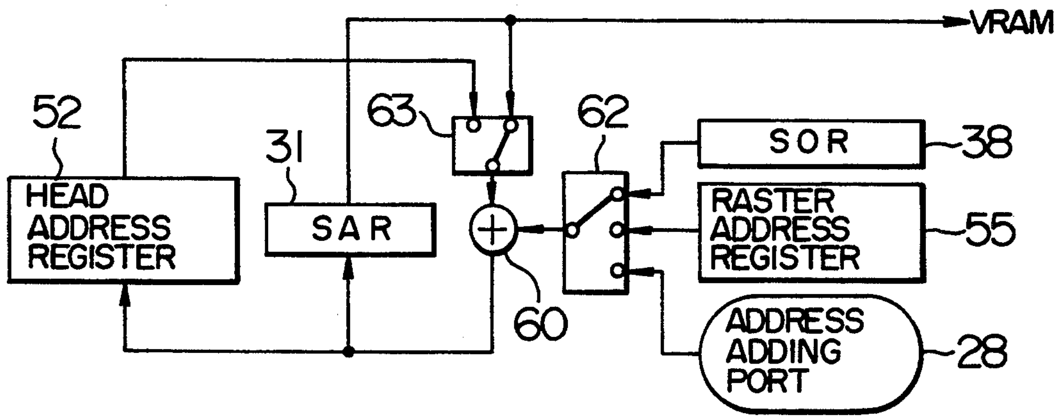
FIG. 14 is a diagram showing an address generator provided with simplified head address register and raster address register.

In FIG. 14, a data path switch 62 is normally transferred to the source offset register 38, a data path switch 63 is normally transferred to the source address register 31 and only the source address register 31 is updated. When the address adding port is used, the data path switch 62 is switched to the address adding port 28 and the data path switch 63 remains transferred to the source address register 31, so that only the source address register 31 is updated. When the transfer object area head address of each raster is updated, the data path switch 62 is switched to the raster address register 55 and the data path switch 63 is switched to the head address register 52, so that the source address register 31 and head address register 52 are updated through the adder 60. This holds true for the pattern address register 32 and destination address register 33. By using the address adding port explained in connection with the third embodiment, two-dimensional rectangular area transfer which is easy to meet the device drive program for area transfer in unit of one raster can be realized. In this case, the head address register is not used. Thus, in contrast to the method wherein upon completion of transfer of a given raster, a relative value between the value of the source address register 31 or the like at that time and the head address of a transfer object area of the next raster is added to the source address register 31 or the like by using the address adding port, the relative value is set in the raster address register and upon completion of transfer of a given raster, added to the source address register 31 to permit automatic update.

1.6 Sixth Embodiment

FIG. 11 shows a sixth embodiment of bit block transfer according to the invention in which there are provided the data structure transformers 58 and 59 adapted to mediate the data structure of the control program and the that of the VRAM 1, respectively. In FIG. 11, the data structure transformers 58 and 59 are added to the bit block support apparatus of the second embodiment shown in FIG. 1 but they may be applied to all of the other embodiments of the invention. The data structure differs for application programs and mainly classified into three kinds as will be explained with reference to FIGS. 12A to 12D. Shown in FIG. 12A is information of a given raster on a given plane stored in a main memory or the like having a width of 16 bits representative of one word. To develop the information on the VRAM 1, there are available three kinds of developing methods, of which a first one is shown in FIG. 12B wherein the arrangement of bits remains unchanged and development is carried out in unit of byte, a second one is shown in FIG. 12C wherein the arrangement of bits remains unchanged and development is carried out in unit of word and a third one is shown in FIG. 12D wherein the bit and address are both increased from left to right. Images displayed on the screen and images stored in the main memory are different for the three developing method. Accordingly, the data structure transformers 58 and 59 having the function of byte swap and word mirror, characteristic of the present invention, are provided to absorb the difference in data structure due to application programs. "Byte swap" is the function to access data as shown in FIG. 12A in unit of word and exchange the upper byte with the lower byte to match a data structure of FIG. 12B, and "word mirror" is the function to access the data as shown in FIG. 12A in unit of word and invert the arrangement of bits to match a data structure of FIG. 12D. The data structure transformer 58 is used to transfer data from the memory such as main memory 200 to the VRAM 1 and the data structure transformer 59 is used to transfer data from the VRAM 1 to the memory such as main memory 200.

1.7 Seventh Embodiment

A seventh embodiment of the invention directed to two-dimensional bit block transfer will now be described. FIG. 29 is a block diagram showing a portion necessary to perform bit block transfer for a two-dimensional area which is extracted from the controller. In this embodiment, a second sequential transfer sequencer 87 and raster counter 51a and a count value hold register 92 for holding a copy of the value written in the first sequential transfer counter 14 are provided, and the address generator 308 is so constructed as to generate a two-dimensional address. The address cycle generator 10 includes the access cycle generator control register 90 for designating which one of items in Tables 1 and 2 is to be operated when the previously-described read request or write request is issued and the access cycle generator control register 91 for designating which one of source and pattern is to be read during the pre-read operation.

Figure 30:
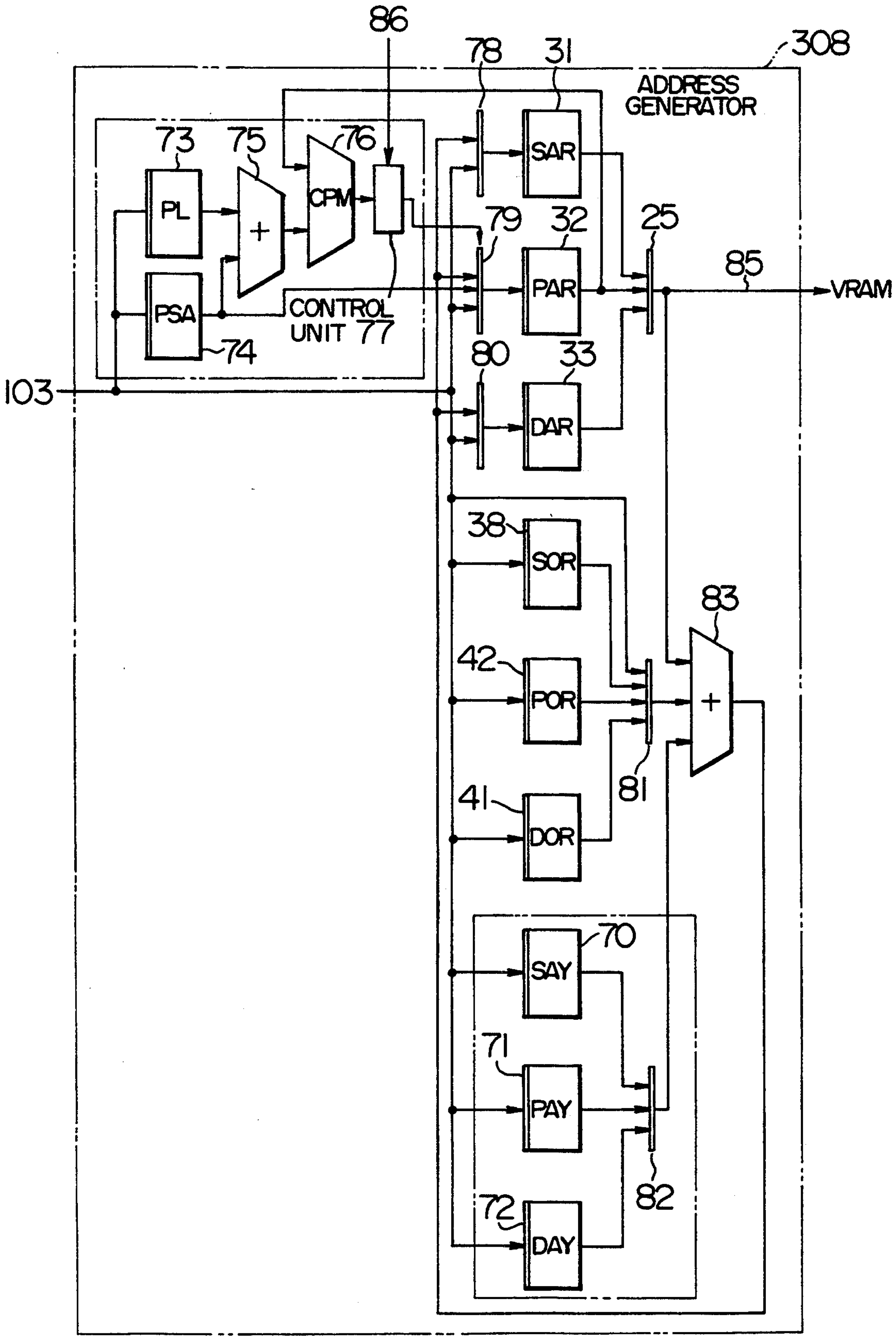
FIG. 30 is a diagram showing an example of construction of an address generator complying with two-dimensional configuration.
Figure 31:
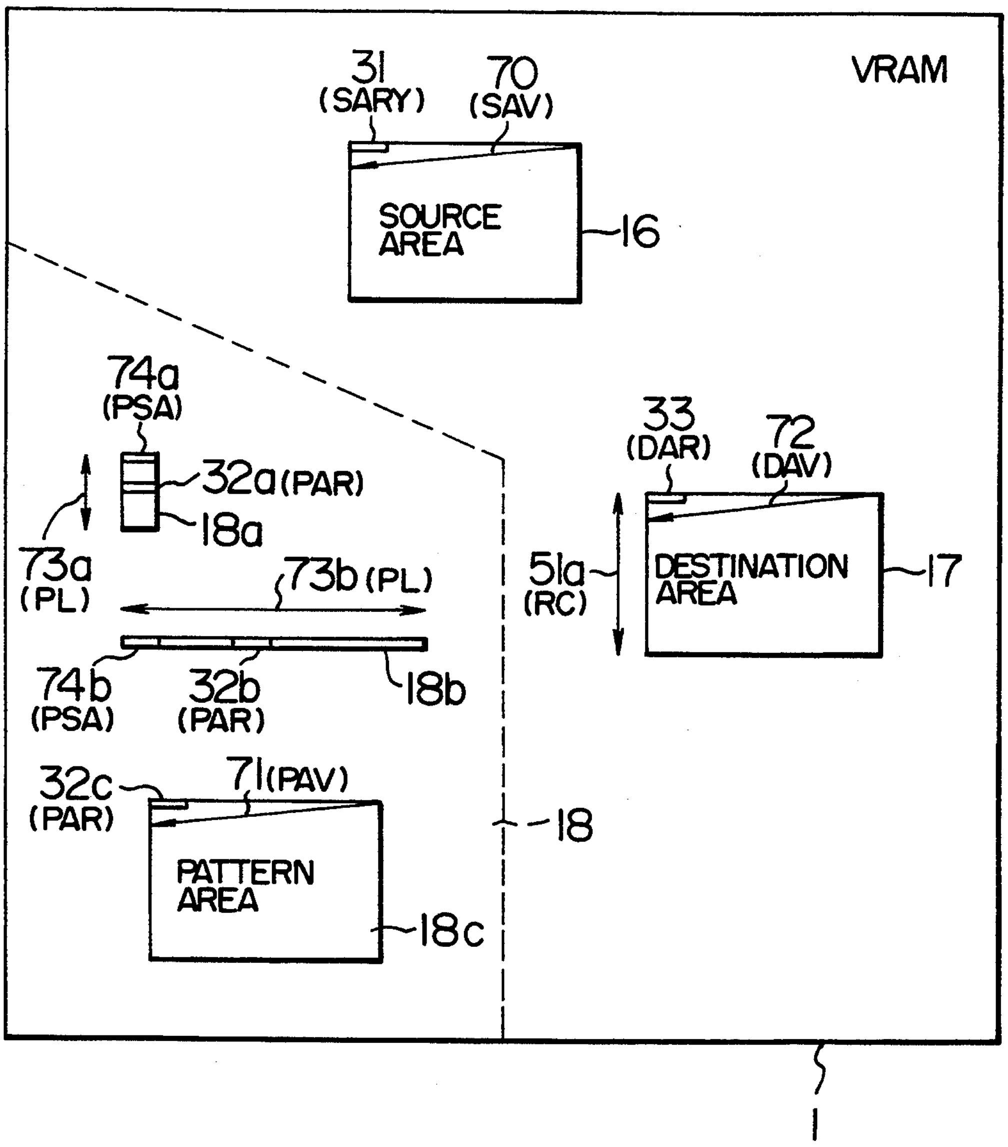
FIG. 31 is a diagram for explaining parameters during two-dimensional bit block transfer.

FIG. 30 shows a specific construction of the address generator 308 of FIG. 29. In the figure, the address generator 308 differs from the foregoing embodiments by having two dotted sections inside the generator block. Reference numeral 70 designates a source area sum register, 71 a pattern area sum register, 72 a destination area sum register, 73 a pattern length register, 74 a pattern start address register, 75 an adder for determining an end address of a repetitive pattern, 76 a comparator for comparing the end address of repetitive pattern determined by the adder 75 with the present value of the pattern address register 32, and 77 a control unit for controlling the selector 79 adapted to select input data to the pattern address register 32. In the following operational description, the meaning of parameter in each register will be explained by making reference to FIG. 31. FIG. 31 shows what meaning the value of each register mentioned above has in relation to the source area 16, destination area 17 and pattern areas 18a, 18b and 18c on the VRAM 1 during the two-dimensional bit block transfer.

The raster counter 51a shown in FIG. 29 is written precedently with a raster number which determines the number of rasters to be transferred in the vertical direction. When the number of words in one horizontal line of an area is then written in the first sequential transfer sequencer 15 this value is written in the first sequential transfer counter 14 and count value hold register 92. Concurrently with this writing, the first sequential transfer sequencer 15 begins to generate a predetermined number of sequential accesses.

The source area 16 is pointed by the value of the source address register 31 (FIG. 30). When a read access by the first sequential transfer sequencer 15 is expanded by the access cycle generator 10 to provide a read access to the source area 16, the VRAM 1 is read by the value of the source address register 31 and the read value is stored in the buffer register 2 corresponding to each plane of the VRAM 1 (the previous value of the buffer register 2 is stored in the merge register 7). Upon completion of the read access to the source area 16, the value of the source address register 31 shown in FIG. 30 and the value of the source offset register 38 are added together by the adder 83 and an addition result is inputted as the next address for the source area 16 to the selectors 78, 79 and 80, of which the selector 78 passes the addition result to cause it to be again stored in the source address register 31. In the example of FIG. 31, the address value indicated by the source address register 31 moves to the right but it can also be moved to the left depending on the value of the source offset register 38 (practically, it can also be moved up and down but the two-dimensional bit block transfer will be described by referring to right/left movement. This holds true for the destination offset register 41 to be described later).

As the final round of a series of transfer processings by the first sequential transfer sequencer 15 is reached, the value of the source address register 31 shown in FIG. 30 reaches the right end of the source area 16 (FIG. 31). At that time, if a signal line 97 representative of the state of the second sequential sequencer 87 (FIG. 29) is active, the value of the source area sum register 70 is supplied to the adder 83 through the selector 82 to move the value of the source address register 31 to the left end of the next transfer raster as shown in FIG. 31. Offset values beginning with the right end of the present raster and ending in the left end of the next raster are precedently written in the source area sum register 70. As described previously in connection with the set value of the source offset register 38, movement from the right end to upward and downward rasters at the left end or movement from the left end to upward and downward rasters at the right end can be designated freely in accordance with a value set in the source area sum register 70. This holds true for values set in the pattern area sum register 71 and destination area sum register 72 to be described later.

The pattern area will now be described. The pattern area 18 is pointed by the value of the pattern address register 32 (FIG. 30). When a read access by the first sequential transfer sequencer 15 is expanded by the access cycle generator 10 to provide a read access to the pattern area 18, the VRAM 1 is read by the value of the pattern address register 32 and the read value is stored in the buffer register 3 corresponding to each plane of the VRAM 1 (the previous value of the buffer register 3 is stored in the merge register 8). Upon completion of the read access to the pattern area 18, the value of the pattern address register 32 and the value of the pattern offset register 42 are added together by the adder 83 and an addition result is again stored as the next address for the pattern area 18 in the pattern address register 32. In FIG. 31, three typical examples of pattern area 18 are shown which will be described below.

In the case of pattern area 18*a*, a repetitive pattern of one word for each raster is stored in the vertically downward direction on the screen. In this case, the read operation of pattern data is only once for one raster transfer processing. Therefore, the access cycle generator control register 90 (FIG. 29) for stipulating the transfer cycle is set with an item other than items 2, 3, 6 and 7 in Table 1 and the access cycle generator control register 91 (FIG. 29) for stipulating the pre-read cycle is set with either item 1 or 2 in Table 1. Through this setting, read access using the pattern address register 32 is done only once during the initial pre-read cycle of each horizontal transfer (accordingly, update of the pattern address register 32 is also done once during each horizontal transfer). This setting is also applicable to bit block transfer having the pattern area 18*b* as object. A pattern start address 74*a* is stored in the pattern start address register 74 (FIG. 30). An address 32*a* of a pattern to be referenced to next is stored in the pattern address register 32. The pattern offset register 42 is set with a value which is added to the contents of the pattern address register 32 to provide an address which is lower by one in the illustration. Where this value is $\alpha$ and the number of patterns is $\beta$, a product 73*a* of multiplication of $\alpha$ and $\beta$ is set in the pattern length register 73. A pattern start address 74*a* and the value 73 are added together by the adder 75 (FIG. 30) to provide the final address of the pattern area 18*a*. This final address is compared with the value of the pattern address register 32 by the comparator 76. When the value of the pattern address register 32 does not reach the final address, the control unit 77 selects the output of the adder 83 (the sum of the value of pattern address register 32 and the value of pattern offset register 42) which in turn is used as an updated value of the pattern address register 32 but when the value of the pattern address register 32 reaches the final address, the control unit 77 selects the value of the pattern start address register 74 which in turn is used as an updated value of the pattern address register 32. As described above, since in the read of the repetitive pattern area 18*a* stored in the vertically downward direction, the pointer for reading again returns to the pattern start address when the final address of the area is reached, the repetitive pattern can be defined independently of the set value of the raster counter 51*a*.

In the case of pattern area 18*b*, a repetitive pattern of one word length for each raster is stored in the horizontally right direction on the screen. A pattern start address 74*b* is stored in the pattern start address register 74. An address 32*b* of a pattern to be referenced to next is stored in the pattern address register 32. The pattern offset register 42 is set with a value which is added to the contents of the pattern address register 32 to provide an address which is right by one in the illustration. Where this value is $\gamma$ and the number of patterns is $\beta$, a product 73*b* of multiplication of $\gamma$ and $\beta$ is set in the pattern length register 73. Here $\gamma$ has a value of $+1$ and practically the value 73*b* is $\beta$. This corresponds to the case where in connection with the pattern area 18*a*, the value set in the pattern offset register 42 is made to be 1 and the value set in the pattern length register 73 is made to be $\beta$. The operational description is similar to that of the pattern area 18*a* and will not be given herein.

Like the source area 16 and the destination area 17, the pattern area 18*c* is a two-dimensional pattern as explained in connection with the foregoing embodiments and corresponds to drawing of graphic cursor using the pointing device. In this case, like the source area 16 described previously, as the final round of a series of transfer processings by the first sequential transfer sequencer 15 is reached, the value of the pattern address register 32 reaches the right end of the pattern area 18*c*. At that time, if the signal line 97 representative of the state of the second sequential sequencer 87 (FIG. 29) is active, the value of the pattern area sum register 71 is supplied to the adder 83 through the selector 82 to move an address 32*c* of the pattern address register 32 to the left end of next transfer raster as shown in FIG. 31. Offset values beginning with the right end of the present raster and ending in the left end of the next raster are precedently written in the pattern area sum register 71. Movement from the right end to upward and downward rasters at the left end or movement from the left end to upward and downward rasters at the right end can be designated freely in accordance with a value set in the pattern area sum register 71.

Since units participating in control of the aforementioned pattern areas a and b (repetitive pattern) and pattern area c (two-dimensional pattern) are different from each other, the control processing is carried out by switching a pattern address update unit using, for example, the pattern start address register 74 and a pattern address update unit using, for example, the pattern area sum register 71 by means of a switch unit not shown.

The destination area 17 is pointed by the value of the destination address register 33. When a read access or a write access by the first sequential transfer sequencer 15 is expanded by the access cycle generator 10 to provide a read access to the destination area 17, the VRAM 1 is read by the value of the destination address register 33 and the read value is stored in the buffer register 4 corresponding to each plane of the VRAM 1. At that time, the value of the destination address register 33 is not updated. Subsequently, when a write access by the first sequential transfer sequencer 15 is expanded by the access cycle generator 10 to provide a write access to the destination area 17, the VRAM 1 is read by the value of the destination address register 33. Upon completion of the write access to the destination area 17, the value of the destination address register 33 and the value of the destination offset register 41 are added together by the adder 83 and an addition result is again stored as the next address for the destination area 17 in the destination address register 33. As the final round of a series of transfer processings by the first sequential transfer sequencer 15 is then reached, the value of the destination address register 33 reaches the right end of the destination area 17. At that time, if the signal line 97 (FIG. 29) representative of the state of the second sequential sequencer 87 is active, the value of the destination area sum register 72 is supplied to the adder 83 through the selector 82 to move the value of the destination address register 33 to the left end of the next transfer raster as shown in FIG. 31. Offset values beginning with the right end of the present raster and ending in the left end of the next raster are precedently written in the destination area sum register 72. Movement from the right end to upward and downward rasters at the left end or movement from the left end to upward and downward rasters at the right end can be designated freely in accordance with a value set in the destination area sum register 72.

In accordance with the above embodiment, the two-dimensional bit block transfer can be effected even through the use of the repetitive pattern. In the above embodiment, the determination of the end address of the repetitive pattern has been described as being effected by the exemplary method of adding the pattern start address and the pattern length but conceivably, it may also be accomplished by using an address data hold unit such as a pattern end address register.

2. Character Drawing

Embodiments of character drawing according to the invention will now be described. As in the precedence, an example of the overall construction of the present embodiment is illustrated in FIG. 15. The data operation unit 306 in the figure has portions 320, 320' and 320'' common to the whole plane of the VRAM 1 shown in FIG. 16 and these portions has the same construction as that shown for the portion 320 in FIG. 17. An example of construction of the address generator 308 of FIG. 15 is shown in FIG. 18. The contents of FIGS. 16, 17 and 18 has already been described in connection with the foregoing bit block transfer and will not be described herein. When receiving a request for reading the VRAM 1 from the CPU 100 or the first sequential transfer sequencer 15 to be detailed later, the access cycle generator 10 of FIG. 15 generates a read access containing at least one of access operations to the source, destination and pattern areas by using the address generator 308. When receiving a request for writing the VRAM 1 from the CPU 100 or the first sequential transfer sequencer 15 to be detailed later, the access cycle generator 10 generates a write access or the combination of read access and write access to a destination area by using the address generator 308 and drives the memory controller for the VRAM 1.

Figure 20:
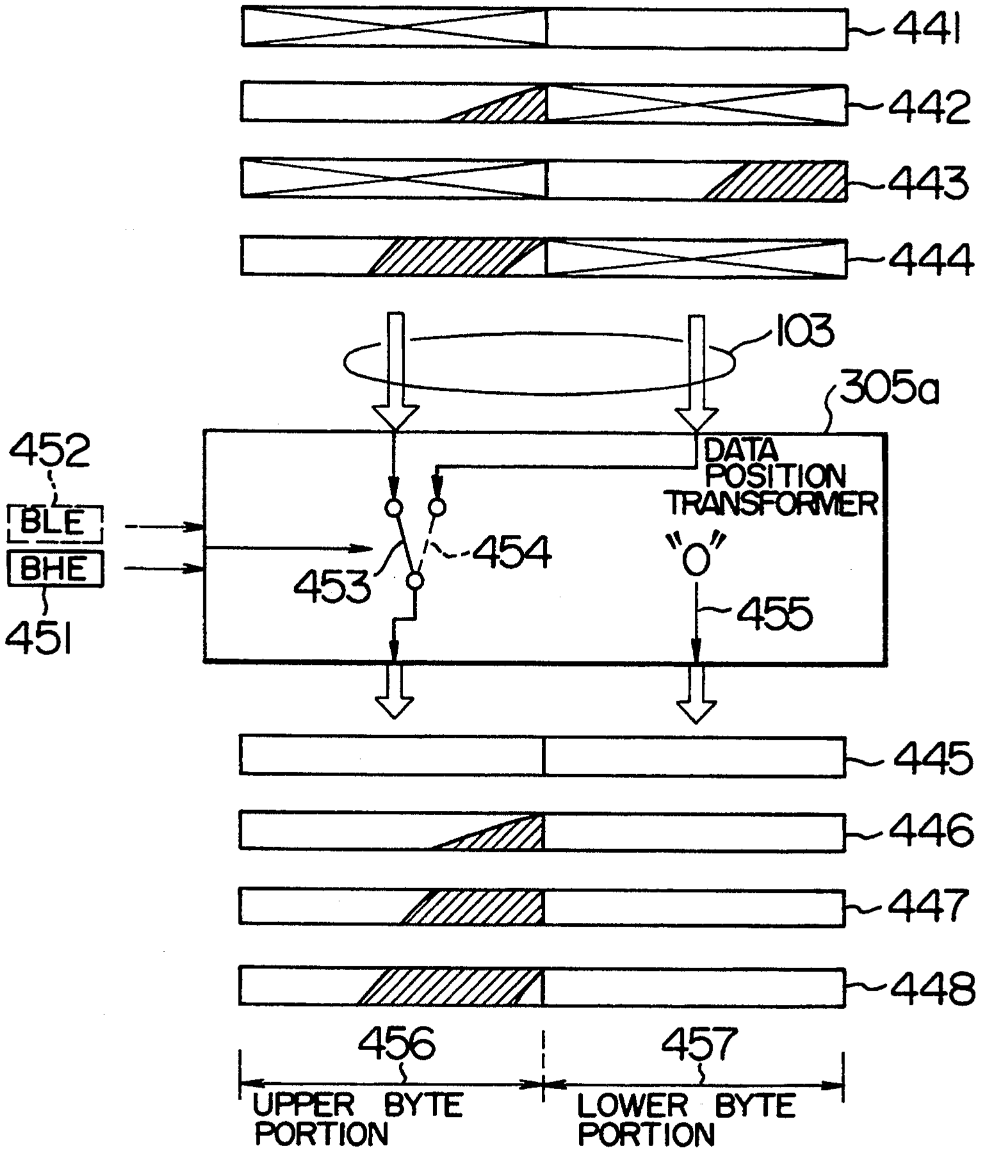
FIG. 20 is a diagram useful to explain the operation of a data position transformer.
Figure 22A:
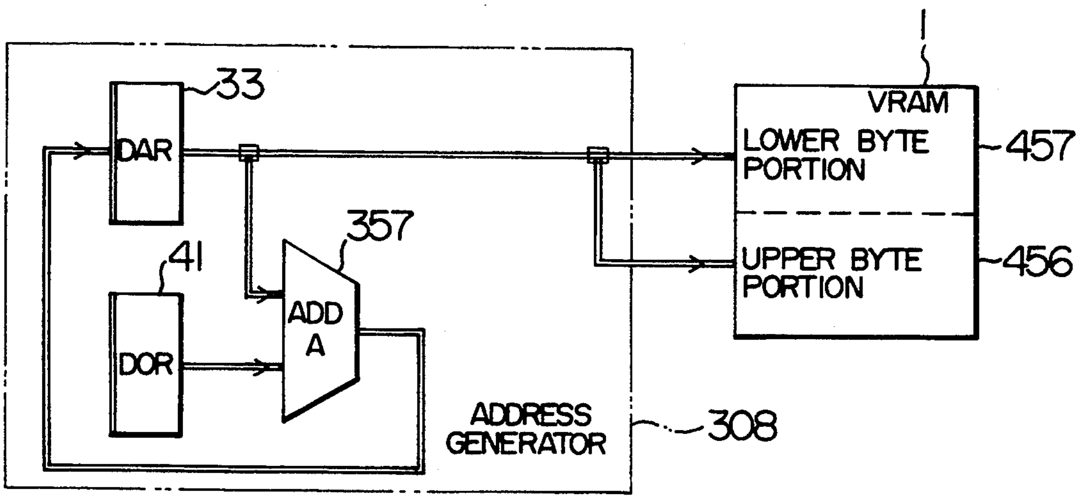
FIGS. 22A and 22B are diagrams useful to explain the generation of address during character drawing.
Figure 22B:
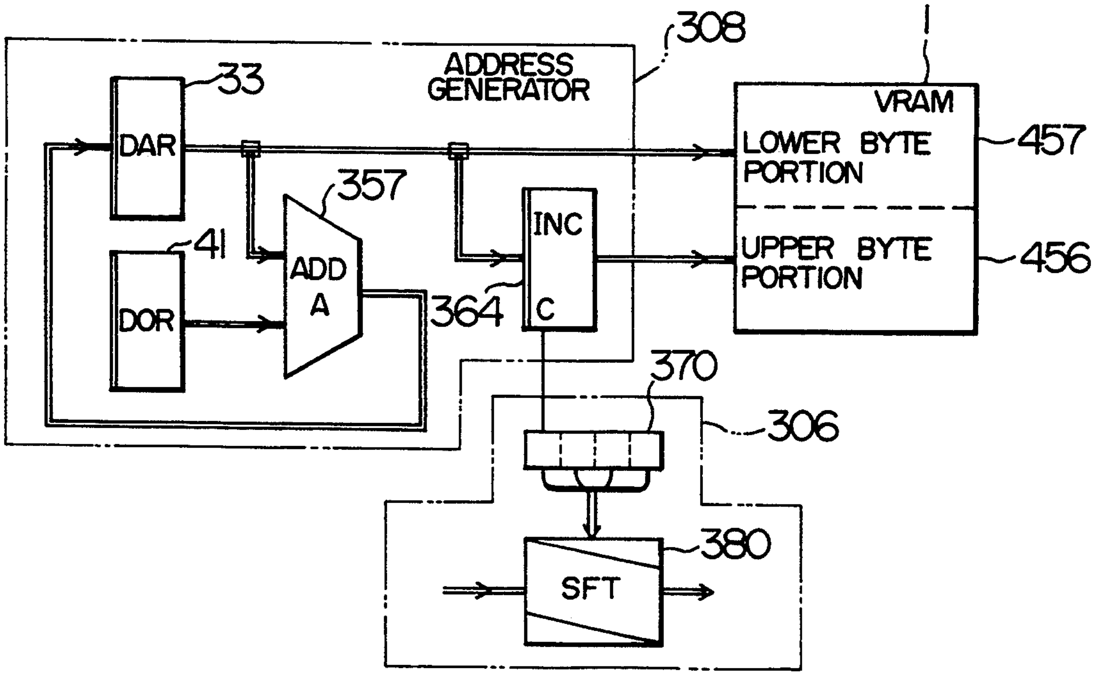

When the bit number of data bus of the VRAM 1 differs from the bit number of data from the CPU 100, the data position transformer 305*a* shown in FIG. 15 a constituent element most characteristic of the present invention, puts the data of the CPU 100, through an image on the screen, to the left or right on the VRAM data bus and resulting data is supplied, as external data, to the data structure transformer 58 (FIG. 16) of the data operation unit 306. A specific construction of the data position transformer 305*a* is shown in FIG. 20 and structural portions of the address generator 308 explained with reference to FIG. 18 which are specific to the embodiment to be described below are shown in FIGS. 22A and 22B. Since the character drawing processing method slightly differs with the difference in the address generator 308, the use of the FIG. 22A construction of address generator 308 will be described as a first embodiment of character drawing according to the invention and the use of the FIG. 22B construction will be described as a second embodiment of character drawing of the invention. A portion characteristic of the invention and common to the first and second embodiments will first be described in the following description, followed by descriptions of portions specific to the respective embodiments.

Figure 19:
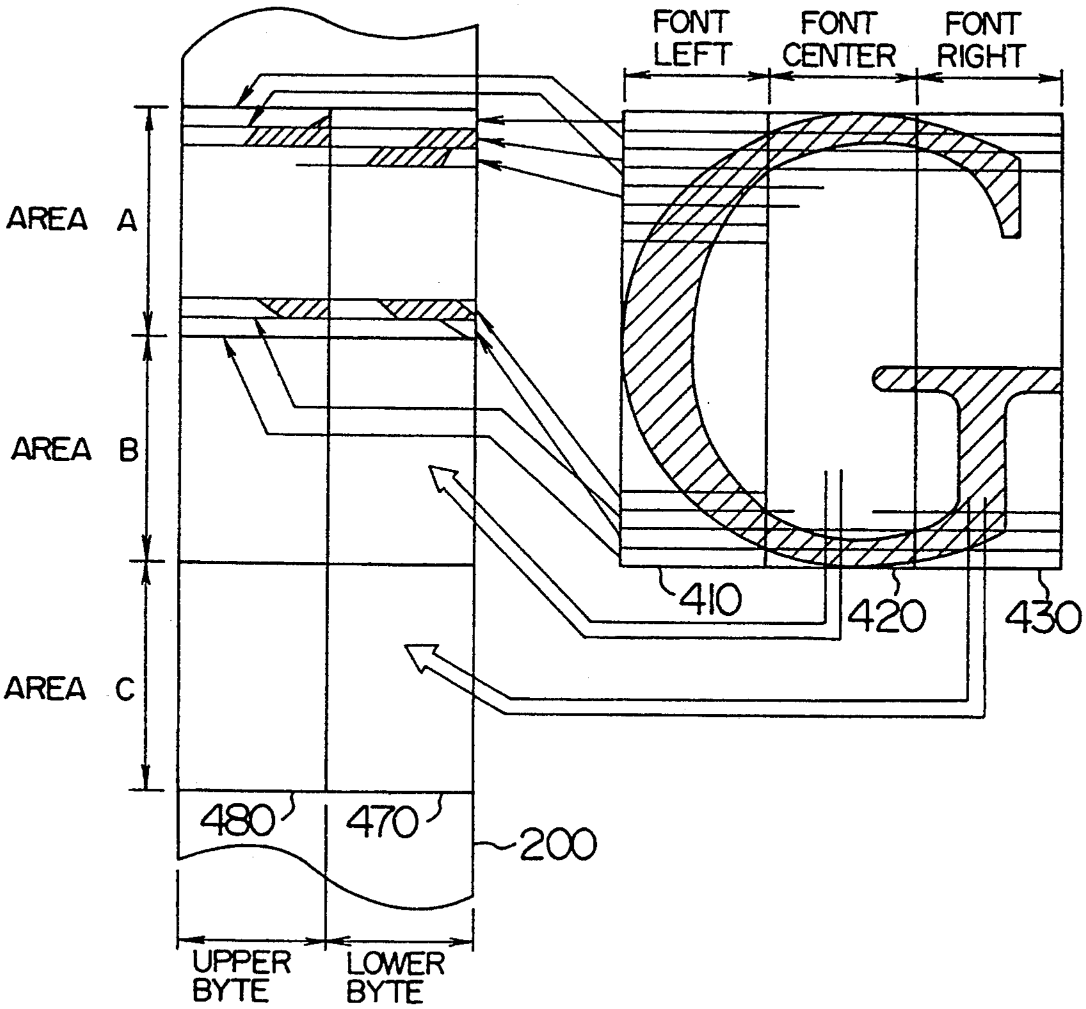
FIG. 19 is a diagram useful to explain a method of storing a character font in a main memory.

Firstly, a format of storage of a character font in the main memory 200 will be explained. FIG. 19 shows a format in accordance which a character font is stored in the main memory. In the figure, a character font of "G" having 24 dots in the horizontal direction is divided into three columns, i.e., a font left 410, a font center 420 and a font right 430 which are stored in areas A, B and C of the main memory 200, respectively. Since the main memory 200 shown in FIG. 19 has a bus width of 16 bits, the character font is stored alternately in a lower byte 470 and an upper byte 480 of the main memory 200.

The CPU 100 reads, byte by byte, character font data stored in the main memory 200 in unit of byte and writes the data into the VRAM 1. To this end, the CPU 100 may execute an instruction for sequential data transfer from the main memory 200 to the VRAM 1. As a result, when the data bus reaching the VRAM 1 is of 16 bits as in the present embodiment, the character font data develops at the lower 8 bits and upper 8 bits of the 16-bit data bus alternately. This state is shown in FIG. 20. (If the data bus reaching the VRAM 1 is of 32 bits, the character font data develops on four upper to lower 8-bit buses of the 32-bit data bus in regular order but the data bus is herein described as being of 16 bits.)

As shown in FIG. 20, the area A on the main memory 200 of FIG. 19 is read byte by byte to supply data pieces 441, 442, 443 and 444 to the data position transformer 305*a* in regular order. In bytes labeled with × sign in the data pieces 441, 442, 443 and 444, the value is indefinite. Bus control signals BLE 452 (bus low enable: indicative of validity of lower byte) and BHE 451 (bus high enable: indicative of validity of upper byte) from the CPU 100 indicate valid data positions of the data bus 103, respectively, and therefore the switch path is transferred as indicated by 453 by means of a bus switch unit when the BHE 451 is valid but as indicated by 454 when the BLE 452 is valid. As a result, the data position transformer 305*a* characteristic of the present invention operates in such a manner that byte data from the CPU 100, as represented by an image on the screen, is always put to the left (upper byte portion 456) with the remaining portion of the bus (lower byte portion 457) inserted with zero data as indicated by path 455 and the resulting data is supplied to the data operation unit 306. In other words, data pieces 441, 442, 443 and 444 are transformed into data pieces 445 446, 447 and 448, respectively, and then supplied to the data operation unit 306. In the data operation unit 306 of FIG. 16, the inputted data is first passed through the data structure transformer 59 and subsequently subjected to data operation as below depending on how the character is drawn. (It is assumed herein that the data structure transformer 59 does not apply any processing to the given data and relays it to the succeeding stage but in some applications, for example, requiring turn-over drawing of characters, mirror transform is carried out using the data structure transformer.)

(1) When Only Font Part of Character is Drawn

Figure 25:
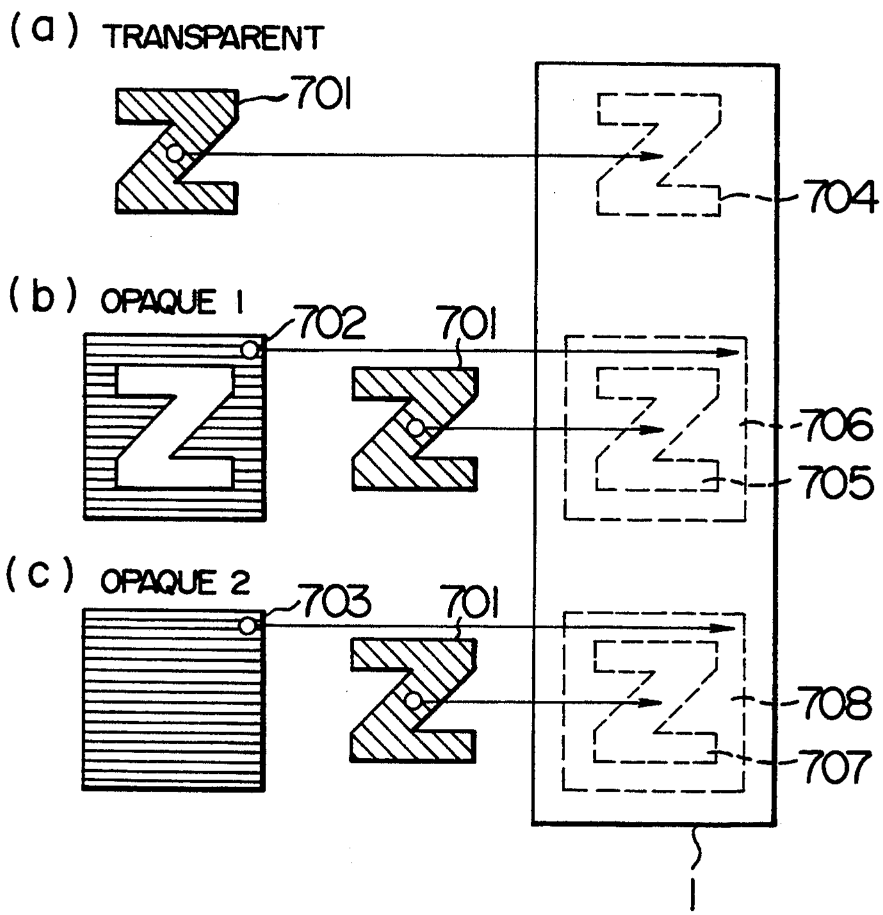
FIG. 25 is a diagram showing the kinds of character drawing methods.

An instance where only a font part of a character is drawn corresponds to transparent write as shown at (a) in FIG. 25. In other words, a font part 701 of a character is written into a destination portion 704 of the VRAM 1. Font data delivered out of the data structure transformer 59 (FIG. 16) enters the bit mask shifter 333 at which it is shifted suitably so as to be used for controlling write of the VRAM 1 in unit of bit.

Thus, only the destination portion 704 of VRAM 1 corresponding to the font part 701 of the character is rewritten and the remaining portion remains unchanged. Since the character font data has precedently been put to the left by means of the data position transformer 305*a* as described by referring to FIG. 20, the shift value of the bit mask shifter 333 can be constant during one vertical transfer. Contrarily, in the prior art, character font data alternately develops at the upper byte portion 480 (FIG. 19) and lower byte portion 470 (FIG. 19) and therefore the shift value cannot be constant. Here, "one vertical transfer" signifies the processing of transferring data at area A, B or C of the main memory 200 shown in FIG. 19 to the VRAM 1. Write data (character color) to the VRAM 1 at that time is precedently set in the buffer register 2 or 3 shown in FIG. 17 and the three-value raster operator 9 is designated with an operation for supplying the contents of the buffer register 2 or 3 to the VRAM 1. If character drawing needs raster operation of the present image data on the destination portion 704 (FIG. 25) of the VRAM 1, that is, an area about to be drawn with a character and the character color to be drawn, the three-value raster operator 9 is so designated as to operate the contents of buffer register 2 or 3 and the contents of buffer register 4.

Figure 21:
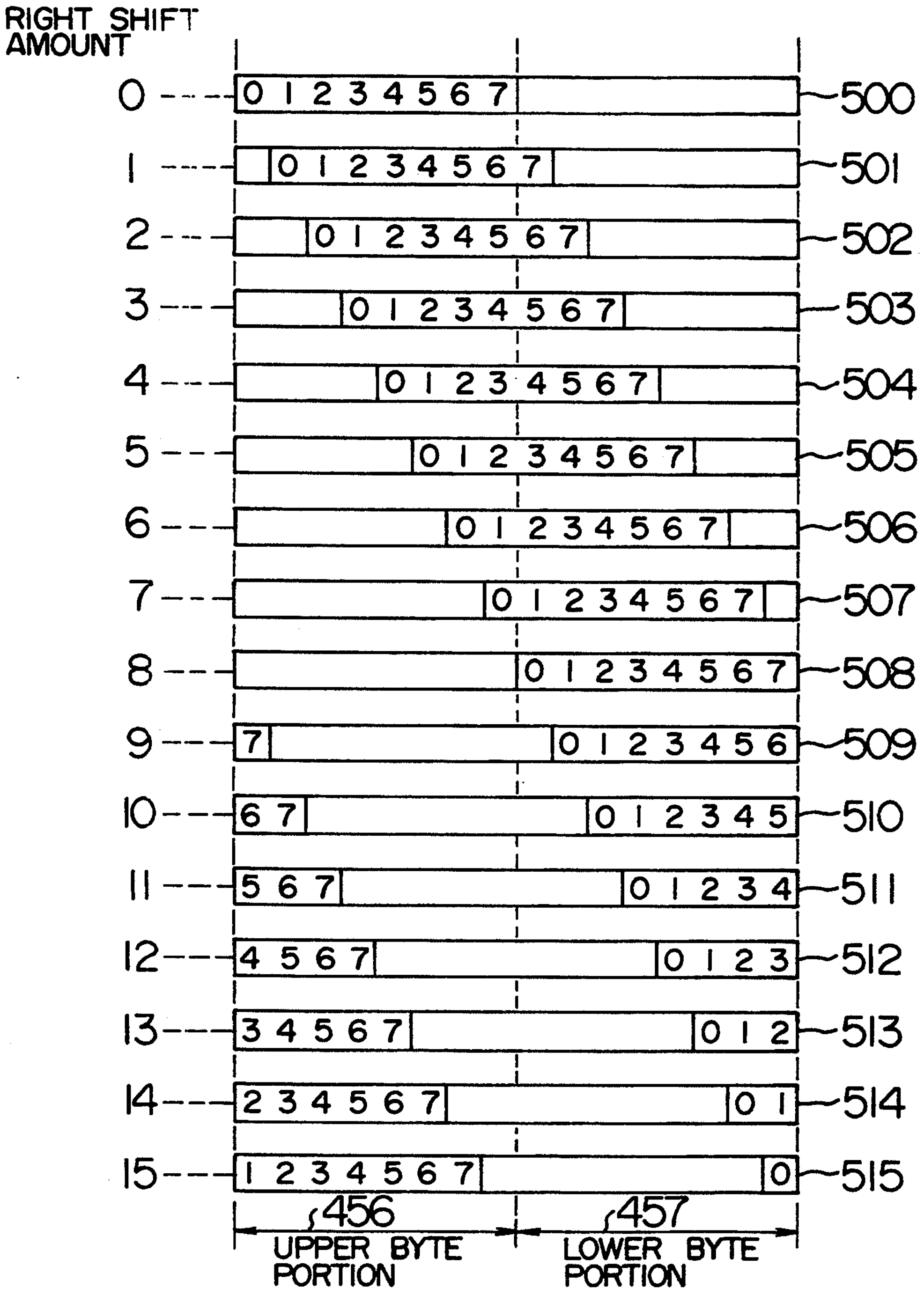
FIG. 21 is a diagram showing the relation between the shift amount of shifter and data.

Referring now to FIG. 21, the relation between the shift amount set in the bit mask shifter 333 and shifted data. In the figure, a portion labeled with numbers 0 to 7 is a data portion of character font having one byte width. Within the range of the shift amount of from 0 to 8 (from data 500 to data 508), simple shift proceeds but within the range of the shift amount of from 9 to 15 (from data 509 to data 515), data is divided into two. With the address generator 308 having the construction of FIG. 22A used, that is, in the first embodiment of character drawing of the invention to be described later, a shifter capable of making zero the whole of the upper byte portion 456 (FIG. 20) within the range of the shift amount of from 9 to 15 (from data 509 to data 515), that is, permitting overflowed data to be lost as the shift proceeds is used as the bit mask shifter 333.

With the address generator 308 having the construction of FIG. 22B used, that is, in the second embodiment of character drawing of the invention to be described later, a shifter capable of rotating the data as shown in FIG. 22A is used as the bit mask shifter 33.

(2) When Foreground and Background of Character are Drawn Simultaneously

An instance where a foreground and a background of a character are drawn simultaneously corresponds to opaque 1 write as shown at (b) in FIG. 25. In other words, the font part 701 of a character is drawn into a foreground destination portion 705 of the VRAM 1 and a background portion 702 of the character is written into a background destination portion 706. In FIG. 16, font data delivered out of the data structure transformer 59 enters the shifter 335 at which it is shifted suitably so as to be supplied to the bit selector 327 for each plane shown in FIG. 17. Since the character font data has precedently been put to the left by means of the data position transformer 305*a* as described by referring to FIG. 20, the shift value of the shifter 335 can be constant during one vertical transfer. Contrarily, in the prior art, character font data alternately develops at the upper byte portion (FIG. 19) and lower byte portion 470 (FIG. 19) and therefore the shift value cannot be constant. Here, "one vertical transfer" signifies the processing of transferring data at area A, B or C of the main memory 200 shown in FIG. 19 to the VRAM 1. In order that only a portion of 8 bits of VRAM1 corresponding to the width of character data can be rewritten, the bit mask register 331 is set with a mask pattern which permits write of only that portion.

In FIG. 17, the buffer register 3 is set with a foreground color corresponding to a font part of a character and the buffer register 2 is set with a background color corresponding to the other part than the character font. Then, the two-value raster operator 326 is designated with an operation for supplying the contents of the buffer register 3 to the VRAM 1 and the two-value raster operator 325 is designated with an operation for supplying the contents of the buffer register 2 to the VRAM 1. If character drawing requires a raster operation of the present image data of the destination portion 705 and that of the destination portion 706 as shown in FIG. 25 the two-value raster operator 326 is so designated as to operate the contents of the buffer register 3 and that of the buffer register 4 and the two-value raster operator 325 is so designated as to operate the contents of the buffer register 2 and that of the buffer register 4. The bit selector 327 selects, in unit of bit, the output of the two-value raster operator 326 at the character font part 701 (see FIG. 25) and the output of the two-value raster operator 325 at the background part 702 other than the character font (see FIG. 25), and the selected data is supplied, as write data, to the VRAM 1.

Referring now to FIG. 21, the relation between the shift amount set in the shifter 335 and shifted data. In the figure, a portion labeled with numbers 0 to 7 is a data portion of character font having one byte width. With the address generator 308 having the construction of FIG. 22A used, that is, in the first embodiment of character drawing of the invention to be described later and also with the address generator 308 having the construction of FIG. 22B used, that is, in the second embodiment of character drawing of the invention to be described later, a shifter capable of rotating the data as shown in FIGS. 22A and 22B is used as the shifter 335.

Used as the VRAM address in the above items (1) and (2) is not the CPU address but the address generated by the address generator 308 in FIG. 15 with the aim of accessing the VRAM 1 vertically.

The above is the operation common to the first and second embodiments of character drawing according to the invention. The character drawing processing specific to the first embodiment of character drawing according to the invention using the address generator of FIG. 22A will now be described.

2.1 First Embodiment

Referring to FIGS. 22A and 22B, the destination address register 33 constituting the address generator 308 is precedently set with an address for VRAM 1 at which write of a letter is started and the destination offset register 41 is precedently set with an offset value which is added to the destination address register 33 to provide an address shifted downwards by just one raster on the display screen. The access cycle generator 10 in FIG. 15 is so set as to generate a write access using the destination address register 33 when the CPU 100 generates a write cycle to the VRAM 1. If character drawing requires a raster operation of a destination area, the access cycle generator 10 is so set as to generate a read access using the destination address generator 33 when the CPU 100 generates a write cycle to the VRAM 1. Then, during the initial read access, the present image data on the destination area of VRAM 1 is read into the buffer register 4 of each plane and during the succeeding write access, a result of the raster operation is again written into the destination area of VRAM 1. Only after the completion of write access, the destination address register 33 is updated to a value which results from adding the present value and the value of the destination offset register by means of the address adder 357. Each time that vertical transfer by one column is completed, setting of the destination address register 33 and the like are renewed and vertical transfer for the next column is carried out. This processing repeats itself until drawing of the character is completed.

As described above, in accordance with the first embodiment of character drawing of the invention, the character drawing based on a sequential byte transfer instruction from the CPU 100, which cannot be achieved with the prior art, can be effected to permit drawing of characters at a speed which is 1.5 to 5 times that of the prior art (though depending on throughput of the CPU 100 per se).

2.2 Second Embodiment

Figure 23:
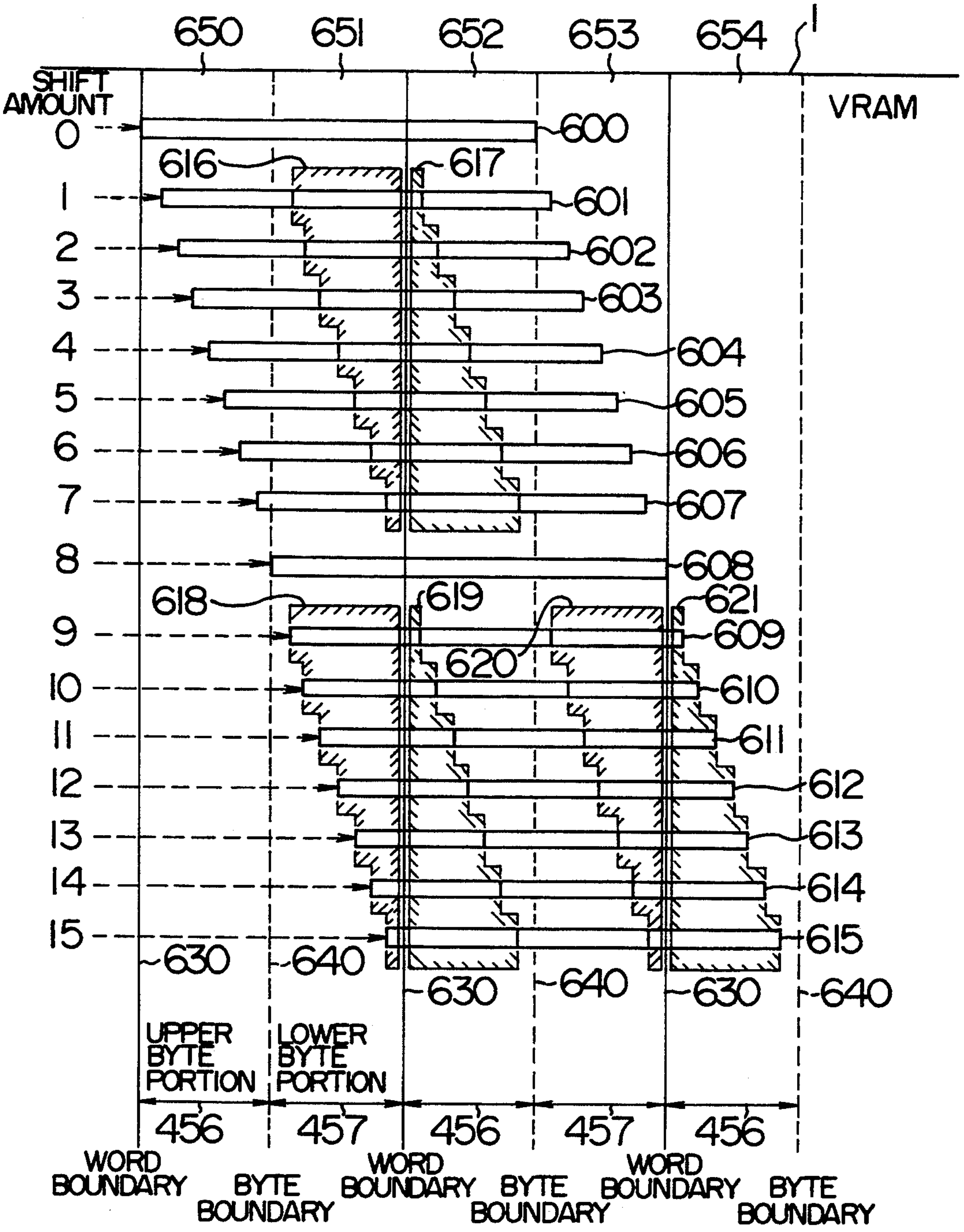
FIG. 23 is a diagram showing the relation between the character drawing start position and the number of vertical drawing operations.

A second embodiment of character drawing according to the invention will now be described. When drawing a character on the VRAM 1, differences in drawing processing occur depending on the character drawing position in the horizontal direction as shown in FIG. 23. The differences shown in FIG. 23 will be described by taking the character having 3-byte width shown in FIG. 19. One byte of the VRAM 1 is accessed in unit of word consisting of the upper byte portion 456 and lower byte portion 457. When the character drawing start position begins with a word boundary 630 of the VRAM 1, that is, the shift amount is zero, the drawing position is as indicated at 600 and drawing can be effected through three vertical transfer processings of font left 410, font center 420 and font right 430 shown in FIG. 19. Contrarily, when the shift amount is from 0 to 7, the font center 420 crosses the word boundary 630 as indicated at drawing positions 601 to 607 and two vertical transfer processings for areas 616 and 617 are required of the font center 420 (FIG. 19). Therefore, for the shift amount being from 1 to 7, drawing of one character can be completed through four vertical transfer processings. For the shift amount being 8, drawing can again be effected through three vertical transfer processings as indicated at drawing position 608. But within the range of the shift amount measuring 9 to 15 two portions of font left 410 (FIG. 19) and font right 430 (FIG. 19) cross the word boundaries 630 as indicated at drawing positions 609 to 615 so that two vertical transfer processings for areas 618 and 619 are required of the font left 410 (FIG. 19) and two vertical transfer processings for areas 620 and 621 are required of the font right 430 (FIG. 19). Therefore, for the shift amount being from 9 to 15 drawing of one character can be completed through five vertical transfer processings. On the assumption that the character drawing start position occurs at the same probability for the individual shift amounts, the averaged number of vertical transfer processings per character is about 4.3. In accordance with the second embodiment of character drawing of the invention, the word boundary in FIG. 23 is substantially eliminated to complete drawing through the same minimum number of vertical transfer processings as that for the shift amount being 0 (drawing position 600) or 8 (drawing position 608) even when drawing starts at any position.

In FIG. 22A, the upper and lower byte portions 456 and 457 are supplied with the same address from the destination address register 33. Contrarily, in FIG. 22B, the lower byte portion 457 of the VRAM 1 is supplied directly with an address from the destination address register 33 but the upper byte portion 456 is supplied with an address through an increment unit 364. The increment unit 364 operates so as to deliver the address of the destination address register 33 without alternation to supply it to the upper byte portion 456 when an input to increment unit 364 indicated at C is invalid (inactive) but increment the address of the destination address register 33 by +1 to supply a result to the upper byte portion 456 when the input at C is valid (active). The input supplied to the increment unit 364 at C is one bit of a shift amount setting unit 370 provided for a shifter 380 inside the data operation unit 306. The shifter 380 behaves as the bit mask shifter 333 when only the character font part is drawn as explained in item (1) above and as the shifter 335 when the foreground and background are drawn simultaneously as explained in item (2) above.

As shown in FIG. 21, for the shift amount being 0 to 7 (data 500 to data 507), font data of a letter is continuous from upper byte portion 456 to lower byte portion 457 and for the shift amount being 8 to 15 (data 508 to data 515), the character font data is continuous from lower byte portion 457 to upper byte portion 456. Therefore, within the range of the shift amount being 8 to 15 (data 508 to data 515), the address supplied to the upper byte portion 456 is incremented by +1 in relation to the address supplied to the lower byte portion 457 to ensure that the lower byte portion 457 and upper byte portion 456 can be drawn through one write operation. Therefore, for the shift amount of the shifter 380 being 0 to 7, the C input to the increment unit 364 of FIG. 22B may be inactive and for the shift amount being 8 to 15 the C input to the increment unit 364 may be active. If the shift amount is of 4 bits having 16 values, the most significant bit can be used as the control signal of C input.

This will be described more specifically with reference to FIG. 23. When in FIG. 23 the shift amount for character drawing start position is from 0 to 7 with the start positions 600 to 607 occurring, the font left 410 corresponds to the case of the shift amount being from 0 to 7 (data 500 to data 507) in FIG. 21 and so the address is the same for the upper and lower byte portions 456 and 457 of the VRAM 1 and drawing is carried out for the areas 650 and 651. Since the font center 420

(FIG. 19) corresponds to the case of the shift amount being from 8 to 15 (data 508 to data 515) in FIG. 21, the upper byte portion 456 of the VRAM 1 is larger than the address of the lower byte portion 457 by one address and drawing is carried out for the areas 651 and 652. In the aforementioned first embodiment of character drawing according to the invention, the font center is drawn through two processings of portions 616 and 617. Like the font left 410 (FIG. 19), the font right 430 (FIG. 19) corresponds to the case of the shift amount being from 0 to 7 (data 500 to data 507) in FIG. 21 and so the address is the same for the upper and lower byte portions 456 and 457 of the VRAM 1 and drawing is carried out for the areas 652 and 653. Consequently, within the range of the shift amount for character drawing start position being from 0 to 7 in FIG. 23, i.e., start positions 600 to 607, one character can be drawn through the minimum of three vertical transfer processings.

The operation for the shift amount for character drawing start position being from 8 to 15 i.e., start positions 608 to 615 in FIG. 23 will now be described. Since the font left 410 (FIG. 19) corresponds to the case of the shift amount being from 8 to 15 (data 508 to data 515), the upper byte portion 456 of the VRAM 1 is larger than the address of the lower byte portion 457 by one address and drawing is carried out for the areas 651 and 652. In the aforementioned first embodiment of character drawing according to the invention, the font left is also drawn through two processings of portions 618 and 619. The font center 420 (FIG. 19) corresponds to the case of the shift amount being from 0 to 7 (data 500 to data 507) in FIG. 21, the address is the same for the upper and lower byte portions 456 and 457 of the VRAM 1 and drawing is carried out for the areas 652 and 653. Like the font left 410, the font right 430 corresponds to the case of the shift amount being from 8to 15 (data 508 to data 515) in FIG. 21 and so the upper byte portion 456 of the VRAM 1 is larger than the address of the lower byte portion by one address and drawing is carried out for the areas 653 and 654. In the aforementioned first embodiment of character drawing of the invention, the font right is also drawn through two processings of portions 620 and 621. Consequently, within the range of the shift amount for character drawing start position being from 8 to 15 in FIG. 23, i.e., start positions 608 to 615 one character can also be drawn through the minimum of three vertical transfer processings.

As described above, in accordance with the second embodiment of character drawing of the invention, one character can be drawn through the minimum number of vertical transfer processings for all the cases of the shift amount being from 0 to 15. More specifically, in the example of FIG. 23, the averaged number of vertical transfer processings which is 4.3 in accordance with the first embodiment of character drawing of the invention can be reduced to 3. Consequently, the speed of character drawing can be 1.4 times that in the first embodiment which is also directed to speedup of character drawing.

2.3 Third Embodiment

Of the character drawing methods shown in FIG. 25 opaque 2 depicted at (c) has not been described yet. Essentially, drawing of opaque write of character is effected by the method described in the case where the foreground and background of a character are drawn simultaneously as explained in connection with the above item (2) but if the drawing is carried out as explained in the above item (2) with the prior art apparatus not having the component units as described in connection with the invention, load of character drawing processing on the CPU 100 is increased significantly. Accordingly, the control program for window system realizes opaque write by using the method shown at (c) in FIG. 25. More particularly, a body face part 703 of a character is first written into a body face destination portion 708 of the VRAM 1 and thereafter the font part 701 of the character is written into a foreground destination portion 707 of the VRAM 1. In the method shown at (c) in FIG. 25 if character drawing does not require a raster operation of the present image data of the destination portion 705 and that of the destination portion 706, the foregoing first and second embodiments of character drawing of the invention (namely, using the plane unit portion of the data operation unit in FIG. 17) can meet the character drawing but if the raster operation is needed, the foregoing embodiments require that write operation be carried out twice.

Figure 24:
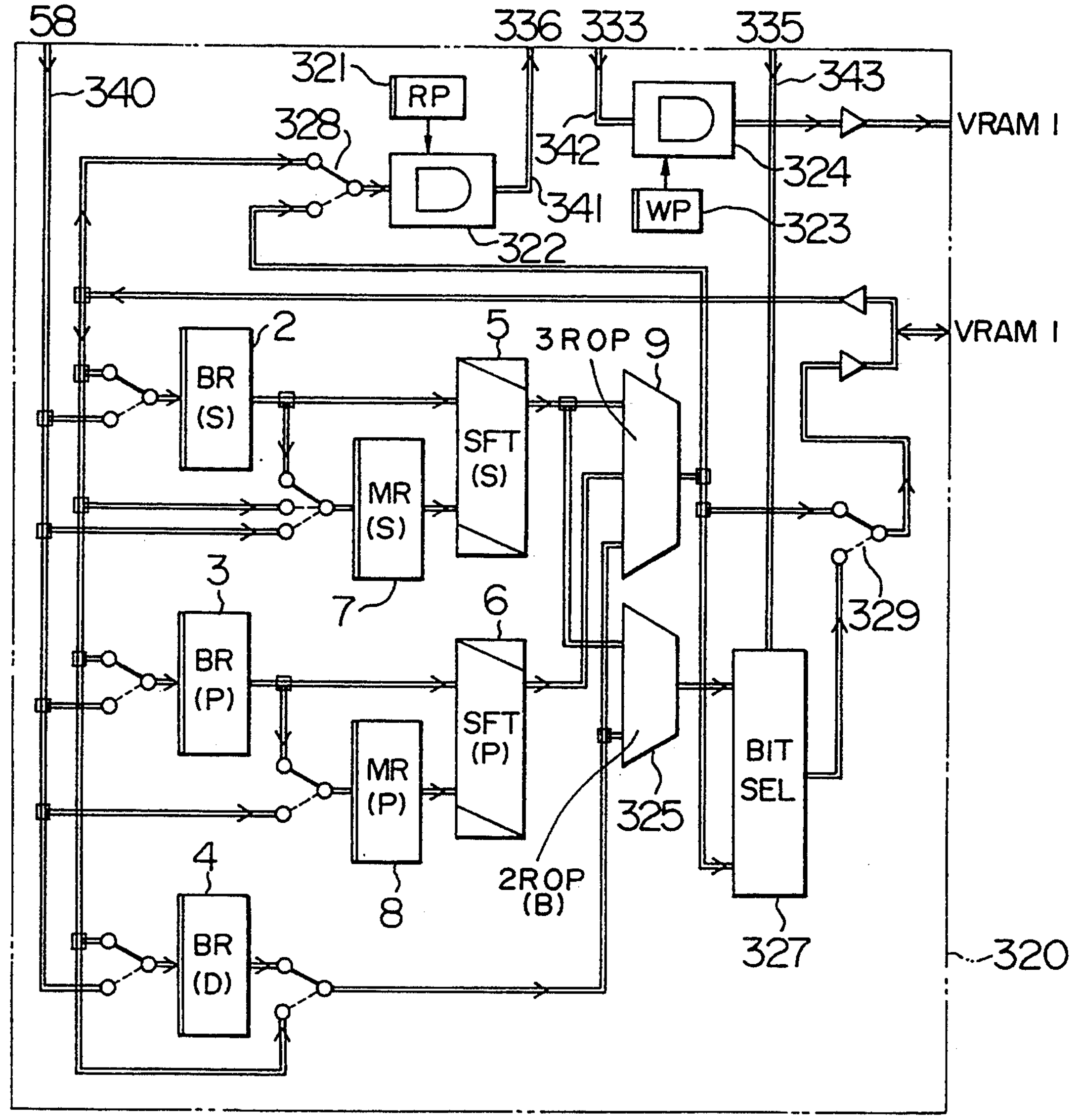
FIG. 24 is a diagram showing another example of construction of the plane unit portion of the data operation unit.

FIG. 24 shows a third embodiment of character drawing according to the invention. Exemplified in this embodiment is a construction of the plane unit portion of the data operation unit which ensures that the processing of opaque (2) complying with the method shown at (c) in FIG. 25 can be completed even by performing write once. FIG. 24 differs from the structural example of the plane unit portion of the data operation unit shown in FIG. 17 in that drawing data of the character font part 701 (FIG. 25) to be inputted to the bit selector 327 is supplied thereto from not the two-value raster operator 326 but the three-value raster operator 9. Through this, write processing of the character body face part 703 (FIG. 25) into the body face destination portion 708 of the VRAM 1 (FIG. 25) and write processing of the character font part 701 (FIG. 25) into the foreground destination portion 707 of the VRAM 1 (FIG. 25), which must otherwise be carried out sequentially, can be done simultaneously to permit character drawing of opaque 2 to be completed within the same processing time as that for character drawing of opaque 1.

3. Line Segment Drawing

3.1 First Embodiment

A first embodiment of line segment drawing according to the invention will now be described. As in the precedence, an overall construction of the present embodiment is illustrated in FIG. 15. The data operation unit 306 in the figure has portions 320, 320′, and 320″ common to the whole plane of the VRAM 1 shown in FIG. 16 and these portions has the same construction as that shown for the portion 320 in FIG. 17. An example of construction of the address generator 308 of FIG. 15 is shown in FIG. 18. The contents of FIGS. 16, 17 and 18 has already been described in the beginning of the foregoing item of bit block transfer and will not be described herein. As for the address generator 308, first sequential transfer sequencer 15 and mask pattern generator 305*c*, reference should also be made to the item of bit block transfer.

Figure 26:
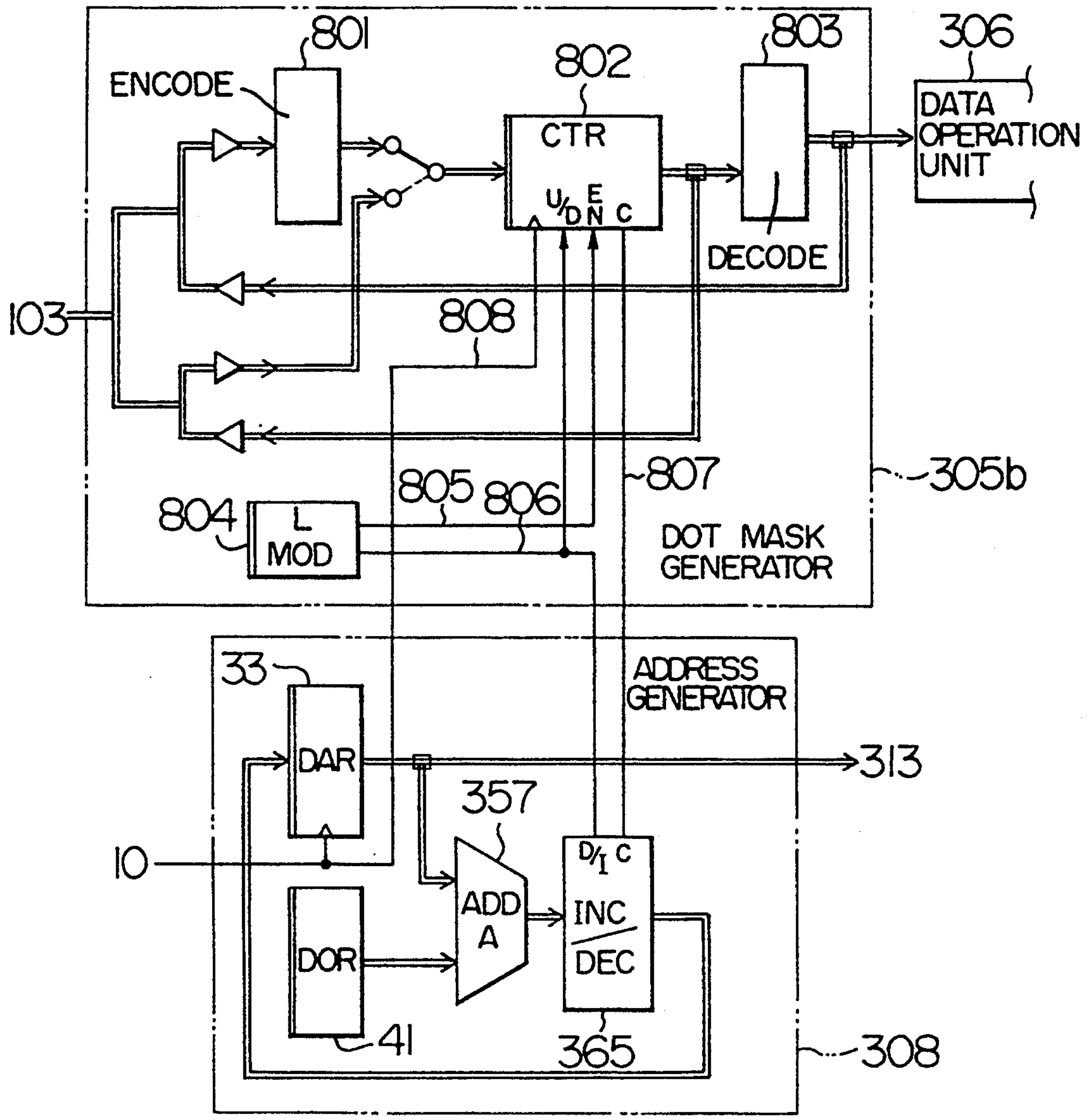
FIG. 26 is a diagram showing an example of construction of a line segment drawing controller.

In line segment drawing, the dot mask generator 305*b* is particularly characteristic of the present invention. Referring now to FIG. 26, an example of construction of the dot mask generator 305*b* and its relation to the address generator 308 will be described. The dot mask generator 305*b* generates a bit pattern which permits write of only one bit on the VRAM data bus and supplies, as external data, the bit pattern to the bit mask shifter 333 shown in FIG. 16 and the AND circuit 324 shown in FIG. 17 through the data structure transformer 58 included in the data operation unit 306. Specifically, the generation of the bit pattern for permitting only one bit to be written is accomplished by an up-down counter 802 and a decoder 803 shown in FIG. 26. Upon completion of write cycle to the VRAM 1, the bit pattern is selectively rendered unchanged or rotated by one bit clockwise or counterclockwise. When an overflow takes place as a result of the rotation, the value of the destination address register 33 of address generator 308 is incremented by +1 for clockwise rotation and decremented by −1 for counterclockwise rotation. Non-change or one bit clockwise or counterclockwise rotation of the pattern is commanded by a line segment drawing mode register 804. A control line 805 designates change or non-change of the pattern. If the control line 805 indicates non-change, the counter 802 does not react to an update clock 808 and an over flow signal 807 is so controlled constantly as to be conditioned to non-over flow. When the control line 805 indicates change, the counter 802 performs updown counting in accordance with the contents of a control line 806. In this case, the overflow signal 807 is generated in accordance with the state of the counter. The address generator 308 is provided with an incrementer/decrementer 365. When the overflow signal 807 indicates the overflow state, the incrementer/decrementer 365 operates to comply with the command of +1 or −1 on the control line 806. In the other case, the incrementer/decrementer 365 operates to supply the output of the adder 357 to the destination address register 33 without alternation. By the provision of the dot mask generator 305*b* and incrementer/decrementer 365 the speedup unit for bit block transfer can be utilized, without alternation, for line segment drawing. In contrast to the bit block transfer in which drawing is carried out in unit of word, drawing is effected essentially in unit of dot in line segment drawing.

Two paths for setting an initial value in the counter 802 are shown in FIG. 26. One of them uses an encoder 801, whereby bit image data within a word on the VRAM 1 is inputted to the encoder 801 and converted thereby into load data which in turn is set in the counter 802. Preferably, the encoder 801 may be a priority encoder. This path can be used efficiently when the parameter supplied from the host program is a bit image. The other path is for directly loading data on the counter 802 and can be used efficiently when the parameter supplied from the host computer is x-y coordinates. Specifically, only the number of bits necessary for the counter 802 may be cut out of lower bits of x coordinates and set in the counter 802. The update clock 808 is a triggering signal which occurs after the write processing to VRAM 1 by means of the destination address register 33 ends but when the write processing is effected using the first sequential transfer sequencer 15 generation or non-generation of triggering by the update clock 808 can be selected by means of a unit not shown only during the final cycle by the first sequential transfer sequencer 15. The following description will be given on the assumption that non-generation of update triggering during the final cycle by the first sequential transfer sequencer 15 is designated.

How the above constituent components operate will now be described. In the invention, the processing of three kinds of line segments, i.e., horizontal, vertical and 45° oblique line segments is increased in speed. As in the precedence, horizontal line segment drawing will be described by separately referring to the case of a long line segment to be drawn and the case of a short line segment. As for the definition of length to be described herein, reference should be made to item of operation. Here, drawing is carried out for the two separate cases but it should be noted that any horizontal line segments can be drawn by using a method dedicated to explanation of either one of the two cases.

(1a) Horizontal Line Segment Drawing When Line Segment is Long

Figure 27A:
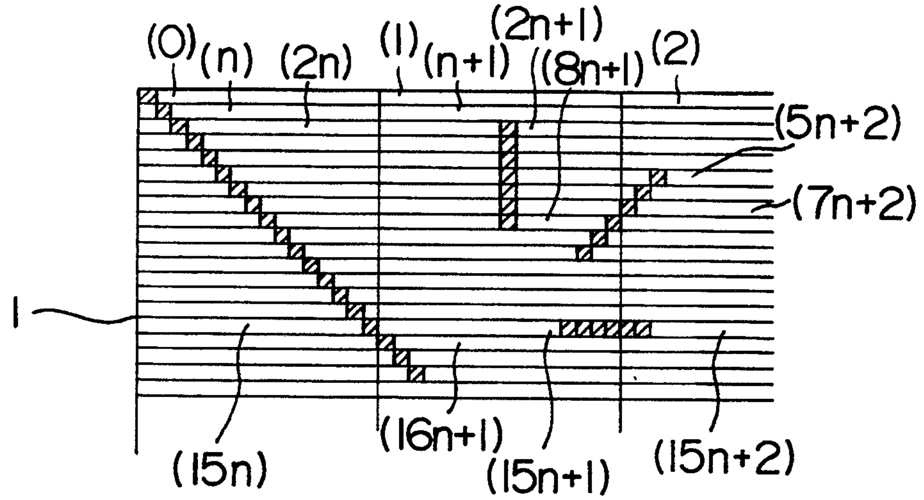
FIGS. 27A and 27B are diagrams useful to explain line segment drawing.
Figure 27B:
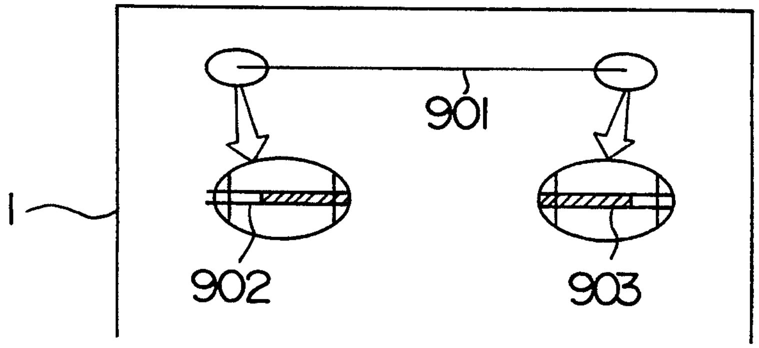

This type of horizontal line segment drawing is shown in FIG. 27B. Drawing is effected using the data operation unit 306, address generator 308, access cycle generator 10, first sequential transfer sequencer 15 and mask pattern generator 305*c* which are shown in FIG. 15. The operation is the same as the processing of painting horizontal one line with a given color in the bit block transfer. The CPU 100 prepares mask patterns at opposite ends of a line segment on the basis of coordinates of drawing start and coordinates of drawing end and sets the mask patterns in the mask pattern generator 305. More specifically, when a horizontal line segment 901 shown in FIG. 27B, for example, is drawn from left to right as viewed on the sheet of drawing, the first and second drawing permitting registers 47 and 48 shown in FIG. 7 are respectively set with a drawing pattern 902 at the left end of the horizontal line segment 901 and a drawing pattern 903 at the right end. A color of the line segment to be drawn at that time is precedently set in the buffer register 2 or 3 shown in FIG. 17 and the three-value raster operator 9 is designated with an operation for supplying the contents of the buffer register 2 or 3 to the VRAM 1. If line segment drawing requires a raster operation for the present image data at a destination area, i.e., an area about to be drawn with the segment and for line segment color to be drawn, the three-value raster operator 9 is so designated as to operate the contents of the buffer register 2 or 3 and the contents of the buffer register 4.

An address of the VRAM 1 used for writing is not a CPU address but an address generated by the address generator 308 shown in FIG. 18. The destination address register 33 constituting the address generator 308 is precedently set with an address of VRAM 1 containing a pixel at the beginning of writing and the destination offset register 41 also constituting the address register is precedently set with +1 when drawing is effected in the right direction but with −1 when drawing is done in the left direction. The access cycle generator 10 is so set as to generate a write access using the destination address register 33 when the first sequential transfer sequencer 15 generates a write cycle for the VRAM 1. If drawing of the line segment requires a raster operation of line segment color and destination area, the access cycle generator is so set as to generate a read access and a write access using the destination address register 33 when the first transfer sequencer 15 generates a write cycle for the VRAM 1. Thus, during a preceding read access, the present image data at the destination area of the VRAM 1 is read into the buffer register 4 of each plane and during the next write access, a result of the raster operation is again written into the destination area of the VRAM 1. As described previously, the destination address register 33 is permitted to be updated only after the write access ends.

After completion of the above pre-processing, a command for sequential write by the number of words to be drawn is supplied to the first sequential transfer sequencer 15 to draw a long horizontal line segment. With a VRAM 1 having a 16-bit data bus, drawing can be done by 16 pixels by 16 pixels at the maximum. If the raster operation is needed, a command for sequential read/write by the number of words to be drawn may be supplied to the first sequential transfer sequencer 15.

FIG. 27A shows short horizontal, vertical and 45° oblique line segments drawn on the VRAM 1 which are illustrated as corresponding to images on the screen. In the figure, addresses of the VRAM 1 are indicated as parenthesized. In the figure, the address increases horizontally to the right, beginning with address 0 and assuming address 1, address 2 . . . , and when reaching address n−1 (not shown), it returns to the left end to assume the next address n which is one line downward from the address 0. The address again increases to the right by assuming address n+1, n+2. Accordingly, the address can be changed vertically, through images on the screen, by adding or subtracting n to or from the original address. In this example, one address contains data of 16 pixels but the number of pixels of data may be 8 or 32. Typically, the number is so designed as to have a value of the power of 2 in many applications but it may take other values.

(1b) Horizontal Line Segment Drawing When Line Segment is Short

This type of horizontal line segment drawing is shown in FIG. 27A. A horizontal line segment in the figure extends from the fourth pixel from right in address 15n+1 to the second pixel from left in address 15n+2. Drawing of this horizontal line segment is effected using the data operation unit 306, address generator 308, access cycle generator 10, first sequential transfer sequencer 15 and dot mask generator 305*b*. The short horizontal line segment drawing differs from the long horizontal line segment drawing in that in place of the mask pattern generator 305*c* used for drawing in unit of word, the dot mask generator 305*b* is used to effect drawing in unit of dot. The CPU 100 sets data corresponding to a bit pattern at the beginning of writing as an initial value in the counter 802 (FIG. 26) included in the dot mask generator 305*b*. The CPU also sets a command as to whether drawing is done in the right or left direction in the line segment drawing mode register 804 shown in FIG. 26. For example, in case where the line segment is drawn from left to right in FIG. 27A (hereinafter referred to as case 1), drawing is so set as to be done in the right direction by using, as initial value, data corresponding to a pattern at the fourth pixel from right. In case where drawing is carried out from right to left (case 2), drawing is so set as to be done in the left direction by using, as initial value, data corresponding to a pattern at the second pixel from left. As in the precedence, color of a line segment to be drawn is set in the buffer register 2 or 3 shown in FIG. 17 in advance and an operation for supplying the contents of the buffer register 2 or 3 to the VRAM 1 is designated to the three-value raster operator 9. If drawing of the line segment requires a raster operation for the present image data at a destination area, i.e., an area being about to be drawn with the segment line and for color of the line segment to be drawn, the three-value raster operator 9 is so designated as to operate the contents of buffer register 2 or 3 or the contents of the buffer register 4.

An address of the VRAM 1 used for writing is not a CPU address but an address generated by the address generator 308 shown in FIG. 26. The destination address register 33 constituting the address generator 308 is precedently set with an address of VRAM 1 containing a pixel at the beginning of writing and the destination offset register 41 also constituting the address generator is precedently set with zero. For example, the destination address register 33 is set with 15n+1 in case 1 as above and with 15n+2 in case 2. The access cycle generator 10 shown in FIG. 15 is so set as to generate a write access using the destination address register 33 (FIG. 26) when the first sequential transfer sequencer 15 generates a write cycle for the VRAM 1. If drawing of the line segment requires a raster operation of line segment color and designation area, the access cycle generator is so set as to generate a read access and a write access using the destination address register 33 when the first sequential transfer sequencer 15 generates a write cycle for the VRAM 1. Thus, during the preceding read access, the present image data at the destination area of the VRAM 1 is read into the buffer register 4 of each plane and during the next write access, a result of raster operation is again written into the destination area of the VRAM 1. As described previously, the destination address register 33 is permitted to be updated only after the write access ends.

After completion the above pre-processing, a command for sequential write by the number of pixels to be drawn is supplied to the first sequential transfer sequencer 15 to draw a short horizontal line segment. For example, in cases 1 and 2 as above, a sequential write of 6 pixels is commanded. Drawing is done pixel by pixel regardless of the data bus width of the VRAM 1. The bit mask generator 305*b* rotates the bit pattern clockwise or counterclockwise every write operation and when the pixel to be drawn exceeds the word boundary of the VRAM 1, the counter 802 (FIG. 26) renders the overflow signal 807 active, so that the incrementer/decrementer 365 included in the address generator 308 is operated to cause the destination address register 33 to change by +1 or −1. For example, the register 33 is changed by +1 at the fifth pixel in case 1 and by −1 at the third pixel in case 2. In this method, writing of pixel is carried out in unit of dot but the CPU 100 need not be conscious of the word boundary to make this method suitable for drawing of short line segments. If the raster operation is needed, a command for sequential read/write by the number of pixels to be drawn may be supplied to the first sequential transfer sequencer 15.

(2) Vertical Line segment Drawing

FIG. 27A exemplifies a vertical line segment extending from address 2n+1 to address 8n+1. For explanation, downward drawing will be referred to as case 3 and upward drawing will be referred to as case 4. As shown in FIG. 15 drawing is carried out using the data operation unit 306, address generator 308, access cycle generator 10, first sequential transfer sequencer 15 and dot mask generator 305*b*. The CPU 100 sets a bit pattern at the beginning of writing as an initial value in the dot mask generator 305*b*. For example, in cases 3 and 4, data corresponding to a pattern at the eighth pixel from right is used as initial value. The CPU also gives a command not to move the pattern in both the right and left directions. In this case, as in the precedence, a color of the line segment to be drawn is precedently set in the buffer register 2 or 3 shown in FIG. 17 and an operation for supplying the contents of the buffer register 2 or 3 to the VRAM 1 is designated to the three-value raster operator 9. If drawing of the line segment requires a raster operation for the present image data at a destination area, i.e., an area being about to be drawn with the line segment and for line segment color to be drawn, the three-value raster operator 9 is so designated as to operate the contents of buffer register 2 or 3 or the contents of buffer register 4.

An address of the VRAM 1 used for writing is not a CPU address but an address generated by the address generator 308 shown in FIG. 26. The destination address register 33 constituting the address generator 308 is set with an address of VRAM 1 containing a pixel at the beginning of writing. For example, address 2n+3 is set in case 3 and address 8n+1 is set in case 4. The destination offset register 41 is precedently set with such an offset value that is added to the destination address register 33 to provide an address which is offset upwards by just one raster on the display screen when drawing is effected upwards on the screen but when drawing is effected downwards on the screen, it is set with such an offset value that is added to the destination address register 33 to provide an address which is offset downwards by just one raster on the display screen. For example, n is set as offset value in case 3 and −n in case 4. The access cycle generator 10 is so set as to generate a write access using the destination address register 33 when the first sequential transfer sequencer 15 generates a write cycle for the VRAM 1. If drawing of the line segment requires a raster operation of line segment color and destination area, the access cycle generator is so set as to generate a read access and a write access using the destination address register 33 when the first sequential transfer sequencer 15 generates a write cycle for the VRAM 1. Thus, during the preceding read access, the present image data at the destination area of the VRAM 1 is read into the buffer register 4 of each plane and during the next write access, a result of raster operation is again written into the destination area of the VRAM 1. As described previously, the destination address register 33 is permitted to be updated only after the write access ends.

After completion of the above pre-processing, a command for sequential write by the number of pixels to be drawn is supplied to the first sequential transfer sequencer 15 to draw a vertical line segment. Drawing is done pixel by pixel regardless of the data bus width of the VRAM 1. If the raster operation is needed, a command for sequential read/write by the number of pixels to be drawn may be supplied to the first sequential transfer sequencer 15.

(3) 45° Oblique Line Segment Drawing

FIG. 27A exemplifies a 45° oblique line segment which extends from the left end in address 0 to the third pixel from left in address 18n+1 and a 45° oblique line segment which extends from the third pixel from right in address 10n+1 to the third pixel from left in address 6n+2. For explanation, left-above to right-below drawing beginning with the left end in address 0 and ending in the third pixel from left in address 18n+1 will be referred to as case 5 and left-below to right-above drawing beginning with the third pixel from right in address 10n+1 and ending in the third pixel from left in address 5n+2 will be referred to as case 6. Drawing is carried out using the data operation unit 306, address generator 308 shown in FIG. 26, access cycle generator 10, sequential transfer sequencer 15 and dot mask generator 305*b* which are shown in FIG. 15. The CPU sets a bit pattern at the beginning of writing as an initial value in the dot mask generator 305*b*. The CPU also gives a command as to whether drawing is done in the right or left direction. As in the precedence, color of a line segment to be drawn is set in the buffer register 2 or 3 in advance and an operation for supplying the contents of the buffer register 2 or 3 shown in FIG. 17 to the VRAM 1 is designated to the tertiary raster operator 9. If drawing of the line segment requires a raster operation for the present image data at a destination area, i.e., an area being about to be drawn with the line segment and for color of the line segment to be drawn, the tertiary raster operator 9 is so designated as to operate the contents of buffer register 2 or 3 or the contents of buffer register 4.

An address of the VRAM 1 used for writing is not a CPU address but an address generated by the address generator 308. The destination address register 33 constituting the address generator 308 is set with an address of VRAM 1 containing a pixel at the beginning of writing. The destination offset register 41 is precedently set with such an offset value that is added to the destination address register 33 to provide an address which is offset upwards by just one raster on the display screen when drawing is effected upwards on the screen but when drawing is effected downwards on the screen, it is set with such an offset value that is added to the destination address register 33 to provide an address which is offset downwards by just one raster on the display screen. The access cycle generator 10 is so set as to generate a write access using the destination address register 33 when the first sequential transfer sequencer 15 generates a write cycle for the VRAM 1. If drawing of the line segment requires a raster operation for line segment color and destination area, the access cycle generator is so set as to generate a read access and a write access using the destination address register 33 when the sequential transfer register generates a write access for the VRAM 1. Thus, during the preceding read access, the present image data at the destination area of the VRAM 1 is written into the buffer register 4 of each plane and during the next write access, a result of raster operation is again written into the destination area of the VRAM 1. As described previously, the destination address register 33 is permitted to be updated only after the write access ends.

After completion of the above pre-processing, a command for sequential write by number of pixels to be drawn is supplied to the first sequential transfer sequencer 15 to draw a 45° oblique line segment in a desired direction. For example, a sequential write of 19 pixels is commanded in case 5 and a sequential write of 6 pixels is commanded in case 6. Specifically, the dot mask generator 305*b* rotates the bit pattern clockwise or counterclockwise every write operation and the value of the destination address generator 33 is moved by one raster upwards or downwards. Also, when the pixel to be drawn exceeds the word boundary of the VRAM 1, the destination address register 33 is changed, in addition to its one raster upward or downward movement, by +1 or −1, so that the CPU 100 need not be conscious of the word boundary to draw the 45° oblique line segment. For example, in case 5 upon drawing of 16-th pixel, a pixel at the right end in address 15n is drawn, the address value is then added with n to be lowered by one raster and concurrently incremented by +1 to be shifted by one address to the right, and a pixel at the left end in address 16n+1 is drawn. In case 6, upon drawing of the third pixel, a pixel at the right end in address 8n+1 is drawn, the address value is added with −n to be lifted by one raster and concurrently incremented by +1 to be shifted by one address to the right, and a pixel at the left end in address 7n+2 is drawn. If the raster operation is needed, a command for sequential read/write by the number of pixels to be drawn may be supplied to the first sequential transfer sequencer 15.

As described above, in accordance with the present embodiment, vertical, horizontal and 45° oblique straight lines can be drawn using programs of the same algorithm. Where the number of dots contained in one word is d, the horizontal line segment can be drawn at a speed which is about d times as high as the speed for the vertical, horizontal and 45° oblique straight line, if the method of drawing horizontal line segment when the line segment is long, as explained in the foregoing item (1a), is employed.

3.2 Second Embodiment

Figure 34:
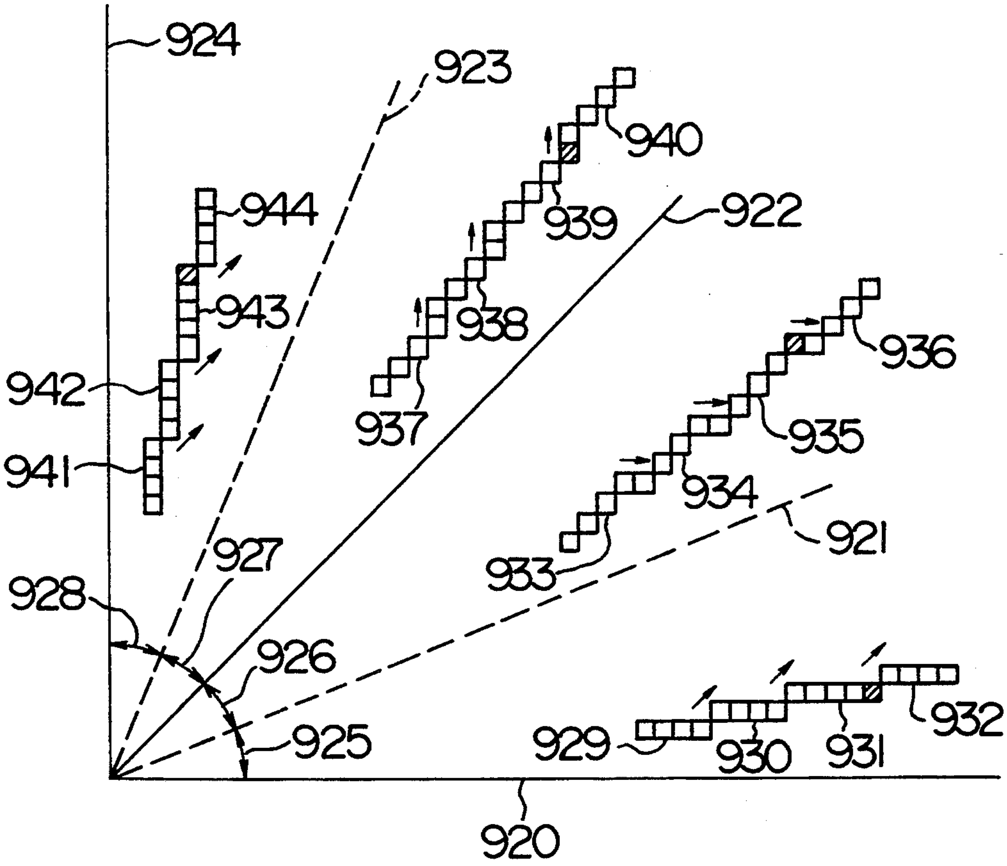
FIG. 34 is a diagram for explaining drawing of line segments at desired angles.

A second embodiment of line segment drawing of the invention will now be described in which the previously described speedup unit for two-dimensional bit block transfer is utilized to draw the horizontal straight line, vertical straight line and oblique straight line at a desired obliquity other than 45° at high speeds. While in the foregoing first embodiment of line segment drawing, speedup of drawing of horizontal, vertical and 45° line segments can be accomplished, a line segment at a desired angle other than the above can be drawn using the three line segment elements of horizontal, vertical and 45° oblique line segments repetitively as shown in FIG. 34. In the figure, reference numeral 920 designates a horizontal axis line, 922 a 45° oblique line and 924 a vertical axis line. A dotted line 921 makes an angle of about 27° to the horizontal axis line 920 and a dotted line 923 makes an angle of about 27° to the vertical axis line. Then, a line segment at a desired angle as represented by, for example, a train of horizontal line segments 929 to 932 can be drawn within an angle region 925; and likewise, a line segment at a desired angle as represented by, for example, a train of 45° oblique line segments 933 to 936 can be drawn within an angle region 926, a line segment at a desired angle as represented by, for example, a train of 45° oblique line segments 937 to 940 can be drawn within an angle region 927, and a line segment at a desired angle as represented by, for example, a train of vertical line segments 941 to 944 can be drawn within an angle region 928. The line segments at desired angles exemplified above are based on 4-dot-length horizontal, vertical and 45° oblique line segments, respectively, but the horizontal line segment 931, 45° oblique line segments 935 and 939 and vertical line segment 943 are line segments having a 5-dot length which is one dot larger than the length of the other line segments. This is because when an error in coordinate value of less than one dot occurring each time that one dot is drawn is accumulated to exceed one dot, a line segment having additional one dot in comparison with the other line segments must be drawn. As in the above example, the processing of accumulating the error in coordinate value less than one dot is needed in order to draw a line segment at a desired angle.

Equation (6) as below is a general expression indicative of time t for drawing processing of horizontal (see aforementioned item 1b of horizontal line segment drawing when line segment is short), vertical and 45° oblique line segments in the foregoing first embodiment.

$$t=a*n*x+c1 \quad (6)$$

where the meaning of each parameter is as follows:

a: averaged one access time for VRAM
c1: fixed overhead of line segment drawing processing
n: the number of VRAM accesses necessary for one-dot drawing
x: the number of dots to be drawn.

The parameter n is 1 when a line segment is normally drawn but when a raster operation for data presently written in the VRAM 1 and for color of dot being about to be drawn is effected, the VRAM 1 is once read and then drawing is carried out, so that the parameter n is 2. Time t for drawing processing of a line segment at a desired angle is given using equation (6) as follows:

$$t=r(a*n*x+c2)+c1 \quad (7)$$

where parameter c2 is a term for the processing of setting an accumulation of errors due to a coordinate increase of less than one dot and register and the like and generally it is smaller than parameter c1. In line segment drawing in which a line segment at a desired angle is expressed by repeating a line segment element of several dots, the overhead is sometimes, in effect, 5 to 30 times greater than the term of a*n *x. If this overhead processing can be removed from the above equation by carrying out it in parallel, even the time for the drawing processing of a line segment at a desired angle can be expressed by the same calculation expression as equation (6) for the three line segment elements of horizontal, vertical and 45° oblique line segments.

Figure 32:
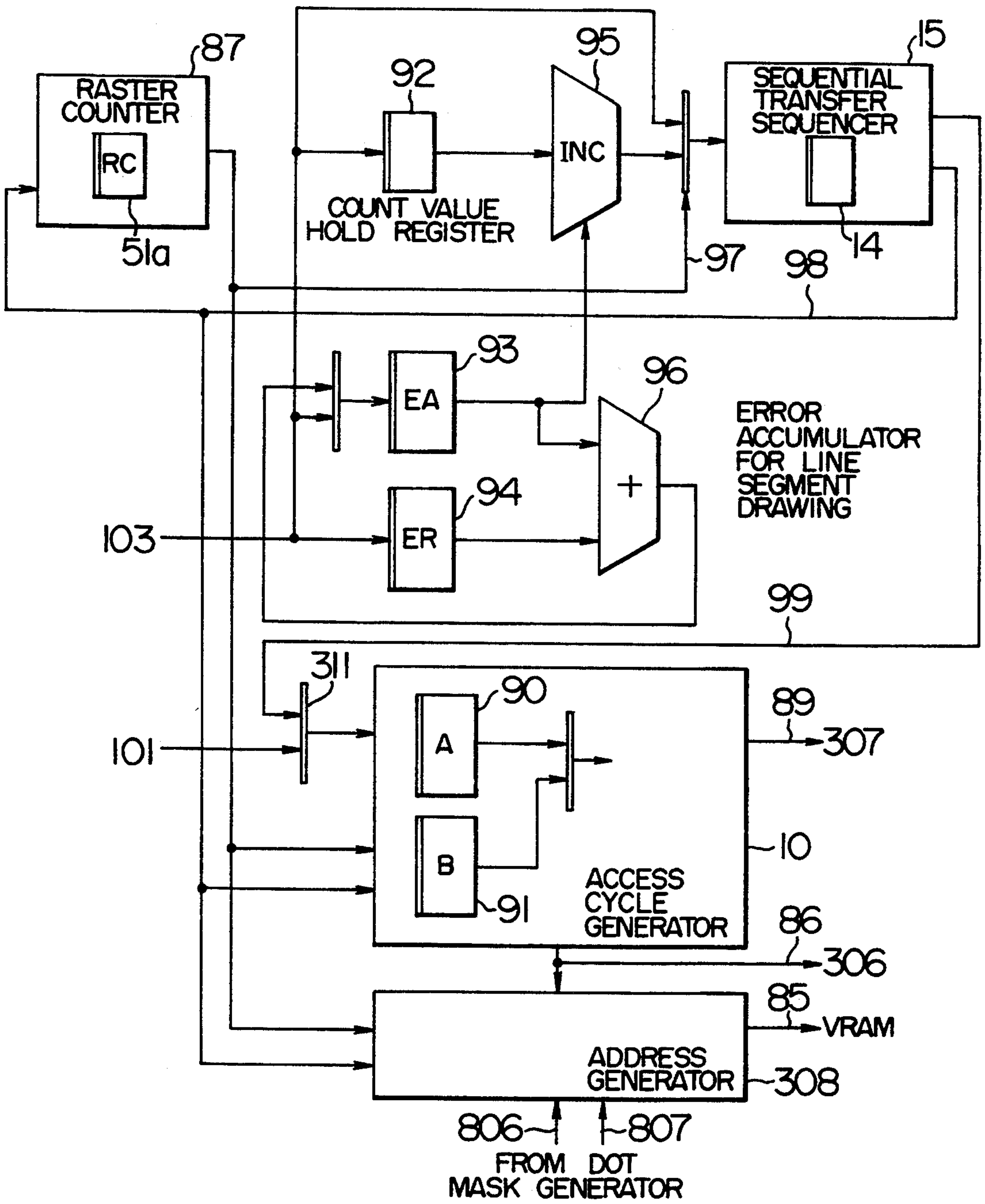
FIG. 32 is a diagram showing an example of construction of a controller for drawing of a line segment at a desired angle.

FIG. 32 shows an example of construction of an extracted control section for drawing a line segment at a desired angle. In this construction, the bit block transfer controller for two-dimensional area shown in FIG. 29 is added with an error accumulator for line segment drawing and an incrementer 95 for incrementing by +1 the value held in the count value hold register 92 when the accumulation value of the error accumulator exceeds a certain value. The error accumulator includes an error accumulation register 93, an error register 94 and an error adder 96 for adding outputs of the two registers to determine the next accumulation value. An example of construction of the address generator 308 as applied to this case is shown in FIG. 33. The address generator 308 shown in FIG. 33 differs from the address generator 308 for two-dimensional bit block transfer shown in FIG. 30 by having an incrementer/decrementer 365 following the adder 83. The incrementer/decrementer is the same as that of the first embodiment of line segment drawing described in connection with FIG. 26.

The operation will now be described by referring to the example of line segment drawing shown in FIG. 34. Drawing of a train of horizontal line segments 929 to 932 within the angle region 925 will first be considered. The destination address register 33 is set with an address of VRAM 1 containing a dot at the left end of horizontal line segment 929 and the destination offset register 41 is set with zero. The dot mask generator 305*b* is set, as an initial value, with a dot position of the left end of horizontal line segment 929, and the dot position is so designated as to be moved to the right and updated to the right even when the value of a raster counter 51*a* is not zero and the final write by the first sequential transfer sequencer 15 is in progress. The error accumulation register 93 is set with an initial value of accumulation value and the error register 94 is set with an error value less than one dot resulting from drawing of one horizontal line segment (here 4 dots). The raster counter 51*a* is set with a value corresponding to the number of horizontal line segments to be drawn (here 4) and the destination area sum register 72 (FIG. 30) is set with a value for moving the address upwards by one raster. Thereafter, the first sequential transfer counter 14 (and count value hold register 92) are written with the number of horizontal line segments to be drawn (here 4 dots) and then the first sequential transfer sequencer 15 is started.

As the first sequential transfer sequencer 15 generates four write cycles and drawing of the horizontal line segment 929 ends, the destination address register 33 is added with the value set in the destination area sum register 72 to assume an address value containing a dot at the left end of horizontal line segment 930. The dot position of the dot mask generator 305*b* is also updated to the dot position at the left end of horizontal line segment 930 and the contents of the error accumulation register 93 is also updated by being added with the value of the error register 94. In this example, the accumulation value of error does not reach one dot to prevent the incrementer 95 from being operated and the value of the raster counter 51*a* is not zero, with the result that the value of the count value hold register 92 is transferred to the first sequential transfer counter 14 without alternation and the first sequential transfer sequencer 15 is restarted to draw the horizontal line segment 930. At that time, the value of the raster counter 51*a* is −1 decremented so as to be updated. Update operation of the raster counter 51*a* is carried out each time that a series of transfer operations by the first sequential transfer sequencer 15 ends. This is true for the following description. Upon completion of drawing of the horizontal line segment 930, register and the like are again updated. Since in this example the present accumulation value of error accumulation register 93 exceeds one dot, the incrementer 95 is operated to +1 increment the dot number of the next horizontal line segment 931. Upon completion of drawing of the final horizontal line segment 932, the value of the raster counter 51*a* is rendered zero in this example and consequently the first sequential transfer sequencer 15 will not be started any more to stop drawing of the line segment. In case where the dot position crosses the word boundary of the VRAM 1, though not explained hereinbefore for simplicity of explanation, the value of the destination address register 33 is +1 incremented by means of the incrementer/decrementer 365. This holds true for the following description. In this respect, reference should be made to the description given in the first embodiment.

Next, drawing of a train of 45° oblique line segments 933 to 936 within the angle region 926 will be considered. The destination address register 33 is set with an address of VRAM 1 containing a dot at the left lower end of 45° oblique line segment 933 and the destination offset register 41 is set with a value for moving the address upwards by one raster. The dot mask generator 305*b* is set, as an initial value, with a dot position of the left lower end of 45° oblique line segment 933, and the dot position is so designated as to be moved to the right and updated to the right even when the value of the raster counter 51*a* is not zero and the final write by the first sequential transfer sequencer 15 is in progress. The error accumulation register 93 is set with an initial value of accumulation value and the error register 94 is set with an error less than one dot resulting from drawing of one 45° oblique line segment (here 4 dots). The raster counter 51*a* is set with a value corresponding to the number of 45° oblique line segments to be drawn (here 4) and the destination area sum register 72 is set with zero. Thereafter, the first sequential transfer counter 14 (and count value hold register 92) are written with the number of horizontal line segments to be drawn (here 4 dots) and then the first sequential transfer sequencer 15 is started. As the first sequential transfer sequencer 15 generates four write cycles and drawing of the 45° oblique line segment 933 ends, the destination address register 33 is set with the value set in destination area sum register 72, which is zero in this case, so that the value of the destination address register 33 remains unchanged to assume an address value containing a dot at the left lower end of 45° oblique line segment 934. The dot position of the dot mask generator 305*b* is also updated to the dot position at the left lower end of 45° oblique line segment 934 and the contents of the error accumulation register 93 is also updated by being added with the value of the error register 94. In this example, the accumulation value of error does not reach one dot to prevent the incrementer 95 from being operated and the value of the raster counter 51*a* is not zero, with the result that the value of the count value hold register 92 is transferred to the first sequential transfer counter 14 without alternation and the first sequential transfer sequencer 15 is restarted to draw the 45° oblique line segment 934. At that time, the value of the raster counter 51*a* is −1 decremented so as to be updated. Upon completion of drawing of the 45° oblique line segment 934, register and the like are again updated. Since in this example, too, the accumulation value of the error accumulation register 93 exceeds one dot, the incrementer 95 is operated to +1 increment the number of dots of the succeeding 45° oblique line segment 935. Upon completion of the final 45° oblique line segment 936, the value of the raster counter 51*a* is rendered zero in this example and consequently the first sequential transfer sequencer 15 will not be started any more to stop drawing of the line segment.

Next, drawing of a train of 45° oblique line segments 937 to 940 within the angle region 927 will be considered. The destination address register 33 is set with an address of VRAM 1 containing a dot at the left lower end of 45° oblique line segment 937 and the destination offset register 41 is set with a value for moving the address upwards by one raster. The dot mask generator 305*b* is set, as an initial value, with a dot position of the left lower end of 45° oblique line segment 937 and the dot position is so designated as to be moved to the right and not to be updated when the value of the raster counter 51*a* is not zero and the final write by the first sequential transfer sequencer 15 is in progress. The error accumulation register 93 is set with an initial value of accumulation value and the error register 94 set with an error value less than one dot resulting from drawing of one 45° oblique line segment (here 4 dots). The raster counter 51*a* is set with a value corresponding to the number of 45° oblique line segments to be drawn (here 4) and the destination area sum register 72 is set with a value for moving the address upwards by one raster.

Thereafter, the first sequential transfer counter 14 (and count value hold register 92) are written with the number of dots of horizontal line segments to be drawn (here 4 dots) and then the first sequential transfer sequencer 15 is started. As the first sequential transfer sequencer 15 generates four write cycles and drawing of the 45° line segment 937 ends, the destination address register 33 is added with the value set in the destination area sum register 72 to assume an address value containing a dot at the left lower end of 45° oblique line segment 938. The dot position of the dot mask generator 305*b* remains unchanged to keep the dot position at the left lower end of 45° line segment 938 and the contents of the error accumulation register is updated by being added with the value of the error register 94. In this example, the accumulation value of error does not reach one dot to prevent the incrementer 95 from being operated and the value of the raster counter 51*a* is not zero, with the result that the value of the count value hold register 92 is transferred to the first sequential transfer counter 14 without alternation and the first sequential transfer sequencer 15 is restarted to draw the 45° oblique line segment 938. At that time, the value of the raster counter 51*a* is −1 decremented so as to be updated. Upon completion of drawing of the 45° oblique line segment 938, register and the like are again updated. Since in this example, too, the accumulation value of error accumulation register 93 exceeds one dot, the incrementer 95 is operated to +1 increment the dot number of the next 45° oblique line segment 939. Upon completion of drawing of the final 45° oblique line segment 940, the value of the raster counter 51*a* is rendered zero and consequently the first sequential transfer sequencer 15 will not be started anymore to stop drawing of the line segment.

Finally, drawing of a train of vertical line segments 941 to 944 within the angle region 928 will be considered. The destination address register 33 is set with an address of VRAM 1 containing a dot at the lower end of vertical line segment 941 and the destination offset register 41 is set with a value for moving the address upwards by one raster. The dot mask generator 305*b* is set, as an initial value, with a dot position at the lower end of vertical line segment 941, and the dot position is so designated as not to be moved and to be updated to the right when the value of the raster counter 51*a* is not zero and the final write by the first sequential transfer sequencer 15 is in progress. The error accumulation register 93 is set with an initial value of accumulation value and the error register 94 is set with an error value less than one dot resulting from drawing of one vertical line segment (here 4 dots). The raster counter 51*a* is set with a value corresponding to the number of vertical line segments to be drawn (here 4) and the destination area sum register 72 is set with a value for moving the address upwards by one raster. Thereafter, the first sequential transfer counter 14 (and count value hold register 92) are written with the number of dots of horizontal line segments to be drawn (here 4 dots) and then the first sequential transfer sequencer 15 is started. As the first sequential transfer sequencer 15 generates four write cycles and drawing of the vertical line segment 941 ends, the destination address register 33 is added with the value set in the destination area sum register 72 to assume an address value containing a dot at the lower end of vertical line segment 942. The dot position of the dot mask generator 305*b* is moved to the right to assume a dot position at the lower end of vertical line segment 942 and the contents of the error accumulation register 93 is updated by being added with the value of the error register 94. In this example, the accumulation value of error does not reach one dot to prevent the incrementer 95 from being operated and the value of the raster counter 51*a* is not zero, with the result that the value of the count value hold register 92 is transferred to the first sequential transfer counter 14 without alternation and the first sequential transfer sequencer 15 is restarted to draw the vertical line segment 942. At that time, the value of the raster counter 51*a* is −1 decremented so as to be updated. Upon completion of drawing of the vertical line segment 942, register and the like are again updated. Since in this example, too, the accumulation value of error accumulation register 93 exceeds one dot, the incrementer 95 is operated to +1 increment the dot number of the next vertical line segment 943. Upon completion of drawing of the final vertical line segment 944, the value of the raster counter 51*a* is rendered zero and consequently the first sequential transfer sequencer 15 will not be started any more to stop drawing of the line segment.

The foregoing description has been given by taking drawing of line segments at desired angles within the first quadrant as an example but obviously, by developing this drawing symmetrically, drawing of line segments at desired angles within all the quadrants can be done in a similar manner. While the line segment has been described as having no line style, the line segment can be modified into such line style as dotted line, dot and dashed line and chained line by using the control unit for repetitive pattern described in connection with the seventh embodiment of bit block transfer of the invention.

In accordance with the present invention, the processings of bit block transfer, character drawing and line segment drawing which are used at frequencies of 50% or more, about 30% and about 20% in the window system, respectively, can be effected at high speeds regardless of the kinds of drawing, thus making the window system more practical. In other words, the time required for the processings specific to the window system such as movement of window, overlap, display, erase, display of character and scroll can be reduced to offer comfortable operational environment to the user of the window system.

We claim:

1. A graphic display processing apparatus having a central processing unit (CPU), a video random access memory (VRAM) having a plane structure of one or more planes and adapted to store data, a memory controller adapted to generate an access timing for said VRAM, a drawing controller for transferring the data to said VRAM, and a display system comprised of display means, display address generator means for generating a display address for said VRAM, and display controller for generating a display timing for display of the data on said display means, said graphic display processing apparatus comprising:

sequential transfer sequence means, coupled to said CPU, for generating an access request timing at set times;

access cycle generator means for expanding the access request timing from said sequential transfer sequence means into one or more accesses and transferring the accesses to said memory controller;

a data control unit for designating a processing operation of the data on the basis of an instruction from said CPU under the control of said sequential transfer sequence means and access cycle generator means;

a data operation unit for performing a processing operation of the data to be drawn on said VRAM on the basis of a command from said data control unit under the control of said access cycle generator means; and drawing address generator means for generating a drawing address of the data on the basis of a signal from said access cycle generator means;

wherein said drawing address generator includes a source address register for holding an address of a source area on said VRAM, a destination address register for holding an address of a destination area, a pattern address register for holding an address of a pattern area, a source offset register for holding a value added to the contents of said source address register to update the same when a read access cycle by said access cycle generator ends, a destination offset register for holding a value added to the contents of said destination address register to update the same when a write access cycle by said access cycle generator ends, a pattern offset register for holding a value added to the contents of said pattern address register to update the same when the read access cycle by said access cycle generator ends, a first address adder for adding the contents of source address register and that of source offset register, the contents of destination address register and that of destination offset register or the contents of pattern address register and that of pattern offset register so as to update the value of each register, and a second address adder for adding the write data of said CPU and the contents of source address register, destination address register or pattern address register so as to update the value of each register.

2. A graphic display processing apparatus having a central processing unit (CPU), a video random access memory (VRAM) having a plane structure of one or more planes and adapted to store data, a memory controller adapted to generate an access timing for said VRAM, a drawing controller for transferring the data to said VRAM, and a display system comprised of display means, display address generator means for generating a display address for said VRAM, and display controller for generating a display timing for display of the data on said display means, said graphic display processing apparatus comprising:

sequential transfer sequence means, coupled to said CPU, for generating an access request timing at set times;

access cycle generator means for expanding the access request timing from said sequential transfer sequence means into one or more accesses and transferring the accesses to said memory controller;

a data control unit for designating a processing operation of the data on the basis of an instruction from said CPU under the control of said sequential transfer sequence means and access cycle generator means;

a data operation unit for performing a processing operation of the data to be drawn on said VRAM on the basis of a command from said data control unit under the control of said access cycle generator means; and drawing address generator means for generating a drawing address of the data on the basis of a signal from said access cycle generator means;

wherein said data operation unit is common to a plurality of VRAM's and includes a data structure transformer for transforming the format of the data by using mirror image inversion and swap separately or in combination, a bit mask register for controlling writing to said VRAM in unit of bit, AND means for ANDing the contents of bit mask register and the data of data structure transformer bit by bit, a bit mask shifter for shifting data of said bit mask register, data structure transformer or AND means, a third merge register for holding the previous contents of data of said data structure transformer, a third shifter for shifting data of said data structure transformer and data of said third merge register, and read data synthesizer means for ORing bits of the contents of read data selector means of each plane so as to synthesize read data supplied to said CPU.

3. A graphic display processing apparatus according to claim 2 wherein said data operation unit includes, by the number of planes and so for each plane of each of said plurality of VRAM's, read plane selector means for selecting permissibility or impermissibility of reading said VRAM in unit of plane, write plane selector means for selecting permissibility or impermissibility of writing said VRAM in unit of plane, plane bit mask means for synthesizing the output of said write plane selector means and the output of said bit mask shifter and controlling, in unit of bit, writing of each plane of said VRAM, a first buffer register for holding data of said VRAM or data of said data structure transformer as data of a source area, a second buffer register for holding data of said VRAM or data of said data structure transformer as data of a pattern area, a third buffer register for holding data of said VRAM or data of said data structure transformer as data of a destination area, a first merge register for holding the previous contents of data of said VRAM, first buffer register or data structure transformer, a second merge register for holding the previous contents of data of said second buffer register or data structure transformer, a first shifter for shifting data of said first buffer register and data of said first merge register, a second shifter for shifting data of said second buffer register and data of said second merge register, a three-value raster operator for performing logical operation by using as inputs the contents of said first and second shifters and the contents of said third buffer register or VRAM, a first two-value raster operator for performing logical operation by using as inputs the contents of said first shifter and the contents of said third buffer register, a second two-value raster operator for performing logical operation by using as inputs the contents of said second shifter and the contents of said third buffer register, bit selector means for selecting, when the value of each bit of the output of said third shifter is zero, the output data of said first two-value raster operator at that bit position and selecting, when the value of each bit of the output of said third shifter is one, the output data of said second two-value raster operator at that bit position, write data selector means for supplying the contents of said three-value raster operator or the contents of said bit selector means to said VRAM, and read data selector means for supplying the data of said VRAM or the contents of said three-value raster operator to said read data synthesizing means when the plane is selected by said plane selector means.

4. A graphic display processing apparatus for a graphic display system having central processing unit (CPU), a video random access memory (VRAM) of a plane structure having a plurality of planes and a memory controller for said VRAM, comprising:

(1) common to all the planes of said VRAM, a data structure transformer for transforming the format of external data by using mirror image inversion and swap separately or in combination, a bit mask register for controlling writing to said VRAM in unit of bit, AND means for ANDing the contents of bit mask register and the data of data structure transformer bit by bit, a bit mask shifter for shifting data of said bit mask register, data structure transformer or AND means, a third merge register for holding the previous contents of data of said data structure transformer, a third shifter for shifting data of said data structure transformer and data of said third merge register, and read data synthesizer means for ORing bits of the contents of read data selector means of each plane so as to synthesize read data supplied to said CPU; and a data operation unit including, by the number of planes and so for each plane of said VRAM, read plane selector means for selecting permissibility or impermissibility of reading said VRAM in unit of plane, write plane selector means for selecting permissibility or impermissibility of writing said VRAM in unit of plane, plane bit mask means for synthesizing the output of said write plane selector means and the output of said bit mask shifter and controlling, in unit of bit, writing of each plane of said VRAM, a first buffer register for holding data of said VRAM or data of said data structure transformer as data of a source area, a second buffer register for holding data of said VRAM or data of said data structure transformer as data of a pattern area, a third buffer register for holding data of said VRAM or data of said data structure transformer as data of a destination area, a first merge register for holding the previous contents of data of said VRAM, first buffer register or data structure transformer, a second merge register for holding the previous contents of data of said buffer register of data structure transformer, a first shifter for shifting data of said first buffer register and data of said first merge register, a second shifter for shifting data of said second buffer register and data of said second merge register, a three-value raster operator for performing logical operation by using as inputs the contents of said first and second shifters and the contents of said third buffer register or VRAM, a first two-value raster operator for performing logical operation by using as inputs the contents of said first shifter and the contents of said third buffer register, a second two value raster operator for performing logical operation by using as inputs the contents of said second shifter and the contents of said third buffer register, bit selector means for selecting, when the value of each bit of the output of said third shifter is zero, the output data of said first two-value raster operator at that bit position and selecting, when the value of each bit of the output of said third shifter is one, the output data of said second two-value raster operator at that bit position, write data selector means for supplying the contents of said three-value raster operator or the contents of said bit selector means to said VRAM, and read data selector means for supplying the data of said VRAM or the contents of said three-value raster operator to said read data synthesizing means when the plane is selected by said read plane selector;

(2) drawing address generator means including a source address register for holding an address of a source area on said VRAM, a destination address register for holding an address of a destination area, a pattern address register for holding an address of a pattern area, a source offset register for holding a value added to the contents of said source address register to update the same when a read access cycle by an access cycle generator ends, a destination offset register for holding a value added to the contents of said destination address register to update the same when a write access cycle by said access cycle generator ends, a pattern offset register for holding a value added to the contents of said pattern address register to update the same when the read access cycle by said access cycle generator ends, a first address adder for adding the contents of source address register and that of source offset register, the contents of destination address register and that of destination offset register or the contents of pattern address register and that of pattern offset register so as to update the value of each register, and a second address adder for adding the write data of said CPU and the contents of source address register, destination address register or pattern address register so as to update the value of each register; and (3) access cycle generator means for generating, when receiving a request for reading said VRAM from said CPU, a read access containing at least one of access operations to source, destination and pattern areas by using said drawing address generator and generating, when receiving a request for writing said VRAM from said CPU, a write access or the combination of read access and write access to a destination area by using said drawing address generator and drives said memory controller for said VRAM 5. A graphic display processing apparatus according to claim 4 further comprising:

(4) sequential transfer sequence means for starting said access cycle generator means by the designated number of sequential operations of write cycle or combination of read cycle and write cycle; and (5) a sequential transfer mask pattern generator for generating bit mask patterns respectively designated during the first and final write transfer processings by said sequential transfer sequence means to supply the bit patterns, as external data, to said AND means or bit mask shifter through said data structure transformer of data operation unit and generating, during write transfer lying between the first and final write transfer processings, a bit mask pattern which permits writing of all the bits to supply the bit mask pattern, as external data, to said AND means or bit mask shifter through said transformer.

6. A graphic display processing apparatus according to claim 5 further comprising:

a raster counter for starting said sequential transfer sequence means plural times, a count value hold register for holding data written in said sequential transfer sequence means and resetting the held data in said sequential transfer sequence means when the value of said raster counter is a value other than a final value and said sequential transfer sequence means assumes a final value, a source update value register for holding, when a read cycle using said source address register is generated while the value of said raster counter is the value other than the final value and said sequential transfer sequence means assumes the final value, a value added to said source register upon completion of the read cycle, a pattern update value register for holding, when a read cycle using said pattern address register is generated while the value of said raster counter is the value other than the final value and said sequential transfer sequence means assumes the final value, a value added to said pattern address register upon completion of the read cycle, and a destination update value register for holding, when a write cycle using said destination address register is generated while the value of said raster counter is the value other than the final value and said sequential transfer sequence means assumes the final value, a value added to said destination address register upon completion of the write cycle.

7. A graphic display processing apparatus according to claim 4 further comprising:

(4) a data position transfer which, when the number of bits of data from said CPU differs from the number of bits of the VRAM data bus, puts the data of said CPU to the left or right on the VRAM data bus through an image on the screen and supplies the data by said CPU, as external data, to said data structure transformer of data operation unit.

8. A graphic display processing apparatus according to claim 7 wherein said bit selector means of said data operation unit selects, when the value of each bit of the output of said third shifter is zero, the output data of said first two-value raster operator at that bit position and selects, when the value of each bit of the output of said third shifter is one, the output data of said three-value raster operator at that bit position.

9. A graphic display processing apparatus according to claim 8 wherein the bit number of data from said CPU is half the bit number of said VRAM data bus.

10. A graphic display processing apparatus according to claim 8 wherein the bit number of data from said CPU is 8 bits and the bit number of said VRAM data bus is 16 bits.

11. A graphic display processing apparatus according to claim 10 wherein said VRAM data bus is divided into two, of which one stands for a first bus and the other stands for a second bus, an address of said destination address register is supplied, without alternation, to a memory element coupled to said first bus, the address of said destination address register is supplied, through increment means, to a memory element coupled to said second bus when the shift value of said bit mask shifter exceeds half the bit number of said VRAM data bus, and the address of said destination address register is supplied, without alternation, to a memory element coupled to said second bus when the shift value of said bit mask shifter is less than half the bit number of said VRAM data bus.

12. A graphic display processing apparatus according to claim 10 wherein said VRAM data bus is divided into two, of which one stands for a first bus and the other stands for a second bus, an address of said destination address register is supplied, without alternation, to a memory element coupled to said first bus, the address of said destination address register is supplied, through increment means, to a memory element coupled to said second bus when the shift value of said third shifter exceeds half the bit number of said VRAM data bus, and the address of said destination address register is supplied, without alternation, to a memory element coupled to said second bus when the shift value of said third shifter is less than half the bit number of said VRAM data bus.

13. A graphic display processing apparatus according to claim 4 further comprising:

(4) sequential transfer counter means for starting said access cycle generator by the designated number of sequential operations of write cycle or combination of read cycle and write cycle;

(5) a sequential transfer mask pattern generator for generating bit mask patterns respectively designated during the first and final write transfer processings by said sequential transfer counter means to supply the bit mask patterns, as external data, to said AND means or bit mask shifter through said data structure transformer of data operation unit and generating, during write transfer lying between the first and final write transfer processings, a bit mask pattern which permits writing of all the bits to supply the bit mask pattern, as external data, to said AND means or bit mask shifter through said transformer; and (6) a dot mask generator for generating a bit pattern which permits write of only one bit on said VRAM data bus, supplying as external data the bit pattern to said bit mask controller through said data structure transformer of data operation unit, selectively rendering, upon completion of write cycle to said VRAM, the bit pattern unchanged or rotated by one bit clockwise or counterclockwise, and when an overflow takes place as a result of the rotation, incrementing the value of destination of said address generator by +1 for clockwise rotation and decrementing by −1 for counterclockwise rotation.

14. A graphic display processing apparatus according to claim 13 further comprising:

a raster counter for starting said sequential transfer counter plural times, a count value hold register for holding data written in said sequential transfer counter and resetting the held data in said sequential transfer counter when the value of said raster counter is a value other than a final value and said sequential transfer counter assumes a final value, a source update value register for holding, when a read cycle using said source address register is generated while the value of said raster counter is the value other than the final value and said sequential transfer counter assumes the final value, a value added to said source address register upon completion of the read cycle, a pattern update value register for holding, when a read cycle using said pattern address register is generated while the value of said raster counter is the value other than the final value and said sequential transfer counter assumes the final value, a value added to said pattern address register upon completion of the read cycle, a destination update value register for holding, when a write cycle using said destination address register is generated while the value of said raster counter is the value other than the final value and said sequential transfer counter assumes the final value, a value added to said destination address register upon completion of the write cycle, an error register for holding a value of error which is smaller than one dot of a line segment, an error accumulator for accumulating the value of said error register every one dot drawing, and an incrementer for incrementing the value of said count value hold register by +1 when an accumulated error of said error accumulator exceeds one dot and resetting an incremented value in said sequential transfer counter.

15. A graphic display processing apparatus according to claim 13 wherein said drawing address generator means includes first address generator means adapted to generate a first address within said VRAM and having means for updating said first address after completion of a third read cycle to be described later, second address generator means adapted to generate a second address within said VRAM and having means for updating said second address after completion of a fourth read cycle to be described later, and third address generator means adapted to generate a third address within said VRAM and having means for updating said third address after completion of a second write cycle to be described later;

said data operation unit includes first data hold means, second data hold means, third data hold means, first shift means for shifting data held by said first data hold means, second shift means for shifting data held by said second data hold means, and a logical operator adapted to receive three values of data representative of a result of shift by said first shift means, data representative of a result of shift by said second shift means and data held by said second data hold means;

said sequential transfer sequence means generates a first write cycle or a set of a first read cycle and the first write cycle at least once; and said access cycle generator means includes a first access cycle generator having first designation means for receiving the first write cycle generated by said sequential transfer sequence means so as to designate whether the second write cycle for storing the operation result of said logical operator at the third address designated by said third address generator means is generated for said memory controller or whether after the second read cycle for storing data at the third address designated by said third address generator means in said third data hold means is generated for said memory controller, the second write cycle for storing the operation result of said logical operator at the third address designated by said third address generator means is generated for said memory controller, and a second access cycle generator having second designation means for receiving the first read cycle generated by said sequential transfer sequence means so as to designate which one of desired one to three combinations of the three kinds of read cycles including the third read cycle for storing data at the first address designated by said said first address generator means in said first data hold means, fourth read cycle for storing data at the second address designated by said second address generator means in said second data hold means and second read cycle for storing data at the third address designated by said third address generator means in said third data hold means is generated for said memory controller.

16. A graphic display processing method for reading/writing data inside a video random access memory(VRAM) in accordance with a command from a central processing unit (CPU) and transferring the data, comprising the steps of:

(a) generating, in place of an access request pursuant to an instruction processing by said CPU, an access request timing for accessing said VRAM for sequential write processings or sequential read and write processings predetermined times;

(b) when said access request timing is for read processing, generating a read access request containing at least one of requests for accessing a source area of said VRAM which stores data of a transfer originator, a pattern area of said VRAM which stores a pattern and a destination area which is a transfer destination of data;

(c) when said access request timing is for write to said VRAM, generating either a write access to said destination area or an access request for the combination of read and write for said destination area;

(d) after performing a first processing operation for holding data of any one of said source area, pattern area and destination area in accordance with the read access request in step (b), updating an address pointer indicating an address of said source area when said source area is accessed and updating an address pointer indicating an address of said pattern area when said pattern area is accessed;

(e) before writing data subjected to said first processing operation in accordance with the access request in step (c), performing a second processing operation of shifting (inclusive of rotation) or mutual logical operation of the data or the combination thereof; and (f) after writing the data subjected to said second processing operation to said destination area while inhibiting or permitting writing said VRAM in unit of bit, updating an pointer indicating an address of said destination area.

17. A graphic display processing method for bit block transfer according to claim 16 wherein m=0 and b=0 stand in the following equation:

$$t=y\cdot\{b+(a\cdot n+m)\cdot x\}+c$$

where a is averaged access time, per one VRAM read or write operation, for accessing said VRAM in steps (b) and (c), b is fixed overhead of time for transferring the number of words of horizontal one raster, c is fixed overhead of time for bit block transfer processing, m is overhead of time necessary for said first and second processing operations, n is the number of access operations to said VRAM necessary for transfer of data stemming from one write or the combination of one read and one write preset in step (a), x is the number of transfer words in the horizontal direction, y is the number of transfer words in the vertical direction and this time required for bit block transfer.

18. A graphic display processing method according to claim 17 wherein when time required for first transfer of data precedently through said first processing operation to said destination area when n=1 stands, that is, when the sequential write access request timing is generated in step (a) and the write access to said destination area is generated in step (c) is first transfer time, second transfer time required for transfer of data stored in said source area having the same area size as that of said destination area during said first transfer to said destination area when n=2 stands, that is, when the sequential read and write access request timing is generated in step (a), the read access to said source area is generated in step (b) and the write access to said destination area is generated in step (c) is shorter than twice said first transfer time.

19. A graphic display processing method according to claim 17 wherein when time required for first transfer of data precedently held through said first processing operation to said destination area when n=1 stands, that is, when the sequential write access request timing is generated in step (a) and the write access to said destination area is generated in step (c) is first transfer time, third transfer time required for operation of data stored in said source area having the same area size as that of said destination area during said first transfer and data stored in said destination area and for transfer of operated data to said destination area when n=3 stands, that is, when the sequential read and write access request timing is generated in step (a), the read access to said source area and destination area is generated in step (b) and the write access to said destination area is generated in step (c) or when the sequential read and write access request timing is generated in step (a), the write access to said source area is generated in step (b) and the combination of read and write access to said destination area is generated in step (c) is shorter than three times said first transfer time.

20. A graphic display processing method according to claim 17 wherein when time required for first transfer of data precedently held through said first processing operation to said destination area when n=1 stands, that is, when the sequential write access request timing is generated in step (a) and the write access to said destination area is generated in step (c) is first transfer time, fourth transfer time required for operation of data stored in said source area having the same area size as that of said destination area during said first transfer, data stored in said destination area and data stored in said pattern area and for transfer of operated data to said destination area when n=4 stands, that is, when the sequential read and write access request timing is generated in step (a), the read access to said source area, pattern area and destination area is generated in step (b) and the write access to said destination area is generated in step (c) or when the sequential read and write access request timing is generated in step (a), the write access to said source area and pattern area is generated in step (b) and the combination of read and write access to said destination area is generated in step (c) is shorter than four times said first transfer time.

21. A graphic display processing apparatus having a central processing unit (CPU), a vide random access memory (VRAM) having a plane structure of one or more planes and adapted to store data, a memory con, roller adapted to generate an access timing for said VRAM, a drawing controller for transferring the data to said VRAM, and a display system comprised of display means, display address generator means for generating a display address for said VRAM, and display controller for generating a display timing for display of the data on said display means, said graphic display processing apparatus comprising:

sequential transfer sequence means, coupled to said CPU, for generating an access request timing at set times;

access cycle generator means for expanding the access request timing from said sequential transfer sequence means into one or more accesses and transferring the accesses to said memory controller;

a data control unit for designating a processing operation of the data on the basis of an instruction from said CPU under the control of said sequential transfer sequence means and access cycle generator means;

a data operation unit for performing a processing operation of the data to be drawn on said VRAM on the basis of a command from said data control unit under the control of said access circle generator means, said data operation unit is common to a plurality of VRAM's and includes a data structure transformer for transforming the format of the data by using mirror image inversion and swap separately or in combination, a bit mask register for controlling writing to said VRAM in unit of bit, AND means for ANDing the contents of bit mask register and the data of data structure transformer bit by bit, a bit mask shifter for shifting data of said bit mask register, data structure transformer or means, a third merge register for holding the previous contents of data of said data structure transformer, a third shifter for shifting data of said data structure transformer and data of said third merge register, and read data synthesizer means for ORing bits of the contents of read data selector means of each plane so as to synthesize read data supplied to said CPU; and drawing address generator means for generating a drawing address of the data on the basis of a signal from said access cycle generator means, said drawing address generator means includes a source address register for bolding an address of a source area on said VRAM, a destination address register for holding an address of a destination area a pattern address register for holding an address of a pattern area, a source offset register for holding a value added to the contents of said source address register to update the same when a read access cycle by said access cycle generator ends, a destination offset register for holding a value added to the contents of said destination address register to update the same when a write access cycle by said access cycle generator ends, a pattern offset register for holding a value added to the contents of said pattern address register to update the same when the read access cycle by said access cycle generator ends, a first address adder for adding the contents of source address register and that of source offset register, the contents of destination address register and that of destination offset register or the contents of pattern address register and that of pattern offset register so as to update the value to each register, and a second address adder for adding the write data of said CPU and the contents of source address register, destination address register or pattern address register so as to update the value of each register.

* * * * *